(12) United States Patent
Oh et al.

(10) Patent No.: US 10,270,989 B2
(45) Date of Patent: Apr. 23, 2019

(54) BROADCASTING SIGNAL TRANSMISSION DEVICE, BROADCASTING SIGNAL RECEPTION DEVICE, BROADCASTING SIGNAL TRANSMISSION METHOD, AND BROADCASTING SIGNAL RECEPTION METHOD

(71) Applicant: LG ELECTRONICS INC., Seoul (KR)

(72) Inventors: Sejin Oh, Seoul (KR); Soojin Hwang, Seoul (KR); Jongyeul Suh, Seoul (KR); Hyunmook Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/557,343

(22) PCT Filed: Apr. 22, 2016

(86) PCT No.: PCT/KR2016/004251
§ 371 (c)(1),
(2) Date: Sep. 11, 2017

(87) PCT Pub. No.: WO2016/171518
PCT Pub. Date: Oct. 27, 2016

(65) Prior Publication Data
US 2018/0109743 A1 Apr. 19, 2018

Related U.S. Application Data

(60) Provisional application No. 62/151,383, filed on Apr. 22, 2015, provisional application No. 62/157,941, (Continued)

(51) Int. Cl.
*H04N 7/173* (2011.01)
*H04N 5/355* (2011.01)
(Continued)

(52) U.S. Cl.
CPC ............ *H04N 5/355* (2013.01); *H04N 1/6019* (2013.01); *H04N 7/005* (2013.01); *H04N 21/235* (2013.01);
(Continued)

(58) Field of Classification Search
CPC .................. H04N 21/2362; H04N 21/235
(Continued)

(56) References Cited

U.S. PATENT DOCUMENTS 8,914,835 B2 * 12/2014 Chen ................ H04N 21/23439
709/231
8,938,767 B2 * 1/2015 Chen ................ H04N 21/23439
709/231

(Continued)

FOREIGN PATENT DOCUMENTS

EP 2993886 A1 3/2016
EP 3104618 A1 12/2016
(Continued)

OTHER PUBLICATIONS

XP030062729: Canon Research Centre France, Telecom ParisTech, International Organisation for Standarisation Organisation Internationale De Normalisation ISO/IEC JTC1/SC29/WG11 Coding of Moving Pictures and Audio, Jul. 2014, Sapporo, Japan, "Clarification on association type signaling in DASH," pp. 1-6.

*Primary Examiner* — Michael B. Pierorazio
(74) *Attorney, Agent, or Firm* — Dentons US LLP

(57) ABSTRACT

The present invention proposes a method for transmitting a broadcasting signal. The method for transmitting a broadcasting signal according to the present invention proposes a system which can support a next-generation broadcasting service in an environment that supports a next-generation hybrid broadcasting using a terrestrial broadcasting network and an Internet network. In addition, the present invention
(Continued)

proposes an efficient signaling method which can cover both the terrestrial broadcasting network and the Internet network in the environment that supports the next-generation hybrid broadcasting.

19 Claims, 55 Drawing Sheets

Related U.S. Application Data filed on May 6, 2015, provisional application No. 62/182,644, filed on Jun. 22, 2015, provisional application No. 62/182,643, filed on Jun. 22, 2015, provisional application No. 62/190,742, filed on Jul. 10, 2015.

(51) Int. Cl.
| | |
|---|---|
| *H04N 21/235* | (2011.01) |
| *H04N 21/2362* | (2011.01) |
| *H04N 1/60* | (2006.01) |
| *H04N 7/00* | (2011.01) |
| *H04N 21/2343* | (2011.01) |
| *H04N 21/262* | (2011.01) |
| *H04N 21/845* | (2011.01) |
| *H04N 7/015* | (2006.01) |

(52) U.S. Cl.
CPC ... *H04N 21/2362* (2013.01); *H04N 21/23439* (2013.01); *H04N 21/26258* (2013.01); *H04N 21/8456* (2013.01); *H04N 7/015* (2013.01)

(58) Field of Classification Search
USPC .......................................................... 725/116
See application file for complete search history.

(56) References Cited

U.S. PATENT DOCUMENTS

| | | | |
|---|---|---|---|
| 9,736,507 B2* | 8/2017 | Oh | H04N 21/234327 |
| 2003/0055995 A1* | 3/2003 | Ala-Honkola | H04N 21/23406 |
| | | | 709/231 |
| 2005/0120132 A1* | 6/2005 | Hutter | H04L 65/1006 |
| | | | 709/234 |
| 2005/0135285 A1* | 6/2005 | Vlot | H04N 7/0806 |
| | | | 370/310 |
| 2008/0022005 A1* | 1/2008 | Wu | H04L 65/4069 |
| | | | 709/231 |
| 2008/0170630 A1* | 7/2008 | Falik | H04L 47/2416 |
| | | | 375/240.29 |
| 2010/0235472 A1* | 9/2010 | Sood | H04L 65/4092 |
| | | | 709/219 |
| 2010/0312828 A1* | 12/2010 | Besserglick | H04L 65/602 |
| | | | 709/203 |
| 2011/0023076 A1* | 1/2011 | Park | H04N 21/44209 |
| | | | 725/116 |
| 2011/0058675 A1* | 3/2011 | Brueck | H04N 21/2541 |
| | | | 380/277 |
| 2011/0082914 A1* | 4/2011 | Robert | H04N 21/4788 |
| | | | 709/219 |
| 2011/0099594 A1* | 4/2011 | Chen | H04N 21/23439 |
| | | | 725/105 |
| 2011/0196982 A1* | 8/2011 | Chen | H04N 21/23439 |
| | | | 709/231 |
| 2014/0013003 A1 | 1/2014 | Giladi | |
| 2014/0304422 A1 | 10/2014 | Di et al. | |
| 2016/0241924 A1* | 8/2016 | Kwak | H04N 21/8586 |
| 2016/0301959 A1* | 10/2016 | Oh | H04N 21/234327 |
| 2016/0345033 A1* | 11/2016 | Kwak | H04N 21/2343 |

FOREIGN PATENT DOCUMENTS

| | | |
|---|---|---|
| EP | 3261352 A1 | 12/2017 |
| KR | 10-2015-0002440 A | 1/2015 |
| WO | 012/047028 A2 | 4/2012 |
| WO | 2015/034188 A1 | 3/2015 |
| WO | 2014178286 A1 | 2/2017 |

* cited by examiner

FIG. 3

| Syntax | No. of Bits | Format |
|---|---|---|
| LLS_table( ) { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|     } | | |
|   } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | Use | Data Type |
|---|---|---|
| bundleDescription | | |
|   userServiceDescription | | |
|     @globalServiceID | 1 | anyURL |
|     @serviceID | 1 | unsignedShort |
|     @serviceStatus | 0..1 | boolean |
|     @fullMPDUri | 1 | anyURL |
|     @sTSIDUri | 1 | anyURL |
|     name | 0..N | string |
|       @lang | 1 | language |
|     serviceLanguage | 0..N | language |
|     capabilityCode | 0..1 | string |
|     deliveryMethod | 1..N | |
|       broadcastAppService | 1..N | |
|         basePattern | 1..N | string |
|       unicastAppService | 0..N | |
|         basePattern | 1..N | string | t4010

| Element or Attribute Name | Use | Data Type |
|---|---|---|
| S-TSID | | |
|   @serviceID | 1 | unsignedShort |
|   RS | 1..N | |
|     @bsid | 0..1 | unsignedShort |
|     @sIpAddr | 0..1 | string |
|     @dIpAddr | 0..1 | string |
|     @dport | 0..1 | unsignedShort |
|     @PLPID | 0..1 | unsignedByte |
|     LS | 1..N | |
|       @tsi | 1 | unsignedInt |
|       @PLPID | 0..1 | unsignedByte |
|       @bw | 0..1 | unsignedInt |
|       @startTime | 0..1 | dateTime |
|       @endTime | 0..1 | dateTime |
|       ScrFlow | 0..1 | scrFlowType |
|       RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
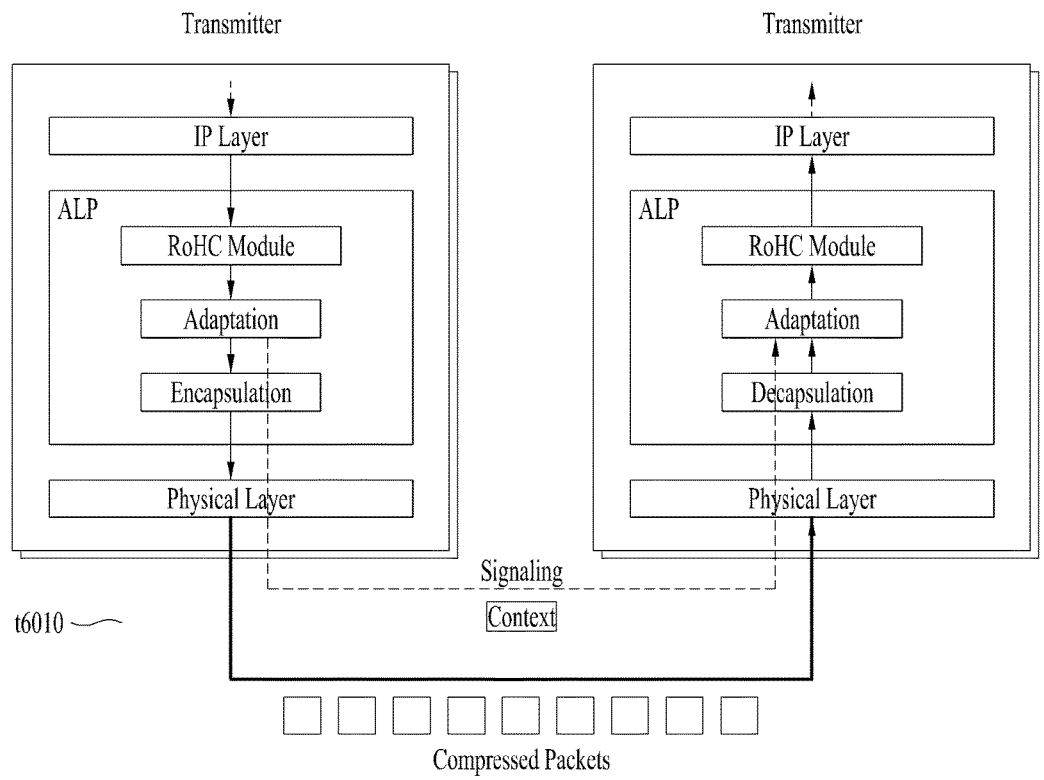
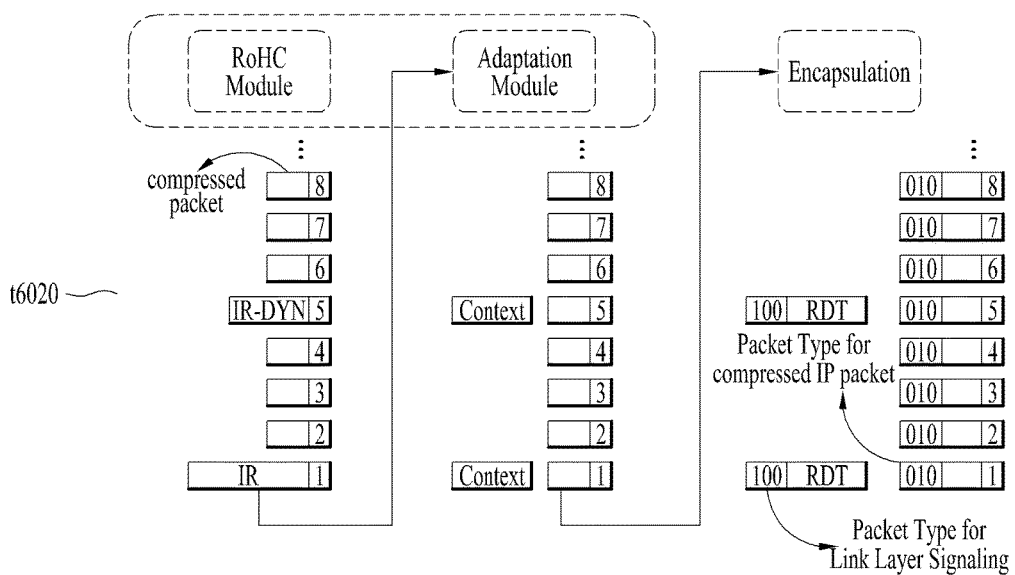

FIG. 7

| Syntax | Number of bits | Format |
|---|---|---|
| Link_Mapping_Table() { | | |
|    signaling_type | 8 | 0x01 |
|    PLP_ID | 6 | uimsbf |
|    reserved | 2 | "11" |
|    num_session | 8 | uimsbf |
|    for(i = 0 ; i < num_session ; i++) { | | |
|       src_IP_add | 32 | uimsbf |
|       dst_IP_add | 32 | uimsbf |
|       src_UDP_port | 16 | uimsbf |
|       dst_UDP_port | 16 | uimsbf |
|       SID_flag | 1 | bslbf |
|       compressed_flag | 1 | bslbf |
|       reserved | 6 | '111111' |
|       if (SID_flag == "1") { | | |
|          SID | 8 | uimsbf |
|       } | | |
|       if (compressed_flag == "1") { | | |
|          context_id | 8 | uimsbf |
|       } | | |
|    } | | |
| } | | |

| Element or Attribute Name | Use | Description |
|---|---|---|
| HDRConfiguration | | specifies HDR configuration description. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |
| Legend: For attributes: M=Mandatory, O=Optional, OD=Optional with Default Value, CM=Conditionally Mandatory. For elements: <minOccurs>...<maxOccurs> (N=unbounded) Elements are bold; attributes are non-bold and preceded with an @. | | |

```
<xs:element name="HDRConfiguration" type="DescriptorType" minOccurs="0" maxOccurs="unbounded"/>
<!-- Descriptor -->
 <xs:complexType name="DescriptorType">
  <xs:sequence>
   <xs:any namespace="##other" processContents="lax" minOccurs="0" maxOccurs="unbounded"/>
  </xs:sequence>
  <xs:attribute name="schemeIdUri" type="xs:anyURI" use="required"/>
  <xs:attribute name="value" type="xs:string"/>
  <xs:attribute name="id" type="xs:string"/>
  <xs:anyAttribute namespace="##other" processContents="lax"/>
 </xs:complexType>
```

| Scheme Identifier (@schemeIdUri) | Informative description |
|---|---|
| urn:mpeg:dash:hdr:201x | Scheme identifier for HDR Configuration Description |

L11010

| @value | Use | Description |
|---|---|---|
| OETF | M | non-negative integer in decimal representation providing the identifier for opto-electronic transfer function of source picture of video media component. |
| maxLuminance | M | non-negative integer in decimal representation expressing the peak luminance of mastering display. It can be from 100 to 10000. |
| minLuminance | M | non-negative fractional value in decimal representation expressing the minimum luminance of mastering display. It can be from 0 to 0.10. |
| maxFrameLuminance | M | non-negative integer in decimal representation expressing maximum value of average luminance of a frame of video media component |
| maxPixelLuminance | M | non-negative integer in decimal representation expressing the luminance of the brightest pixel in video media component |
| minPixelLuminance | M | non-negative integer in decimal representation expressing the luminance of the darkest pixel in video media component |
| HDRTypeTransitionFlag | OD default:false | If not present it is false. If present and set to true, it includes the end of the current HDR video media component or that includes the transition from the current HDR type (e.g HDR type #1 → oetf:3, max_lum:100, min_lum:0.5, max_frame_lum:0, max_pixel_lum:0) to other HDR types (e.g.HDR type #2 → oetf:1, max_lum:1000, min_lum:0.05, max_frame_lum:0, max_pixel_lum:0) in video media component. In other words, in case of different HDR types, one or more value(s) of attributes/elements to compose HDR should be different. |
| HDRSDRTransitionFlag | OD default:false | If not present it is false. If present and set to true, it includes the end of the current HDR video media component or that includes the transition from HDR to SDR in video media component |
| SDRHDRTransitionFlag | OD default:false | If not present it is false. If present and set to true, it includes the end of the current SDR video media component or that includes the transition from SDR to HDR in video media component |
| SDRCompatibility | O | Flag to indicate that the video media component can be compatible with SDR |

Legend:
For attributes: M=Mandatory, O=Optional, OD=Optional with Default Value, CM=Conditionally Mandatory.

L11020

| OETF Value | Meaning |
|---|---|
| 0 | reserved |
| 1 | ITU-R BT.1886 |
| 2 | ITU-R REC.709 |
| 3 | ITU-R BT.2020 |
| 4-15 | Reserved Future use |

L11030

<HDRConfiguration schemeIdUri="urn:mpeg:dash:hdr:201x" value="3, 100, 0.5, 0, 0, 0.5, true, false, false, true"/>

| @value | Use | Description |
|---|---|---|
| ... | ... | ... |
| HDRType | 0 | One set can be configured using a combination of HDR related parameters, and a set can be identified with @HDRType. For example, Type A can be composed of a combination of EOTF of SMPTE ST.2084, bitdepth of 10 bits/pixel, peak luminance of 1000 nit, codec of HEVC single codec, and metadata of SMPTE ST.2086.<br>0: unspecified, 1: Type A, 2: Type B, 3: Type 3,...<br>Values of OETF, maxLuminance, minLuminance, maxFrameLuminance, maxPixelLuminance, and minPixelLuminance are mandatorily included in the case of "unspecified" in which HDR type is 0, and the values of OETF, maxLuminance, minLuminance, maxFrameLuminance, maxPixelLuminance, and minPixelLuminance may not be included, may be optionally included or may be repeatedly included if the type has been determined. |
| Legend:<br>For attributes: M=Mandatory, O=Optional, OD=Optional with Default Value, CM=Conditionally Mandatory. | | |

`<HDRConfiguration schemeIdUri="urn:mpeg:dash:hdr:201x" value="0"/>` ──── L12020

FIG. 13

| Element or Attribute Name | Use | Description |
|---|---|---|
| Common attributes and elements | | |
| @profile | O | specifies the profiles which the associated Representation(s) conform to of the list of Media Presentation profiles as described in 8. The value shall be a subset of the respective value in any higher level of the document hierarchy (Representation, Adaptation Set, MPD). |
| ... | . | ... |
| @HDRFlag | O | Flag to indicate that the video media component supports HDR |
| @HDRTypeTransitionFlag | OD default:false | If not present it is false. If present and set to true, it includes the end of the current HDR video media component or that includes the transition from the current HDR type (e.g HDR type #1 → oeft:3, max_lum:100, min_lum:0.5, max_frame_lum:0, max_pixel_lum:0) to other HDR types (e.g. HDR type #2 →oeft:1, max_lum: 1000,min_lum:0.05, max_frame_lum:0, max_pixel_lum:0) in video media component. In other words, in case of different HDR types, one/or more value(s) of attributes/elements to compose HDR should be different. |
| @HDRSDRTransitionFlag | OD default:false | If not present it is false. If present and set to true, it includes the end of the current HDR video media component or that includes the transition from HDR to SDR in video media component |
| @SDRHDRTransitionFlag | OD default:false | If not present it is false. If present and set to true, it includes the end of the current SDR video media component or that includes the transition from SDR to HDR in video media component |
| @SDRCompatibility | O | Flag to indicate that the video media component can be compatible with SDR |
| FramePacking | 0...N | specifies frame-packing arrangement information of the video media component type. |
| ... | . | ... |
| HDRConfiguration | 0...N | specifies HDR configuration information of video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 14

| Element or Attribute Name | Use | Description |
|---|---|---|
| Common attributes and elements | | |
| @profile | O | specifies the profiles which the associated Representation(s) conform to of the list of Media Presentation profiles as described in 8. The value shall be a subset of the respective value in any higher level of the document hierarchy (Representation, Adaptation Set, MPD). |
| ... | . | ... |
| @HDRFlag | O | Flag to indicate that the video media component supports HDR |
| @HDRTypeTransitionFlag | OD default:false | If not present it is false. If present and set to true, it includes the transition from the current HDR video media component or that includes the transition from the current HDR type (e.g HDR type #1 → oeft:3, max_lum:100, min_lum:0.5, max_frame_lum:0, max_pixel_lum:0) to other HDR types (e.g. HDR type #2 → oeft:1, max_lum:1000, min_lum:0.05, max_frame_lum:0, max_pixel_lum:0) in video media component. In other words, in case of different HDR types, one/or more value(s) of attributes/elements to compose HDR should be different. |
| @HDRSDRTransitionFlag | OD default:false | If not present it is false. If present and set to true, it includes the end of the current HDR video media component or that includes the transition from HDR to SDR in video media component |
| @SDRHDRTransitionFlag | OD default:false | If not present it is false. If present and set to true, it includes the end of the current SDR video media component or that includes the transition from SDR to HDR in video media component |
| @SDRCompatibility | O | Flag to indicate that the video media component can be compatible with SDR |
| @OETF | O | non-negative integer in decimal representation providing the identifier for opto-electronic transfer function of source picture of video media component. |
| @maxLuminance | O | non-negative integer in decimal representation expressing the peak luminance of mastering display. It can be from 100 to 10000. |
| @minLuminance | O | non-negative fractional value in decimal representation expressing the minimum luminance of mastering display. It can be from 0 to 0.10. |
| @maxFrameLuminance | O | non-negative integer in decimal representation expressing maximum value of average luminance of a frame of video media component |
| @maxPixelLuminance | O | non-negative integer in decimal representation expressing the luminance of the brightest pixel of video media component |
| @minPixelLuminance | M | non-negative integer in decimal representation expressing the luminance of the darkest pixel in video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 15

| Element or Attribute Name | Use | Description |
|---|---|---|
| Common attributes and elements | | |
| @profile | O | specifies the profiles which the associated Representation(s) conform to of the list of Media Presentation profiles as described in 8. The value shall be a subset of the respective value in any higher level of the document hierarchy (Representation, Adaptation Set, MPD). |
| ... | . | ... |
| @HDRType | O | One set can be configured using a combination of HDR related parameters, and a set can be identified with @HDRType. For example, Type A can be composed of a combination of EOTF of SMPTE ST.2084, bitdepth of 10 bits/pixel, peak luminance of 1000 nit, codec of HEVC single codec, metadata of SMPTE ST.2086. 0: unspecified, 1: Type A, 2: Type B, 3: Type 3,... Values of OETF, maxLuminance, minLuminance, maxFrameLuminance, maxPixelLuminance, and minPixelLuminance are mandatorily included in the case of "unspecified" in which HDR type is 0, and the values of OETF, maxLuminance, minLuminance, maxFrameLuminance, maxPixelLuminance, and minPixelLuminance may not be included, may be optionally included or may be repeatedly included if the type has been determined. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 16

```
<EssentialProperty schemeIdUri="urn:mpeg:dash:hdr:201x"
value="3, 100, 0.5, 50, 100, 0.5, true, false, false, true"/>
```
— L16010

```
 <xs:attribute name="OETF" type="xs:anyURI" use="required"/>
   <xs:attribute name="maxLuminance"
type="xs:unsignedInt" use="required"/>
   <xs:attribute name="minLuminance"
type="xs:double" use="required"/>
   <xs:attribute name="maxFrameLuminance"
type="xs:unsignedInt" use="required"/>
   <xs:attribute name="maxPixelLuminance" type="xs:unsignedInt
use="required"/>
   <xs:attribute name="minPixelLuminance" type="xs:unsignedInt
use="required"/>
   <xs:attribute name="HDRTypeTransitionFlag"
type="xs:boolean"/>
   <xs:attribute name="HDRSDRTransitionFlag" type="xs:boolean"/>
   <xs:attribute name="SDRHDRTransitionFlag" type="xs:boolean"/>
   <xs:attribute name="SDRCompatibility" type="xs:boolean"/>
```
— L16020

```
<EssentialProperty schemeIdUri="urn:mpeg:dash:hdr:201x"
value="1" OETF="3" maxLuminance="100"
minLuminance="0.5" maxFrameLuminance="50"
maxPixelLuminance="100" minPixelLuminance="0.5"
HDRTypeTransitionFlag="true"
HDRSDRTransitionFlag="false" SDRHDRTransitionFlag
="false" SDRCompatibility="true" />
```
— L16030

FIG. 17

<EssentialProperty schemeIdUri="urn:mpeg:dash:hdr:201x" value="0"/> ⸺ L17010

<xs:attribute name="HDRType" type="xs:boolean"/> ⸺ L17020

<EssentialProperty schemeIdUri="urn:mpeg:dash:hdr:201x" value="1" HDRType="0" /> ⸺ L17030

FIG. 18

@value = OETF ","max_luminance "," min_luminance "," max_frame_luminance ","
max_pixel_luminance [","HDR_type_transition] [","HDR_SDR_transition] [","
SDR_HDR_transition] [","SDR_compatibility]
OETF = "oetf:" OETF_func
OETF_func = (%d1 -%d15) ;decimal numbers 1 through 15
max_luminance ="max_lum" ":" 5*digit
min_luminance ="min_lum" ":" 1*digit "." 2*digit
max_frame_luminance ="max_frame_lum" ":" 5*digit
max_pixel_luminance ="max_pixel_lum" ":" 5*digit
min_pixel_luminance ="min_pixel_lum" ":" 5*digit
HDR_type_transition="HDR_type_trans" ":" BIT; default value 0
HDR_SDR_transition="HDR_SDR_trans" ":" BIT; default value 0
SDR_HDR_transition="SDR_HDR_trans" ":" BIT; default value 0
SDR_compatibility ="SDR_com" ":" BIT; default value 0
BIT = "0" | "1"    — L18010

| OETF_func value | Meaning |
|---|---|
| 0 | Reserved |
| 1 | ITU-R BT.1886 |
| 2 | ITU-R REC.709 |
| 3 | ITU-R BT.2020 |
| 4-15 | Reserved for future use |

— L18020

<Accessibility schemeIdUri="urn:mpeg:dash:hdr:201x" value="oeft:3,
max_lum:100, min_lum:0.5, max_frame_lum:50, max_pixel_lum:100,
min_pixel_lum: 0.5 HDR_type_trans:1, HDR_SDR_trans:0, SDR_HDR_trans:0,
SDR_com:1"/>    — L18030

FIG. 19

@value = [","HDR_type]
HDR_type = "hdr_type:"
HDR_type = (%d1 -%d15) ;decimal numbers 1 through 15
BIT = "0" | "1"
digit = "0" | "1" | "2" | "3" | "4" | "5" | "6" | "7" | "8" | "9"    — L19010

<Accessibility schemeIdUri="urn:mpeg:dash:hdr:201x" value="HDR_type:0"/>    — L19020

FIG. 20

| Element or Attribute Name | Use | Description |
|---|---|---|
| ContentComponent | | description of a content component |
| @id | O | specifies an identifier for this media component. The attribute shall be unique in the scope of the containing Adaptation Set. |
| ... | . | ... |
| @HDRFlag | O | Flag to indicate that the video media component supports HDR |
| @HDRTypeTransitionFlag | OD default:false | If not present it is false. If present and set to true, it includes the end of the current HDR video media component or that includes the transition from the current HDR type (e.g HDR type #1 → oeft:3, max_lum:100, min_lum:0.5, max_frame_lum:0, max_pixel_lum:0) to other HDR types (e.g. HDR type #2 → oeft:1, max_lum:1000, min_lum:0.05, max_frame_lum:0, max_pixel_lum:0) in video media component. In other words, in case of different HDR types, one/or more value(s) of attributes/elements to compose HDR should be different. |
| @HDRSDRTransitionFlag | OD default:false | If not present it is false. If present and set to true, it includes the end of the current HDR video media component or that includes the transition from HDR to SDR in video media component |
| @SDRHDRTransitionFlag | OD default:false | If not present it is false. If present and set to true, it includes the end of the current SDR video media component or that includes the transition from SDR to HDR in video media component |
| @SDRCompatibility | O | Flag to indicate that the video media component can be compatible with SDR |
| Accessibility | 0...N | specifies information about accessibility scheme |
| ... | . | ... |
| HDRConfiguration | 0...N | specifies HDR configuration information of video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 21

| Element or Attribute Name | Use | Description |
|---|---|---|
| ContentComponent | | description of a content component |
| @id | O | specifies an identifier for this media component. The attribute shall be unique in the scope of the containing Adaptation Set. |
| ... | . | ... |
| @HDRType | O | One set can be configured using a combination of HDR related parameters, and a set can be identified with @HDRType. For example, Type A can be composed of a combination of EOTF of SMPTE ST.2084, bitdepth of 10 bits/pixel, peak luminance of 1000 nit, codec of HEVC single codec, metadata of SMPTE ST.2086. 0: unspecified, 1: Type A, 2: Type B, 3: Type 3,... Values of OETF, maxLuminance, minLuminance, maxFrameLuminance, maxPixelLuminance, and minPixelLuminance included in HDRConfiguration are mandatorily included in the case of "unspecified" in which HDR type is 0, and the values of OETF, maxLuminance, minLuminance, maxFrameLuminance, and maxPixelLuminance, minPixelLuminance may not be included, may be optionally included or may be repeatedly included if the type has been determined. |
| Accessibility | 0...N | specifies information about accessibility scheme |
| ... | . | ... |
| HDRConfiguration | 0...N | specifies HDR configuration information of video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 22

| Element or Attribute Name | Use | Description |
|---|---|---|
| SegmentBase Segment Base Information | | specifies Segment base element This element also specifies the type for the Segment base information that is the base type for other elements. |
| @timescale | O | This element also specifies the type for the Segment base information that is the base type for other elements. |
| ... | . | ... |
| @HDRFlag | O | Flag to indicate that the video media component supports HDR |
| @HDRTypeTransitionFlag | OD default:false | If not present it is false. If present and set to true, it includes the end of the current HDR video media component or that includes the transition from the current HDR type (e.g HDR type #1 → oeft:3, max_lum:100, min_lum:0.5, max_frame_lum:0, max_pixel_lum:0.05, max_frame_lum:0, max_pixel_lum:0) to other HDR types (e.g. HDR type #2 → oeft:1, max_lum:1000, min_lum:0, max_frame_lum:0, max_pixel_lum:0) in video media component. In other words, in case of different HDR types, one/or more value(s) of attributes/elements to compose HDR should be different. |
| @HDRSDRTransitionFlag | OD default:false | If not present it is false. If present and set to true, it includes the end of the current HDR video media component or that includes the transition from HDR to SDR in video media component |
| @SDRHDRTransitionFlag | OD default:false | If not present it is false. If present and set to true, it includes the end of the current SDR video media component or that includes the transition from SDR to HDR in video media component |
| @SDRCompatibility | O | Flag to indicate that the video media component can be compatible with SDR |
| Initialization | 0...1 | specifies the URL including a possible byte range for the Initialization Segment. |
| ... | . | ... |
| HDRConfiguration | 0...N | specifies HDR configuration information of video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 23

| Element or Attribute Name | Use | Description |
|---|---|---|
| SegmentBase<br>Segment Base Information | | specifies Segment base element<br>This element also specifies the type for the Segment base information that is the base type for other elements. |
| @timescale | O | specifies the timescale in units per seconds to be used for the derivation of different real-time duration values in the Segment Information. |
| ... | . | ... |
| @HDRType | O | One set can be configured using a combination of HDR related parameters, and a set can be identified with @HDRType. For example, Type A can be composed of a combination of EOTF of SMPTE ST.2084, bitdepth of 10 bits/pixel, peak luminance of 1000 nit, codec of HEVC single codec, metadata of SMPTE ST.2086.<br>0: unspecified, 1: Type A, 2: Type B, 3: Type 3,...<br>Values of OETF, maxLuminance, minLuminance, maxFrameLuminance, maxPixelLuminance, and minPixelLuminance included in HDRConfiguration are mandatorily included in the case of "unspecified" in which HDR type is 0, and the values of OETF, maxLuminance, minLuminance, maxFrameLuminance, and maxPixelLuminance, minPixelLuminance may not be included, may be optionally included or may be repeatedly included if the type has been determined. |
| @HDRType | 0..1 | specifies the URL including a possible byte range for the Initialization Segment. |
| ... | . | ... |
| HDRConfiguration | 0...N | specifies HDR configuration information of video media component |
| Legend:<br>For attributes: M=Mandatory, O=Optional, OD=Optional with Default Value, CM=Conditionally Mandatory.<br>For elements: <minOccurs>...<maxOccurs> (N=unbounded)<br>Elements are bold; attributes are non-bold and preceded with an @. | | |

FIG. 24

| Element or Attribute Name | Use | Description |
|---|---|---|
| AdaptationSet | | Adaptation Set description |
| @xlink:href | O | specifies a reference to a remote element entity that shall contain exactly one element of type AdaptationSet |
| ... | . | ... |
| @minDisplayLuminance | O | specifies the minimum mastering display luminance value of all Representations in this Adaptation Set. If not present, the value is unknown. |
| @maxDisplayLuminance | O | specifies the maximum mastering display luminance value of all Representations in this Adaptation Set. If not present, the value is unknown. |
| @maxAFLuminance | O | specifies the maximum average frame luminance level value of all Representations in this Adaptation Set. If not present, the value is unknown. |
| @maxCPLuminance | O | specifies the maximum content pixel luminance value of all Representations in this Adaptation Set. If not present, the value is unknown. |
| @minCPLuminance | O | specifies the minimum content pixel luminance value of all Representations in this Adaptation Set. If not present, the value is unknown. |
| ... | . | ... |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 25

| Element or Attribute Name | Use | Description |
|---|---|---|
| AdaptationSet | | Adaptation Set description |
| @xlink:href | O | specifies a reference to a remote element entity that shall contain exactly one element of type AdaptationSet |
| ... | . | ... |
| @minDisplayLuminance | O | specifies the minimum @minLuminance value in all Representations in this Adaptation Set. This value can have the same units as the @minLuminance attribute. If not present, the value is unknown. |
| @maxDisplayLuminance | O | specifies the maximum @maxLuminance value in all Representations in this Adaptation Set. This value can have the same units as the @maxLuminance attribute. If not present, the value is unknown. |
| @maxAFLuminance | O | specifies the maximum @maxFrameLuminance value in all Representations in this Adaptation Set. This value can have the same units as the @maxFrameLuminance attribute in Representation. If not present, the value is unknown. |
| @maxCPLuminance | O | specifies the maximum @maxPixelLuminance value in all Representations in this Adaptation Set. This value can have the same units as the @maxPixelLuminance attribute in Representation. If not present, the value is unknown. |
| @minCPLuminance | O | specifies the minimum @maxPixelLuminance value in all Representations in this Adaptation Set. This value can have the same units as the @maxPixelLuminance attribute in Representation. If not present, the value is unknown. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 26

| Element or Attribute Name | Use | Description |
|---|---|---|
| AdaptationSet | | Adaptation Set description |
| @xlink:href | O | specifies a reference to a remote element entity that shall contain exactly one element of type AdaptationSet |
| ... | . | ... |
| @minDisplayLuminance | O | specifies the minimum mastering display luminance value of all Representations in this Adaptation Set. If not present, the value is unknown. |
| @maxDisplayLuminance | O | specifies the maximum mastering display luminance value of all Representations in this Adaptation Set. If not present, the value is unknown. |
| @maxAFLuminance | O | specifies the maximum average frame luminance level value of all Representations in this Adaptation Set. If not present, the value is unknown. |
| @maxDisplayLuminance | O | specifies the maximum content pixel luminance value of all Representations in this Adaptation Set. If not present, the value is unknown. |
| @minCPLuminance | O | specifies the minimum content pixel luminance value of all Representations in this Adaptation Set. If not present, the value is unknown. |
| @HDRType | O | One set can be configured using a combination of HDR related parameters, and a set can be identified with @HDRType. For example, Type A can be composed of a combination of EOTF of SMPTE ST.2084, bitdepth of 10 bits/pixel, peak luminance of 1000 nit, codec of HEVC single codec, metadata of SMPTE ST.2086. 0: unspecified, 1: Type A, 2: Type B, 3: Type 3,... However, @minDisplayLuminance, @maxDisplayLuminance, @maxAFLuminance, @maxCPLuminance and @minCPLuminance may be included irrespective of HDR type. |
| ... | . | ... |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 31

| Element or Attribute Name | Use | Description |
|---|---|---|
| HDRMetadataSet | | specifies HDR metadata set description. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |
| Legend:<br>    For attributes: M=Mandatory, O=Optional, OD=Optional with Default Value, CM=Conditionally Mandatory.<br>    For elements: <minOccurs>...<maxOccurs> (N=unbounded)<br>Elements are bold; attributes are non-bold and preceded with an @. | | |

— L31010

```
<xs:element name="HDRMetadataSet" type="DescriptorType" minOccurs="0" maxOccurs="unbounded"/>
<!-- Descriptor -->
 <xs:complexType name="DescriptorType">
  <xs:sequence>
   <xs:any namespace="##other" processContents="lax" minOccurs="0" maxOccurs="unbounded"/>
  </xs:sequence>
  <xs:attribute name="schemeIdUri" type="xs:anyURI" use="required"/>
  <xs:attribute name="value" type="xs:string"/>
  <xs:attribute name="id" type="xs:string"/>
  <xs:anyAttribute namespace="##other" processContents="lax"/>
 </xs:complexType>
```

| Scheme Identifier (@schmeIdUri) | Informative description |
|---|---|
| urn:mpeg:dash:hdrmset-all:201x | Scheme identifier for HDR Metadata Description |

— L32010

| @value | Use | Description | |
|---|---|---|---|
| HDRDynamicRangeType | 0 | refers to the dynamic range of presented video when HDR metadata is added to SDR content and HDR service is provided. Alternatively, residual data of an enhancement layer as well as HDR metadata may be included in SDR content to signal the dynamic range of video to be presented. This signals the luminance range of a reference monitor determined in SMPTE when it has a value of 1, and other values can use standard values determined in the future. | |
| HDRLuminanceMax | 0 | refers to a maximum luminance value that can be represented in a master display | |
| HDRLuminanceMin | 0 | refers to a minimum luminance value that can be represented in a master display | |
| HDREOTFType | 0 | indicates the type of an EOTF function of HDR video generated by additionally applying HDR related metadata to base layer video. Although an additional EOTF may not be necessary (0), in general, the EOTF may be required when a receiver is separated or depending on display type. This field may be extended to include an arbitrary EOTF. | |
| HDRMaxFrameLuminance | 0 | However, if HDRMaxFrameLuminance is applied to one frame, this field indicates average luminance corresponding to one frame. DRTransformCurveType: indicates a dynamic range transformation curve. The actual value can be defined as in DR transformation curve type embodiment of [Table 2]. | — L32020 |
| HDRMaxPixelLuminance | 0 | non-negative integer in decimal representation expressing the luminance of the brightest pixel of HDR video media component | |
| HDRMinPixelLuminance | 0 | non-negative integer in decimal representation expressing the luminance of the darkest pixel of HDR video media component | |
| DRTransformCurveType | M | indicates a dynamic range transformation curve. The actual value can be defined as in DR transformation curve type embodiment of [Table 2]. | |
| numOfSectionsPlus1 | 0 | has a value when DRTransitionCurveType has a value in the range of 0 to 4. When the corresponding function is divided into intersections, this field indicates the number of intersections. IntersectionX, intersection, gain, offset and coeffA can be optionally included depending on the value of numOfSections according to function type. When the function is not divided into sections, numOfSections is 0 and numOfSectionsPlus1 is 1. | Set type#1: DRTransform CurveType = 0 ~ 4 |
| SectionNum | 0 | indicates the number of the current section in the total numOfSections. This starts from 0. | |
| intersectionX | 0 | this can be included when DRTransformCurveType is 3 or 4. This is not included when DRTransformCurveType is 0, 1 or 2. When there are two intersections, the first intersectionX has a value and the second intersectionX may not have a value. | — L32030 |
| intersectionY | 0 | this can be included when DRTransformCurveType is 4. this is not included when DRTransformCurveType is 0, 1, 2 or 3. When there are two intersections, the first intersectionY has a value and the second intersectionY may not have a value. | |
| gain | 0 | this can be included when DRTransformCurveType is 0, 1, 2, 3 or 4. | |
| offset | 0 | this can be included when DRTransformCurveType is 0, 1, 2, 3 or 4. | |
| coeffA | 0 | this can be included when DRTransformCurveType is 1, 2, 3 or 4. This is not included when DRTransformCurveType is 0. | |

FIG. 33

Set type#2: DRTransformCurveType = 5 — L33010

| @value | Use | Description |
|---|---|---|
| entryLength | O | indicates the entry length of a look-up table. Values of inValue and outValue are repeatedly included according to the value of entryLength. |
| entryNum | O | includes the number of the current entry in the total entry length. |
| inValue | O | this can have a value when DRTransformCurveType is 5. This corresponds to an input value for transforming SDR content into HDR. |
| outValue | O | this can have a value when DRTransformCurveType is 5. This corresponds to a converted output value when an input value for transforming SDR content to HDR is received. |
| HDRTypeTransition | OD default:false | indicates whether HDR type changes in the corresponding media component or the next media component. Here, HDR type change means that an attribute value of an element changes or an attribute value changes. <br> - HDR type #1 → oeft:3, max_lum:100, min_lum:0.5, max_frame_lum:0, max_pixel_lum:0) <br> - HDR type #2 → oeft:1, max_lum:1000, min_lum:0.05, max_frame_lum:0, max_pixel_lum:0 |
| HDRStart | OD default:false | indicates whether an SDR video media component includes an HDR change start point using HDRMetadataSet. |
| HDREnd | OD default:false | indicates whether an SDR video media component includes a part to which HDRMetadataSet is not applied. |

— L33020

Legend:
For attributes: M=Mandatory, O=Optional, OD=Optional with Default Value, CM=Conditionally Mandatory.

<HDRMatadataSet schemeIdUri="urn:mpeg:dash:hdrmtset:201x" value="1, 1000, 0.1, 3, 300, 1000, 0.1, 1, 0, , , 2, 10, " /> — L33030

FIG. 34

| HDRDynamicRangeType (Same applies to SDRDynamicRangeType) | Description |
|---|---|
| 0000 | reserved |
| 0001 | SMPTE XXXX-201X-1 Reference Display for HDTV Images |
| 0100-0111 | reserved |
| 1000 | User define |
| 1011-1111 | Private use |

| DRTransformationCurveType | Description |
|---|---|
| 0 | Linear function |
| 1 | Logarithmic function |
| 2 | Exponential function |
| 3 | Inverse s-curve |
| 4 | Piecewise non-linear curves |
| 5 | Look-up table |
| 6-15 | Reserved |

FIG. 35

| Scheme Identifier (@schmeIdUri) | Informative description |
|---|---|
| urn:mpeg:dash:hdrmset:201x | Scheme identifier for HDR Metadata Set Description |

L35010

| @value | Use | Description |
|---|---|---|
| HDRDynamicRangeType | O | refers to the dynamic range of presented video when HDR metadata is added to SDR content and HDR service is provided. Alternatively, residual data of an enhancement layer as well as HDR metadata may be included in SDR content to signal the dynamic range of video to be presented. This signals the luminance range of a reference monitor determined in SMPTE when it has a value of 1, and other values can use standard values determined in the future. |
| HDRLuminanceMax | O | refers to a maximum luminance value that can be represented in a master display |
| HDRLuminanceMin | O | refers to a minimum luminance value that can be represented in a master display |
| HDREOTFType | O | indicates the type of an EOTF function of HDR video generated by additionally applying HDR related metadata to base layer video. Although an additional EOTF may not be necessary (0), in general, the EOTF may be required when a receiver is separated or depending on display type. This field may be extended to include an arbitrary EOTF. |
| HDRMaxFrameLuminance | O | non-negative integer in decimal representation expressing maximum value of average luminance of a frame of HDR video media component. However, if HDRMaxFrameLuminance is applied one frame, this field indicates average luminance corresponding to one frame. |
| HDRMaxPixelLuminance | O | non-negative integer in decimal representation expressing the luminance of the brightest pixel of HDR video media component |
| HDRMinPixelLuminance | O | non-negative integer in decimal representation expressing the luminance of the darkest pixel of HDR video media component |
| DRTransformCurveType | M | indicates a dynamic range transformation curve. The actual value can be defined as in DR transformation curve type embodiment of [Table 2]. |
| HDRTypeTransition | OD default:false | indicates whether HDR type is changed in the corresponding media component or the next media component. Here, HDR type change means that an attribute value of an element changes or an attribute value changes.<br>- HDR type #1 → oeft:3, max_lum:100, min_lum:0.5, max_frame_lum:0, max_pixel_lum:0<br>- HDR type #2 → oeft:1, max_lum:1000, min_lum:0.05, max_frame_lum:0, max_pixel_lum:0 |
| HDRStart | OD default:false | indicates whether an SDR video media component includes an HDR change start point using HDRMetadataSet. |
| HDREnd | OD default:false | indicates whether an SDR video media component includes a part to which HDRMetadataSet is not applied. |
| Legend:<br>For attributes: M=Mandatory, O=Optional, OD=Optional with Default Value, CM=Conditionally Mandatory. | | |

L35020

| HDREOTFType | Meaning |
|---|---|
| 0 | reserved |
| 1 | ITU-R BT.1886 |
| 2 | ITU-R REC.709 |
| 3 | ITU-R BT.2020 |
| 4-15 | Reserved Future use |

| Element or Attribute Name | Use | Description |
|---|---|---|
| DRTransformationCurveSet | | specifies DRTransformationCurveSet description. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |
| Legend: For attributes: M=Mandatory, O=Optional, OD=Optional with Default Value, CM=Conditionally Mandatory. For elements: <minOccurs>...<maxOccurs> (N=unbounded) Elements are bold; attributes are non-bold and preceded with an @. | | |

— L36010

| Scheme Identifier (@schmeIdUri) | Informative description |
|---|---|
| urn:mpeg:dash:drtcurveset:201x | Scheme identifier for dynamic range transform curve set description |

— L36020

| @value | Use | Description |
|---|---|---|
| numOfSectionsPlus1 | O | this can have a value when DRTransitionCurveType has a value in the range of 0 to 4. When the corresponding function is divided into intersections, this field indicates the number of intersections. IntersectionX, intersection, gain, offset and coeffA can be optionally included depending on the value of numOfSections according to function type. When the function is not divided into sections, numOfSections is 0 and numOfSectionsPlus1 is 1. |
| SectionNum | O | indicates the number of the current section in the total numOfSections. This starts from 0. |
| intersectionX | O | This can be included when DRTransformCurveType is 3 or 4. This is not included when DRTransformCurveType is 0, 1 or 2. When there are two intersections, the first intersectionX has a value and the second intersectionX may not have a value. |
| intersectionY | O | This can be included when DRTransformCurveType is 4. This is not included when DRTransformCurveType is 0, 1, 2 or 3. When there are two intersections, the first intersectionY has a value and the second intersectionY may not have a value. |
| gain | O | this can be included when DRTransformCurveType is 0, 1, 2, 3 or 4. |
| offset | O | this can be included when DRTransformCurveType is 0, 1, 2, 3 or 4. |
| coeffA | O | this can be included when DRTransformCurveType is 1, 2, 3 or 4. This is not included when DRTransformCurveType is 0. |
| Legend: For attributes: M=Mandatory, O=Optional, OD=Optional with Default Value, CM=Conditionally Mandatory. | | |

| Element or Attribute Name | Use | Description |
|---|---|---|
| DRTransformationLUTSet | | specifies DRTransformationLUTSet description. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |
| Legend: For attributes: M=Mandatory, O=Optional, OD=Optional with Default Value, CM=Conditionally Mandatory. For elements: <minOccurs>...<maxOccurs> (N=unbounded) Elements are bold; attributes are non-bold and preceded with an @. | | |

— L37010

| Scheme Identifier (@schmeIdUri) | Informative description |
|---|---|
| urn:mpeg:dash:drtlutset:201x | Scheme identifier for dynamic range transformation look-up table set description |

— L37020

| @value | Use | Description |
|---|---|---|
| entryLength | O | indicates the entry length of a look-up table. Values of inValue and outValue are repeatedly included according to the value of entryLength. |
| entryNum | O | includes the number of the current entry in the total entry length. |
| inValue | O | this can have a value when DRTransformCurveType is 5. This corresponds to an input value for transforming SDR content into HDR. |
| outValue | O | this can have a value when DRTransformCurveType is 5. This corresponds to a converted output value when an input value for transforming SDR content into HDR is received. |
| Legend: For attributes: M=Mandatory, O=Optional, OD=Optional with Default Value, CM=Conditionally Mandatory. | | |

| Element or Attribute Name | Use | Description |
|---|---|---|
| SDRMetadata | | specifies SDR metadata description. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |
| Legend: For attributes: M=Mandatory, O=Optional, OD=Optional with Default Value, CM=Conditionally Mandatory. For elements: <minOccurs>...<maxOccurs> (N=unbounded) Elements are bold; attributes are non-bold and preceded with an @. | | |

— L38010

| Scheme Identifier (@schmeIdUri) | Informative description |
|---|---|
| urn:mpeg:dash:sdrmatadata:201x | Scheme identifier for SDR Metadata Description |

— L38020

| @value | Use | Description |
|---|---|---|
| SDRDynamicRangeType | O | refers to the dynamic range of base layer video. This signals the luminance range of the reference monitor determined in SMPTE when having a value of 1, and other values can use standard values determined in the future. This may signal an arbitrary value when having a value of 2. |
| SDRLuminanceMax | O | efers to a maximum luminance value that can be represented in SDR master display. |
| SDRLuminanceMin | O | refers to a minimum luminance value that can be represented in SDR master display. |
| SDREOTFType | O | indicates the type of EOTF function used to encode SDR video. In general, a widely used EOTF such as ITU-R BT.1886 and REC.709 is delivered using VUI information, and the value of this field needs to designate the same EOTF as the corresponding part of VUI. This field may be extended to include an arbitrary EOTF. |
| SDRMaxFrameLuminance | O | non-negative integer in decimal representation expressing maximum value of average luminance of a frame of SDR video media component |
| SDRMaxPixelLuminance | O | non-negative integer in decimal representation expressing the luminance of the brightest pixel of SDR video media component |
| SDRMinPixelLuminance | O | non-negative integer in decimal representation expressing the luminance of the darkest pixel of SDR video media component |
| Legend: For attributes: M=Mandatory, O=Optional, OD=Optional with Default Value, CM=Conditionally Mandatory. | | |

— L38020

<SDRMetadata schemeIdUri="urn:mpeg:dash:sdrmetadata:201x" value="1, 100, 0.5, 2, 30, 100, 0.1"/>  — L38040

FIG. 39

| Element or Attribute Name | Use | Description |
|---|---|---|
| Subset | | specifies a Subset |
| @contains | M | specifies the Adaptation Sets contained in a Subset by providing a white-space separated list of the @id values of the contained Adaptation Sets. |
| @id | O | specifies a unique identifier for the Subset. |
| @HDRTypeTransition | OD default:false | indicates whether HDR type changes in the corresponding subset or the next subset. Here, HDR type change means that an attribute value of an element changes or an attribute value changes.<br>- HDR type #1 → oeft:3, max_lum:100, min_lum:0.5, max_frame_lum:0, max_pixel_lum:0)<br>- HDR type #2 → oeft:1, max_lum:1000, min_lum:0.05, max_frame_lum:0, max_pixel_lum:0 |
| @HDRStart | OD default:false | indicates whether an SDR video media component includes an HDR change start point using HDRMetadataSet. |
| @HDREnd | OD default:false | indicates whether an SDR video media component includes a part to which HDRMetadataSet is not applied. |
| HDRMetadataSet | 0...N | specifies HDR metadata set information of video media component |
| DRTransformationCurveSet | 0...N | specifies dynamic range transformation curve set information of video media component |
| DRTransformationLUTSet | 0...N | specifies dynamic range transformation look-up table set information of video media component |
| SDRMetadata | 0...N | specifies metadata information for original SRD video media component |
| Legend:<br>  For attributes: M=Mandatory, O=Optional, OD=Optional with Default Value, CM=Conditionally Mandatory.<br>  For elements: <minOccurs>..<maxOccurs> (N=unbounded)<br>Elements are bold; attributes are non-bold and preceded with an @. | | |

FIG. 40

| Element or Attribute Name | Use | Description |
|---|---|---|
| HDRMetadataProperty | | specifies HDR metadata property description. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |
| Legend: For attributes: M=Mandatory, O=Optional, OD=Optional with Default Value, CM=Conditionally Mandatory. For elements: <minOccurs>...<maxOccurs> (N=unbounded) Elements are bold; attributes are non-bold and preceded with an @. | | |

— L40010

```
<xs:element name="HDRMetadataProperty" type="DescriptorType" minOccurs="0" maxOccurs="unbounded"/>
<!-- Descriptor -->
<xs:complexType name="DescriptorType">
  <xs:sequence>
    <xs:any namespace="##other" processContents="lax" minOccurs="0" maxOccurs="unbounded"/>
  </xs:sequence>
  <xs:attribute name="schemeIdUri" type="xs:anyURI" use="required"/>
  <xs:attribute name="value" type="xs:string"/>
  <xs:attribute name="id" type="xs:string"/>
  <xs:anyAttribute namespace="##other" processContents="lax"/>
</xs:complexType>
```

```
<HDRMetadataProperty schemeIdUri = "urn:mpeg:dash:hdrmset:201x" value = "1, 1000, 0.1, 3, 300, 1000, 0.1, 0, false, false, false"/>
<HDRMetadataProperty schemeIdUri = "urn:mpeg:dash:drtcurveset:201x" value = "1, 0, , , 10, 3, "/>
<HDRMetadataProperty schemeIdUri = "urn:mpeg:dash:sdrmatadata:201x" value = "1, 100, 0, 2, 0, 0 "/>
```
------------------------------------------------------------
```
<HDRMetadataProperty schemeIdUri = "urn:mpeg:dash:hdrmset:201x" value = "1, 1000, 0.1, 3, 300, 1000, 0.1, 0, false, false, false"/>
<HDRMetadataProperty schemeIdUri = "urn:mpeg:dash:drtlutset:201x" value = "10, 1, 1, 10, 10, 2, 4, 79, ..., 10, 10, 30, 930"/>  ⎯⎯ L41010
<HDRMetadataProperty schemeIdUri = "urn:mpeg:dash:sdrmatadata:201x" value = "1, 100, 0, 2, 0, 0 "/>
```

```
HDRMetadataSet → @schemeIdUri = "urn:mpeg:dash:hdrmset:201x" @value='1'
DRTCurveSet → @schemeIdUri = "urn:mpeg:dash:drtcurveset:201x" @value='1'
DRTLUTSet → @schemeIdUri = "urn:mpeg:dash:drtlutset:201x" @value='1'    ⎯⎯ L41020
SDRMetadata → @schemeIdUri = "urn:mpeg:dash:sdrmetadata:201x" @value='1'
(@value can indicate the version of these descriptors)
```

```
<xs:attribute name="isMetadata" type="xs:string"/>
<xs:attribute name="HDRDynamicRangeType" type="xs:string"/>
<xs:attribute name="HDRLuminanceMax" type="xs:string"/>
<xs:attribute name="HDRLuminanceMin" type="xs:string"/>
<xs:attribute name="HDREOTFType" type="xs:string"/>
<xs:attribute name="HDRMaxFrameLuminance" type="xs:string"/>
<xs:attribute name="HDRMinPixelLuminance " type="xs:string"/>
<xs:attribute name="HDRMaxPixelLuminance " type="xs:string"/>         ⎯⎯ L41030
<xs:attribute name="DRTransformCurveType" type="xs:string"/>
<xs:attribute name="HDRTypeTransition" type="xs:boolean"/>
        ......

< HDRMetadataProperty schemeIdUri = "urn:mpeg:dash:hdrmset:201x" value="1"
isMetadata="1" HDRDynamicRnageType="1" HDRLuminanceMax="1000" HDRLuminanceMin="0.1"
HDREOTFType="3" HDRMaxFrameLuminance="300" HDRMaxPixelLuminance="1000"
HDRMinPixelLuminance="0.1 "DRTransformCurveType="4" HDRTypeTransition="false" HDRStart="false"
HDREnd="false"/>
< HDRMetadataProperty schemeIdUri = "urn:mpeg:dash:drtcurveset:201x" value ="1" sectionNum="2"
intersectionX ="10" intersectionY ="100" gain="2" offset="10" offset ="5" intersectionX =" " intersectionY ="
" gain="2" offset="10" offset ="10" />
```

FIG. 42

| Element or Attribute Name | Use | Description |
|---|---|---|
| HDRMetadata | | |
| @HDRDynamicRangeType | O | : refers to the dynamic range of presented video when HDR metadata is added to SDR content and HDR service is provided. Alternatively, residual data of an enhancement layer as well as HDR metadata may be included in SDR content to signal the dynamic range of video to be presented. This signals the luminance range of a reference monitor determined in SMPTE when it has a value of 1, and other values can use standard values determined in the future. |
| @HDRLuminanceMax | O | refers to a maximum luminance value that can be represented in a master display |
| @HDRLuminanceMin | O | refers to a minimum luminance value that can be represented in a master display |
| @HDREOTFType | O | indicates the type of an EOTF function of HDR video generated by additionally applying HDR related metadata to base layer video. Although an additional EOTF may not be necessary (0), in general, the EOTF may be required when a receiver is separated or depending on display type. This field may be extended to include an arbitrary EOTF. |
| @HDRMaxFrameLuminance | O | non-negative integer in decimal representation expressing maximum value of average luminance of a frame of HDR video media component. However, if HDRMaxFrameLuminance is applied one frame, this field indicates average luminance corresponding to one frame. |
| @HDRMaxPixelLuminance | O | non-negative integer in decimal representation expressing the luminance of the brightest pixel of HDR video media component |
| @HDRMinPixelLuminance | O | non-negative integer in decimal representation expressing the luminance of the darkest pixel of HDR video media component |
| @DRTransformCurveType | M | indicates a dynamic range transformation curve. The actual value can be defined as in DR transformation curve type embodiment of [Table 2]. |
| DRTC | 0...N | includes information about a transformation curve for transforming SDR video into HDR. |
| DRTLUT | 0...N | includes information about a transformation look-up table for transforming SDR video into HDR. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 43

| Element or Attribute Name | | | Use | Description |
|---|---|---|---|---|
| DRTC | | | | includes information about a transformation curve for transforming SDR video into HDR. |
| | DRTCSection | | | when intersections of a transformation curve for transforming SDR video into HDR are separated into multiple intersections, an attribute is provided for each intersection. |
| | | @sectionNum | | this indicates the number of the current section. |
| | | @intersectionX | | This can be included when DRTransformCurveType is 3 or 4. This is not included when DRTransformCurveType is 0, 1 or 2. When there are two intersections, the first intersectionX has a value and the second intersectionX may not have a value. |
| | | @intersectionY | | This can be included when DRTransformCurveType is 4. This is not included when DRTransformCurveType is 0, 1, 2 or 3. When there are two intersections, the first intersectionY has a value and the second intersectionY may not have a value. |
| | | @gain | | this can be included when DRTransformCurveType is 0, 1, 2, 3 or 4. |
| | | @offset | | this can be included when DRTransformCurveType is 0, 1, 2, 3 or 4. |
| | | @coeffA | | this can be included when DRTransformCurveType is 1, 2, 3 or 4. This is not included when DRTransformCurveType is 0. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

— L43010

$$out = gain \times in + offset \quad \text{— L43020}$$

$$out = gain \times e^{(coeff \times in)} + offset \quad \text{— L43030}$$

$$out = gain \times \log(coeff \times in) + offset \quad \text{— L43040}$$

$$out = \begin{cases} gain1 \times \log(coeff\_a1 \times in)e^{(coeff\_a1 \times in)} + offset1 & if(in < intersection) \\ gain2 \times e^{(coeff\_a2 \times in)} + offset2 & else \end{cases} \quad \text{— L43050}$$

$$out = \begin{cases} gain1 \times \log(coeff\_a1 \times in) + offset1 & if(in < intersection\_x[1]) \\ gain2 \times in + offset2 & else\ if(in \geq intersection\_x[0]\ \&\ in < intersection\_x[1]) \\ gain3 \times e^{(coeff\_a3 \times in)} + offset3 & else \end{cases} \quad \text{— L43060}$$

FIG. 44

| Element or Attribute Name | | | Use | |
|---|---|---|---|---|
| DRTLUT | | | | includes information about a transformation look-up table for transforming SDR video into HDR. |
| | DRTLEntry | | 0...N | includes lower attribute values corresponding to the entry length of an LUT for transforming SDR video into HDR. |
| | | @entryNum | O | indicates the number of the current entry. |
| | | @inValue | O | this can have a value when DRTransformCurveType is 5. This corresponds to an input value for transforming SDR content into HDR. |
| | | @outValue | O | this can have a value when DRTransformCurveType is 5. This corresponds to a converted output value when an input value for transforming SDR content into HDR is received. |

L44010

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

```
<HDRMetadata HDRDynamicRnageType="1" HDRLuminanceMax="1000" HDRLuminanceMin="0.1" HDREOTFType="3"
HDRMaxFrameLumiance="1000" HDRMaxPixelLuminance="0" HDRMinPixelLuminance="0.1"
DRTransformCurveType="1">
        <DRTC>
                <DRTCSection sectionNum ="0" intersectionX ="  " intersectionY ="  " gain="2" offset="10" offset =" " />      L44020
        </DRTC>
</HDRMetadata>
```

```
<HDRMetadata HDRDynamicRnageType="1" HDRLuminanceMax="500" HDRLuminanceMin="0.1" HDREOTFType="3"
HDRMaxFrameLumiance="0" HDRMaxPixelLuminance="0" HDRMinPixelLuminance="0.1"
DRTransformCurveType="5">
        <DRTLUT>
                <DRTLEntry entryNum ="0" inValue="1" outValue="10 "/>
                <DRTLEntry entryNum ="1" inValue="4" outValue="76 "/>         L44030
                <DRTLEntry entryNum ="2" inValue="9" outValue="169 "/>
                ...
        </DRTLUT>
</HDRMetadata>
```

FIG. 45

| Element or Attribute Name | Use | Description |
|---|---|---|
| Subset | | specifies a Subset |
| @contains | M | specifies the Adaptation Sets contained in a Subset by providing a white-space separated list of the @id values of the contained Adaptation Sets. |
| @id | O | specifies a unique identifier for the Subset. |
| @HDRTypeTransition | OD default:false | indicates whether HDR type changes in the corresponding subset or the next subset. Here, HDR type change means that an attribute value of an element changes or an attribute value changes.<br>- HDR type #1 → oeft:3, max_lum:100, min_lum:0.5, max_frame_lum:0, max_pixel_lum:0)<br>- HDR type #2 → oeft:1, max_lum:1000, min_lum:0.05, max_frame_lum:0, max_pixel_lum:0 |
| @HDRStart | OD default:false | indicates whether an SDR video media component includes an HDR change start point using HDRMetadataSet. |
| @HDREnd | OD default:false | indicates whether an SDR video media component includes a part to which HDRMetadataSet is not applied. |
| @HDRDynamicRangeType | O | refers to the dynamic range of presented video when HDR metadata is added to SDR content and HDR service is provided. Alternatively, residual data of an enhancement layer as well as HDR metadata may be included in SDR content to signal the dynamic range of video to be presented. This signals the luminance range of a reference monitor determined in SMPTE when it has a value of 1, and other values can use standard values determined in the future. |
| @HDRLuminanceMax | O | refers to a maximum luminance value that can be represented in a master display |
| @HDRLuminanceMin | O | refers to a minimum luminance value that can be represented in a master display |
| @HDREOTFType | O | indicates the type of an EOTF function of HDR video generated by additionally applying HDR related metadata to base layer video. Although an additional EOTF may not be necessary (0), in general, the EOTF may be required when a receiver is separated or depending on display type. This field may be extended to include an arbitrary EOTF. |
| @HDRMaxFrameLuminance | O | non-negative integer in decimal representation expressing maximum value of average luminance of a frame of HDR video media component.<br>However, if HDRMaxFrameLuminance is applied to one frame, this field indicates average luminance corresponding to one frame. |
| @HDRMaxPixelLuminance | O | non-negative integer in decimal representation expressing the luminance of the brightest pixel of HDR video media component |
| @HDRMinPixelLuminance | O | non-negative integer in decimal representation expressing the luminance of the darkest pixel of HDR video media component |
| @DRTransformCurveType | M | indicates a dynamic range transformation curve. The actual value can be defined as in DR transformation curve type embodiment of [Table 2]. |

FIG. 46

| Element or Attribute Name | Use | Description |
|---|---|---|
| ... | ... | ... |
| @SDRDynamicRangeType | O | refers to the dynamic range of base layer video. This signals the luminance range of the reference monitor determined in SMPTE when having a value of 1, and other values can use standard values determined in the future. This may signal an arbitrary value when having a value of 2. |
| @SDRLuminanceMax | O | used when a maximum reference luminance represented in SDR video is designated as an arbitrary value. This indicates a maximum dynamic range value. |
| @SDRLuminanceMin | O | used when a maximum reference luminance represented in SDR video is designated as an arbitrary value. |
| @SDREOTFType | O | indicates the type of EOTF function used to encode SDR video. In general, a widely used EOTF such as ITU-R BT.1886 or REC.709 is delivered using VUI information, and the value of this field needs to designate the same EOTF as the corresponding part of VUI. This field may be extended to include an arbitrary EOTF. |
| @SDRMaxFrameLuminance | O | non-negative integer in decimal representation expressing maximum value of average luminance of a frame of SDR video media component |
| @SDRMaxPixelLuminance | O | non-negative integer in decimal representation expressing the luminance of the brightest pixel of SDR video media component |
| DRTC | 0...N | includes information about a transformation curve for transforming SDR video into HDR. |
| DRTLUT | 0...N | includes information about a transformation look-up table for transforming SDR video into HDR. |
| Legend:<br>For attributes: M=Mandatory, O=Optional, OD=Optional with Default Value, CM=Conditionally Mandatory.<br>For elements: <minOccurs>..<maxOccurs> (N=unbounded)<br>Elements are bold; attributes are non-bold and preceded with an @. | | |

FIG. 47

| Element or Attribute Name | Use | Description |
|---|---|---|
| Subset | | specifies a Subset |
| @contains | M | specifies the Adaptation Sets contained in a Subset by providing a white-space separated list of the @id values of the contained Adaptation Sets. |
| @id | O | specifies a unique identifier for the Subset. |
| @HDRTypeTransition | OD default:false | indicates whether HDR type changes in the corresponding subset or the next subset. Here, HDR type change means that an attribute value of an element changes or an attribute value changes.<br>- HDR type #1 → oeft:3, max_lum:100, min_lum:0.5, max_frame_lum:0, max_pixel_lum:0)<br>- HDR type #2 → oeft:1, max_lum:1000, min_lum:0.05, max_frame_lum:0, max_pixel_lum:0 |
| @HDRStart | OD default:false | indicates whether an SDR video media component includes an HDR change start point using HDRMetadataSet. |
| @HDREnd | OD default:false | indicates whether an SDR video media component includes a part to which HDRMetadataSet is not applied. |
| HDRMetadata | 0...N | specifies HDR metadata information of video media component |
| SDRMetadata | 0...N | specifies metadata information for original SRD video media component |
| Legend:<br>For attributes: M=Mandatory, O=Optional, OD=Optional with Default Value, CM=Conditionally Mandatory.<br>For elements: <minOccurs>..<maxOccurs> (N=unbounded)<br>Elements are bold; attributes are non-bold and preceded with an @. | | |

FIG. 48

| Element or Attribute Name | Use | Description |
|---|---|---|
| Representation | | specifies a Representation |
| @id | O | specifies a unique identifier for the Representation |
| ... | ... | ... |
| @associationId | O | specifies all Representations the Representation is associated with in the decoding and/or presentation process as a whitespace-separated list of values of @id attributes. |
| @associationType | O | specifies, as a whitespace separated list of values, the kind of association for each Representation the Representation has been associated with through the @associationId attribute. Values taken by this attribute are 4 character codes for track reference types registered in MP4 registration authority. This attribute shall not be present when @associationId is not present. This attribute must have as many values as the number of identifiers declared in the @associationId attribute |
| Legend:<br>    For attributes: M=Mandatory, O=Optional, OD=Optional with Default Value, CM=Conditionally Mandatory.<br>    For elements: <minOccurs>..<maxOccurs> (N=unbounded)<br>Elements are bold; attributes are non-bold and preceded with an @. | | |

FIG. 49

```
<?xml version="1.0" encoding="UTF-8"?>
<MPD xmlns:xsi="http://www.w3.org/2001/XMLSchema-instance"
 xmlns="urn:mpeg:dash:schema:mpd:2011" xsi:schemaLocation="urn:mpeg:dash:schema:mpd:2011 DASH-MP
D.xsd" type="static" mediaPresentationDuration="PT3256S" minBufferTime="PT10.00S"
profiles="urn:mpeg:dash:profile:isoff-main:2011">
 <BaseURL>http://www.example.com/</BaseURL>
 <Period>
```

<!-- Adaptation set 1 - only base: HD SDR service -->
<AdaptationSet subsegmentAlignment="true" par="16:9">
    <Representation id="v0" mimeType="video/mp4" codecs="hvc1.2.4.L123.00" width="1920"
    height="1080" frameRate="60" startWithSAP="2" bandwidth="3583133">
        <BaseURL>video1.mp4</BaseURL>
        <SegmentBase indexRange="0-4332"/>
    </Representation>
    <HDRMetadataProperty schemeIdUri="urn:mpeg:dash:sdrmatadata:201x" value = "1, 100, 0, 2, 0, 0"/>
</AdaptationSet>

— 1st adaptation set: HD SDR service — L49010

<!-- Adaptation set 2 - base + HDR metadata: HD HDR service -->
<AdaptationSet subsegmentAlignment="true" par="16:9">
    <Representation id="v1" mimeType="video/mp4" codecs="hvc1.2.4.L123.00" width="1920"
    height="1080" frameRate="60" startWithSAP="2" bandwidth="3583133">
        <BaseURL>video1.mp4</BaseURL>
        <SegmentBase indexRange="0-4332"/>
    </Representation>
    <HDRMetadataProperty schemeIdUri="urn:mpeg:dash:hdrmset:201x" value = "1, 1000, 0.1, 3, 300, 1000, 0.1, 0, false, false, false"/>
    <HDRMetadataProperty schemeIdUri="urn:mpeg:dash:drtcurveset:201x" value = "1, 0, , , 10, 3, "/>
    <HDRMetadataProperty schemeIdUri="urn:mpeg:dash:sdrmatadata:201x" value = "1, 100, 0, 2, 0, 0"/>
</AdaptationSet>

— 2nd adaptation set: HD HDR service — L49020

<!-- Adaptation set 3 - enhancement (residual for UHD): UHD SDR service -->
<AdaptationSet subsegmentAlignment="true" par="16:9">
    <Representation id="v2" dependencyID="v0" mimeType="video/mp4"
    codecs="shvc1.2.4.L153.00" width="3840" height="2160" frameRate="60" startWithSAP="2"
    bandwidth="18076618">
        <BaseURL>video2.mp4</BaseURL>
        <SegmentBase indexRange="0-4332"/>
    </Representation>
    <HDRMetadataProperty schemeIdUri="urn:mpeg:dash:sdrmatadata:201x" value = "1, 100, 0, 2, 0, 0"/>
</AdaptationSet>

— 3nd adaptation set: UHD SDR service — L49030

<!-- Adaptation set 4 - enhancement (residual for UHD): UHD HDR service -->
<AdaptationSet subsegmentAlignment="true" par="16:9">
    <Representation id="v3" dependencyID="v1" mimeType="video/mp4"
    codecs="shvc1.2.4.L153.00" width="3840" height="2160" frameRate="60" startWithSAP="2"
    bandwidth="18076618">
        <BaseURL>video2.mp4</BaseURL>
        <SegmentBase indexRange="0-4332"/>
    </Representation>
    <HDRMetadataProperty schemeIdUri="urn:mpeg:dash:hdrmset:201x" value = "1, 1000, 0.1, 3, 300, 1000, 0.1, 0, false, false, false"/>
    <HDRMetadataProperty schemeIdUri="urn:mpeg:dash:drtcurveset:201x" value = "1, 0, , , 10, 3, "/>
    <HDRMetadataProperty schemeIdUri="urn:mpeg:dash:sdrmatadata:201x" value = "1, 100, 0, 2, 0, 0"/>
</AdaptationSet>

— 4th adaptation set: UHD HDR service — L49040

```
 </Period>
</MPD>
```

FIG. 50

```
<!-- Adaptation set X - base (SDR stream) + HDR metadata: HD HDR service -->
<AdaptationSet subsegmentAlignment="true" par="16:9">
    <Representation id="v1" mimeType="video/mp4" codecs="hvc1.2.4.L123.00" width="1920"
    height="1080" frameRate="60" startWithSAP="2" bandwidth="3583133">
        <BaseURL>video1.mp4</BaseURL>
        <SegmentBase indexRange="0-4332"/>
    </Representation>
    <HDRMetadataProperty schemeIdUri = "urn:mpeg:dash:hdrmset:201x" value = "1, 1000, 0.1, 3 , 300, 1000, 0.1, 0, false,
    false, false"/>
    <HDRMetadataProperty schemeIdUri = "urn:mpeg:dash:drtcurveset:201x" value = "1, 0, , , 10, 3, "/>
    <HDRMetadataProperty schemeIdUri = "urn:mpeg:dash:sdrmatadata:201x" value = "1, 100, 0, 2 , 0, 0 "/>
</AdaptationSet>
```
— L50010

```
<!-- Adaptation set Y – base (SDR stream) + enhancement (for HDR stream) + HDR
metadata: HD HDR service -->
    <AdaptationSet subsegmentAlignment="true" par="16:9">
        <Representation id="v1" mimeType="video/mp4" codecs="hvc1.2.4.L123.00" width="1920"
        height="1080" frameRate="60" startWithSAP="2" bandwidth="3583133">
            <BaseURL>video1.mp4</BaseURL>
            <SegmentBase indexRange="0-4332"/>
        </Representation>
        <Representation id="v2" dependencyID="v1" mimeType="video/mp4"
        codecs="shvc1.2.4.L123.00" width="1920" height="1080" frameRate="60"
        startWithSAP="2" bandwidth="3583133">
            <HDRMetadataProperty schemeIdUri = "urn:mpeg:dash:hdrmset:201x" value = "1, 1000, 0.1, 3 , 300, 1000, 0.1, 0,
            false, false, false"/>
            <HDRMetadataProperty schemeIdUri = "urn:mpeg:dash:drtcurveset:201x" value = "1, 0, , , 10, 3, "/>
    </AdaptationSet>
```
— L50020

FIG. 51

```
<?xml version="1.0" encoding="UTF-8"?>
<MPD xmlns:xsi="http://www.w3.org/2001/XMLSchema-instance"
 xmlns="urn:mpeg:dash:schema:mpd:2011" xsi:schemaLocation="urn:mpeg:dash:schema:mpd:2011 DASH-MP
D.xsd" type="static" mediaPresentationDuration="PT3256S" minBufferTime="PT10.00S"
profiles="urn:mpeg:dash:profile:isoff-main:2011">
  <BaseURL>http://www.example.com/</BaseURL>
  <Period>
```

```
    <!-- Adaptation set 1 - base/enhancement: HD SDR/UHD SDR service -->
    <AdaptationSet subsegmentAlignment="true" par="16:9">
        <Representation id="v0" mimeType="video/mp4" codecs="hvc1.2.4.L123.00" width="1920"
        height="1080" frameRate="60" startWithSAP="2" bandwidth="3583133">
            <BaseURL>video1.mp4</BaseURL>
            <SegmentBase indexRange="0-4332"/>
        </Representation>
        <Representation id="v1" dependencyID="v0" mimeType="video/mp4"
        codecs="shvc1.2.4.L153.00" width="3840" height="2160" frameRate="60"
        startWithSAP="2" bandwidth="18076618">
            <BaseURL>video2.mp4</BaseURL>
            <SegmentBase indexRange="0-4332"/>
        </Representation>
        <HDRMetadataProperty schemeIdUri = "urn:mpeg:dash:sdrmatadata:201x" value = "1, 100, 0, 2 , 0, 0 "/>
    </AdaptationSet>
```
— L51010

1st adaptation set:
HD SDR or UHD SDR service

```
    <!-- Adaptation set 2 - base+HDR metadata/enhancement: HD HDR/UHD HDR service -->
    <AdaptationSet subsegmentAlignment="true" par="16:9">
        <Representation id="v2" mimeType="video/mp4" codecs="hvc1.2.4.L123.00" width="1920"
        height="1080" frameRate="60" startWithSAP="2" bandwidth="3583133">
            <BaseURL>video1.mp4</BaseURL>
            <HDRMetadataProperty schemeIdUri = "urn:mpeg:dash:hdrmset:201x" value = "1, 1000, 0.1, 3 , 300, 1000, 0.1, 0,
            false, false, false"/>
            <HDRMetadataProperty schemeIdUri = "urn:mpeg:dash:drtcurveset:201x" value = "1, 0, , , 10, 3, "/>
            <HDRMetadataProperty schemeIdUri = "urn:mpeg:dash:sdrmatadata:201x" value = "1, 100, 0, 2 , 0, 0 "/>
            <SegmentBase indexRange="0-4332"/>
        </Representation>
        <Representation id="v3" dependencyID="v2" mimeType="video/mp4"
        codecs="shvc1.2.4.L153.00" width="3840" height="2160" startWithSAP="2"
        bandwidth="18076618">
            <BaseURL>video2.mp4</BaseURL>
            <SegmentBase indexRange="0-4332"/>
        </Representation>
    </AdaptationSet>
  </Period>
</MPD>
```
— L51020

2nd adaptation set:
HD HDR or UHD HDR service

FIG. 52

```
<?xml version="1.0" encoding="UTF-8"?>
<MPD xmlns:xsi="http://www.w3.org/2001/XMLSchema-instance"
 xmlns="urn:mpeg:dash:schema:mpd:2011" xsi:schemaLocation="urn:mpeg:dash:schema:mpd:2011 DASH-MP
D.xsd" type="static" mediaPresentationDuration="PT3256S" minBufferTime="PT10.00S"
profiles="urn:mpeg:dash:profile:isoff-main:2011">
 <BaseURL>http://www.example.com/</BaseURL>
 <Period>
```

```
<!-- Adaptation set 1 - base: HD service -->
<AdaptationSet id="A0" subsegmentAlignment="true" par="16:9">
    <Representation id="v0" mimeType="video/mp4" codecs="hvc1.2.4.L123.00" width="1920" height="1080" frameRate="60"
    startWithSAP="2" bandwidth="3583133">
       <BaseURL>video1.mp4</BaseURL>
       <SegmentBase indexRange="0-4332"/>
    </Representation>                                   1st adaptation set:
</AdaptationSet>                                        HD SDR service
```
— L52010

```
<!-- Adaptation set 2 - enhancement (residual for UHD): UHD service -->
<AdaptationSet id="A1" subsegmentAlignment="true" par="16:9">
    <Representation id="v1" dependencyID="v0" mimeType="video/mp4" codecs="shvc1.2.4.L153.00" width="3840"
    height="2160" frameRate="60" startWithSAP="2" bandwidth="18076618">
   <BaseURL>video2.mp4</BaseURL>
   <SegmentBase indexRange="0-4332"/>
    </Representation>                                   2nd adaptation set:
</AdaptationSet>                                        UHD SDR service
```
— L52020

```
<!-- Subset 1 - HD SDR service -->
   <Subset contains="A0 " id="S0"/>
       <SDRMetadata schemeIdUri="urn:mpeg:dash:sdrmetadata:201x" value="1, 100, 0.5, 2, 30, 100, 0.1"/>
   </Subset>
<!-- Subset 2 - HD HDR service -->
   <Subset contains="A0" id="S1" HDRTypeTransition="false" HDRStart="false" HDREnd="false" >
       <SDRMetadata schemeIdUri="urn:mpeg:dash:sdrmetadata:201x" value="1, 100, 0.5, 2, 30, 100, 0.1"/>
       <HDRMetadata HDRDynamicRnageType="1" HDRLuminanceMax="1000" HDRLuminanceMin="0.1"
       HDREOTFType="3" HDRMaxFrameLumiance="1000" HDRMaxPixelLuminance="0" HDRMinPixelLuminance="0.1" DRTransformCur
       veType="1">
           <DRTC>
               <DRTCSection sectionNum ="0" intersectionX ="  "  intersectionY ="  " gain="2" offset="10" offset =" " />
           </DRTC>
       </HDRMetadata>
   </Subset>                                            Subset
<!-- Subset 3 - UHD SDR service -->                     1 ~ 4
   <Subset contains="A0 A1" id="S2"/>
<!-- Subset 4 - UHD HDR service -->
   <Subset contains="A0 A1" id="S3" HDRTypeTransition="false" HDRStart="false" HDREnd="false">
       <HDRMetadata HDRDynamicRnageType="1" HDRLuminanceMax="1000" HDRLuminanceMin="0.1"
       HDREOTFType="3" HDRMaxFrameLumiance="1000" HDRMaxPixelLuminance="0" HDRMinPixelLuminance="0.1" DRTransformCur
       veType="1">
           <DRTC>
               <DRTCSection sectionNum ="0" intersectionX ="  "  intersectionY ="  " gain="2" offset="10" offset =" " />
           </DRTC>
       </HDRMetadata>
   </Subset>
</Period>
</MPD>
```
— L52030

FIG. 53

```
<?xml version="1.0" encoding="UTF-8"?>
<MPD xmlns:xsi="http://www.w3.org/2001/XMLSchema-instance"
 xmlns="urn:mpeg:dash:schema:mpd:2011" xsi:schemaLocation="urn:mpeg:dash:schema:mpd:2011 DASH-MP
D.xsd" type="static" mediaPresentationDuration="PT3256S" minBufferTime="PT10.00S"
profiles="urn:mpeg:dash:profile:isoff-main:2011">
  <BaseURL>http://www.example.com/</BaseURL>
  <Period>
```

```
<!-- Adaptation set 1 - only base: HD SDR service -->
<AdaptationSet subsegmentAlignment="true" par="16:9">
    <Role schemeIdUri="urn:mpeg:dash:role:2011" value="main"/>
    <Representation id="v0" mimeType="video/mp4" codecs="hvc1.2.4.L123.00" width="1920"
    height="1080" frameRate="60" startWithSAP="2" bandwidth="3583133">
      <BaseURL>video1.mp4</BaseURL>
      <SegmentBase indexRange="0-4332"/>
    </Representation>
</AdaptationSet>
```
— L53010  (1st adaptation set: HD SDR service)

```
<!-- Adaptation set 2 - only HDR metadata -->
<AdaptationSet subsegmentAlignment="true" par="16:9">
    <Role schemeIdUri="urn:mpeg:dash:role:2011" value="metadata"/>
    <Representation id="v1" mimeType="mets+xml">
      <BaseURL>metadata1.mp4</BaseURL>
    </Representation>
</AdaptationSet>
```
— L53020  (2nd adaptation set: HDR metadata)

```
<!-- Adaptation set 3 - enhancement (residual for UHD): UHD SDR service -->
<AdaptationSet subsegmentAlignment="true" par="16:9">
    <Role schemeIdUri="urn:mpeg:dash:role:2011" value="main"/>
    <Representation id="v2" dependencyID="v0" mimeType="video/mp4"
    codecs="shvc1.2.4.L153.00" width="3840" height="2160" startWithSAP="2"
    bandwidth="18076618">
      <BaseURL>video2.mp4</BaseURL>
      <SegmentBase indexRange="0-4332"/>
    </Representation>
</AdaptationSet>
```
— L53030  (3rd adaptation set: UHD SDR service)

```
<!-- Adaptation set 4 - enhancement (residual for UHD): UHD HDR service -->
<AdaptationSet subsegmentAlignment="true" par="16:9">
    <Role schemeIdUri="urn:mpeg:dash:role:2011" value="main"/>
    <Representation id="v3" dependencyID="v0 v1" mimeType="video/mp4"
    codecs="shvc1.2.4.L153.00" width="3840" height="2160" startWithSAP="2"
    bandwidth="18076618">
      <BaseURL>video2.mp4</BaseURL>
      <SegmentBase indexRange="0-4332"/>
    </Representation>
</AdaptationSet>
```
— L53040  (4th adaptation set: UHD HDR service)

```
  </Period>
</MPD>
```

FIG. 54

```xml
<?xml version="1.0" encoding="UTF-8"?>
<MPD xmlns:xsi="http://www.w3.org/2001/XMLSchema-instance"
 xmlns="urn:mpeg:dash:schema:mpd:2011" xsi:schemaLocation="urn:mpeg:dash:schema:mpd:2011 DASH-MP
D.xsd" type="static" mediaPresentationDuration="PT3256S" minBufferTime="PT10.00S"
profiles="urn:mpeg:dash:profile:isoff-main:2011">
  <BaseURL>http://www.example.com/</BaseURL>
  <Period>
```

```xml
<!-- Adaptation set 1 - only base: HD SDR service -->
<AdaptationSet subsegmentAlignment="true" par="16:9">
    <Role schemeIdUri="urn:mpeg:dash:role:2011" value="main"/>
    <Representation id="v0" mimeType="video/mp4" codecs="hvc1.2.4.L123.00" width="1920"
    height="1080" frameRate="60" startWithSAP="2" bandwidth="3583133"/>
       <BaseURL>video1.mp4</BaseURL>
       <SegmentBase indexRange="0-4332"/>
    </Representation>
</AdaptationSet>
```
— L54010 (1st adaptation set: HD SDR service)

```xml
<!-- Adaptation set 2 - only HDR metadata -->
<AdaptationSet subsegmentAlignment="true" par="16:9">
    <Role schemeIdUri="urn:mpeg:dash:role:2011" value="metadata"/>
    <Representation id="v1" mimeType="mets+xml"
    assosiationId="v3" assosiationType="mtdt">
       <BaseURL>metadata1.mp4</BaseURL>
    </Representation>
</AdaptationSet>
```
— L54020 (2nd adaptation set: HDR metadata)

```xml
<!-- Adaptation set 3 - base: HD HDR service -->
<AdaptationSet subsegmentAlignment="true" par="16:9">
    <Role schemeIdUri="urn:mpeg:dash:role:2011" value="main"/>
    <Representation id="v2" dependencyID="v1" mimeType="video/mp4"
    codecs="hvc1.2.4.L123.00" width="1920" height="1080" frameRate="60"
    startWithSAP="2" bandwidth="3583133"/>
       <BaseURL>video1.mp4</BaseURL>
       <SegmentBase indexRange="0-4332"/>
    </Representation>
</AdaptationSet>
```
— L54030 (3rd adaptation set: HD HDR service)

```xml
<!-- Adaptation set 4 - enhancement (residual for UHD): UHD SDR service -->
<AdaptationSet subsegmentAlignment="true" par="16:9">
    <Role schemeIdUri="urn:mpeg:dash:role:2011" value="main"/>
    <Representation id="v3" dependencyID="v0" mimeType="video/mp4"
    codecs="shvc1.2.4.L153.00" width="3840" height="2160" startWithSAP="2"
    bandwidth="18076618">
       <BaseURL>video2.mp4</BaseURL>
       <SegmentBase indexRange="0-4332"/>
    </Representation>
</AdaptationSet>
```
— L54040 (4th adaptation set: UHD SDR service)

```xml
<!-- Adaptation set 5 - enhancement (residual for UHD): UHD HDR service -->
<AdaptationSet subsegmentAlignment="true" par="16:9">
    <Role schemeIdUri="urn:mpeg:dash:role:2011" value="main"/>
    <Representation id="v4" dependencyID="v2" mimeType="video/mp4" codecs="shvc1.2.4
    .L153.00" width="3840" height="2160" startWithSAP="2" bandwidth="18076618">
       <BaseURL>video2.mp4</BaseURL>
       <SegmentBase indexRange="0-4332"/>
    </Representation>
</AdaptationSet>
```
— L54050 (4th adaptation set: UHD HDR service)

```xml
  </Period>
</MPD>
```

FIG. 55

```
<?xml version="1.0" encoding="UTF-8"?>
<MPD xmlns:xsi="http://www.w3.org/2001/XMLSchema-instance"
  xmlns="urn:mpeg:dash:schema:mpd:2011" xsi:schemaLocation="urn:mpeg:dash:schema:mpd:2011 DASH-MP
D.xsd" type="static" mediaPresentationDuration="PT3256S" minBufferTime="PT10.00S"
profiles="urn:mpeg:dash:profile:isoff-main:2011">
  <BaseURL>http://www.example.com/</BaseURL>
  <Period>
```

```
<!-- Adaptation set 1 - 2D HD service using right view (when a legacy receiver doesn't know "role
scheme") -->
   <AdaptationSet subsegmentAlignment="true" par="16:9">
     <Role schemeIdUri="urn:mpeg:dash:role:2011" value="main"/>
     <Representation id="v0" mimeType="video/mp4" codecs="hvc1.2.4.L123.00" width="1920"
height="1080" frameRate="60" startWithSAP="2" bandwidth="3583133">
        <BaseURL>video1.mp4</BaseURL>
        <SegmentBase indexRange="0-4332"/>
     </Representation>
   </AdaptationSet>
```
— L55010 — 1st adaptation set HD video for 2D service

```
<!-- Adaptation set 2 - base view (right) for SHVC -->
   <AdaptationSet subsegmentAlignment="true" par="16:9">
     <Role schemeIdUri="urn:mpeg:dash:role:2011" value="main"/>
     <Role schemeIdUri="urn:mpeg:dash:stereoid:2011" value="r0"/>
     <Representation id="v1" mimeType="video/mp4" codecs="hvc1.2.4.L123.00" width="1920"
height="1080" frameRate="60" startWithSAP="2" bandwidth="3583133">
        <BaseURL>video1.mp4</BaseURL>
        <SegmentBase indexRange="0-4332"/>
     </Representation>
   </AdaptationSet>
```
— L55020 — 2nd adaptation set HD video for 3D service

```
<!-- Adaptation set 3 - enhancement view (residual for UHD view) -->
   <AdaptationSet subsegmentAlignment="true" par="16:9">
     <Role schemeIdUri="urn:mpeg:dash:role:2011" value="main"/>
     <Representation id="v2" dependencyID="v0" mimeType="video/mp4"
        codecs="shvc1.2.4.L153.00" width="3840" height="2160" mimeType="video/mp4"
        startWithSAP="2" bandwidth="18076618">
        <BaseURL>video2.mp4</BaseURL>
        <SegmentBase indexRange="0-4332"/>
     </Representation>
   </AdaptationSet>
```
— L55030 — 3rd adaptation set UHD video for 2D service

```
<!-- Adaptation set 4 - enhancement view (residual for left view) -->
   <AdaptationSet subsegmentAlignment="true" par="16:9">
     <Role schemeIdUri="urn:mpeg:dash:role:2011" value="main"/>
     <Role schemeIdUri="urn:mpeg:dash:stereoid:2011" value="l0"/>
     <Representation id="v3" dependencyID="v1" mimeType="video/mp4"
        codecs="shvc1.2.4.L153.00" width="3840" height="2160" mimeType="video/mp4"
        startWithSAP="2" bandwidth="18076618">
        <BaseURL>video2.mp4</BaseURL>
        <SegmentBase indexRange="0-4332"/>
     </Representation>
   </AdaptationSet>
```
— L55040 — 4th adaptation set UHD video for 3D service

```
<!-- Adaptation set 5 – only stereoscopic metadata -->
   <AdaptationSet subsegmentAlignment="true" par="16:9">
     <Role schemeIdUri="urn:mpeg:dash:role:2011" value="metadata"/>
     <Representation id="v4" mimeType="mets+xml"
        associationId="v1 v3" assosiationType="svdp">
        <BaseURL>metadata1.mp4</BaseURL>
     </Representation>
   </AdaptationSet>
```
— L55050 — 5th adaptation set Metadata for stereoscopic

```
  </Period>
</MPD>
```

BROADCASTING SIGNAL TRANSMISSION DEVICE, BROADCASTING SIGNAL RECEPTION DEVICE, BROADCASTING SIGNAL TRANSMISSION METHOD, AND BROADCASTING SIGNAL RECEPTION METHOD

This application is a National Phase application of International Application No. PCT/KR2016/004251, filed Apr. 22, 2016, and claims the benefit of U.S. Provisional Application No. 62/151,383, filed on Apr. 22, 2015, U.S. Provisional Application No. 62/157,941, filed on May 6, 2015, U.S. Provisional Application No. 62/182,644, filed on Jun. 22, 2015, U.S. Provisional Application No. 62/182,643, filed on Jun. 22, 2015, and U.S. Provisional Application No. 62/190,742, filed on Jul. 10, 2015 all of which are hereby incorporated by reference in their entirety for all purposes as if fully set forth herein.

TECHNICAL FIELD

The present invention relates to processing of a broadcast signal transmission device, a broadcast signal reception device, and broadcast signal transmission/reception methods.

BACKGROUND ART

As analog broadcasting comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention provides a system capable of effectively supporting next-generation broadcast services in an environment supporting next-generation hybrid broadcasting using terrestrial broadcast networks and the Internet and related signaling methods as included and approximately described herein according to objects of the present invention.

Advantageous Effects

The present invention can provide a method of processing HDR content and signaling therefor in an MPEG DASH based broadcast system.

The present invention can provide a method of transforming SDR content into HDR content and signaling therefor when the SDR content is provided in an MPEG DASH based broadcast system.

The present invention can filter content per level by including DR related signaling in hierarchical elements of MPEG DASH.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 10 is a diagram illustrating HDR configuration description according to one embodiment of the present invention;

FIG. 11 illustrates description of @schemeIdUri and @value of an HDRConfiguration element according to one embodiment of the present invention;

FIG. 12 illustrates description of @value of the HDRConfiguration element according to another embodiment of the present invention;

FIG. 13 is a diagram showing configurations of common attributes and elements according to one embodiment of the present invention;

FIG. 14 is a diagram showing configurations of common attributes and elements according to another embodiment of the present invention;

FIG. 15 is a diagram showing configurations of common attributes and elements according to another embodiment of the present invention;

FIG. 16 is a diagram showing configurations of an EssentialProperty descriptor and a SupplementaryProperty descriptor according to one embodiment of the present invention;

FIG. 17 is a diagram showing configurations of an EssentialProperty descriptor and a SupplementaryProperty descriptor according to another embodiment of the present invention;

FIG. 18 is a diagram showing a configuration of an Accessibility Descriptor according to one embodiment of the present invention;

FIG. 19 is a diagram showing a configuration of the Accessibility Descriptor according to another embodiment of the present invention;

FIG. 20 is a diagram showing a configuration of a ContentComponent element according to one embodiment of the present invention;

FIG. 21 is a diagram showing a configuration of the ContentComponent element according to another embodiment of the present invention;

FIG. 22 is a diagram showing a configuration of a SegmentBase element according to one embodiment of the present invention;

FIG. 23 is a diagram showing a configuration of the SegmentBase element according to another embodiment of the present invention;

FIG. 24 is a diagram showing a configuration of an AdaptationSet element according to one embodiment of the present invention;

FIG. 25 is a diagram showing a configuration of the AdaptationSet element according to another embodiment of the present invention;

FIG. 26 is a diagram showing a configuration of the AdaptationSet element according to another embodiment of the present invention;

FIG. 31 is a diagram showing a configuration of HDR metadata set description according to one embodiment of the present invention;

FIG. 32 illustrates description of @schemeIdUri and @value of an HDRMetadataSet element according to one embodiment of the present invention;

FIG. 33 illustrates description of @value of an HDRMetadataSet element according to one embodiment of the present invention;

FIG. 34 is a diagram illustrating description of HDRDynamicRangeType and DRTransformCurveType according to one embodiment of the present invention;

FIG. 35 illustrates description of @schemeIdUri and @value of an HDRMetadataSet element according to another embodiment of the present invention;

FIG. 36 is a diagram showing a configuration of Dynamic Range Transformation Curve Set Description according to one embodiment of the present invention;

FIG. 37 is a diagram showing a configuration of Dynamic Range Transformation Look-up Table Set Description according to one embodiment of the present invention;

FIG. 38 is a diagram showing a configuration of SDR metadata description according to one embodiment of the present invention;

FIG. 39 is a diagram showing a configuration of a Subset element according to one embodiment of the present invention;

FIG. 40 is a diagram showing a configuration of an HDRMetadataProperty element according to one embodiment of the present invention;

FIG. 41 is a diagram illustrating HDRMetadataProperty description according to one embodiment of the present invention;

FIG. 42 is a diagram showing a configuration of an HDRMetadata element according to one embodiment of the present invention;

FIG. 43 is a diagram showing a configuration of a DRTC (Dynamic Range Transformation Curve) element according to one embodiment of the present invention;

FIG. 44 is a diagram showing a configuration of a DRTLUT element according to one embodiment of the present invention;

FIG. 45 is a diagram showing a configuration of a Subset element according to another embodiment of the present invention;

FIG. 46 is a diagram showing a configuration of the Subset element according to another embodiment of the present invention;

FIG. 47 is a diagram showing a configuration of the Subset element according to another embodiment of the present invention;

FIG. 48 is a diagram showing a configuration of a Representation element according one embodiment of the present invention;

FIG. 49 is a diagram showing a configuration of MPD according to one embodiment of the present invention;

FIG. 50 is a diagram showing a configuration of MPD according to another embodiment of the present invention;

FIG. 51 is a diagram showing a configuration of MPD according to another embodiment of the present invention;

FIG. 52 is a diagram showing a configuration of MPD according to another embodiment of the present invention;

FIG. 53 is a diagram showing a configuration of MPD according to another embodiment of the present invention;

FIG. 54 is a diagram showing a configuration of MPD according to another embodiment of the present invention;

FIG. 55 is a diagram showing a configuration of MPD according to another embodiment of the present invention;

BEST MODE

Reference will now be made in detail to the preferred embodiments of the Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides devices and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
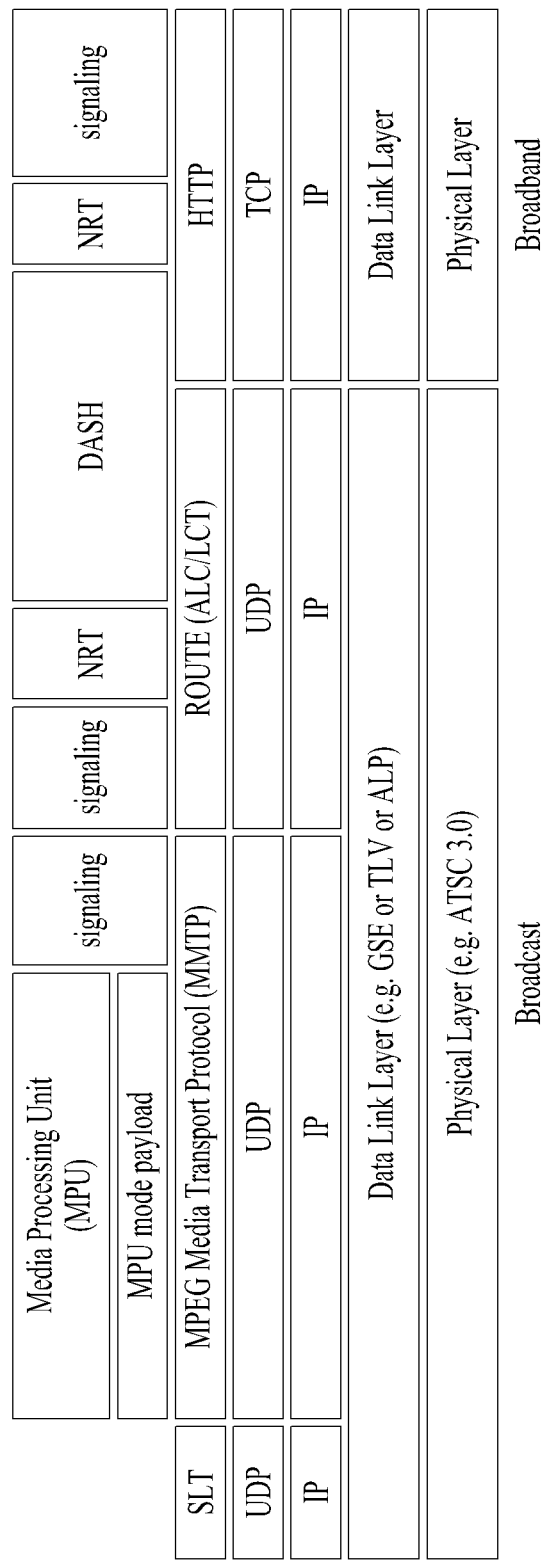
FIG. 1 is a diagram illustrating a protocol stack according to one embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non-real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non-real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
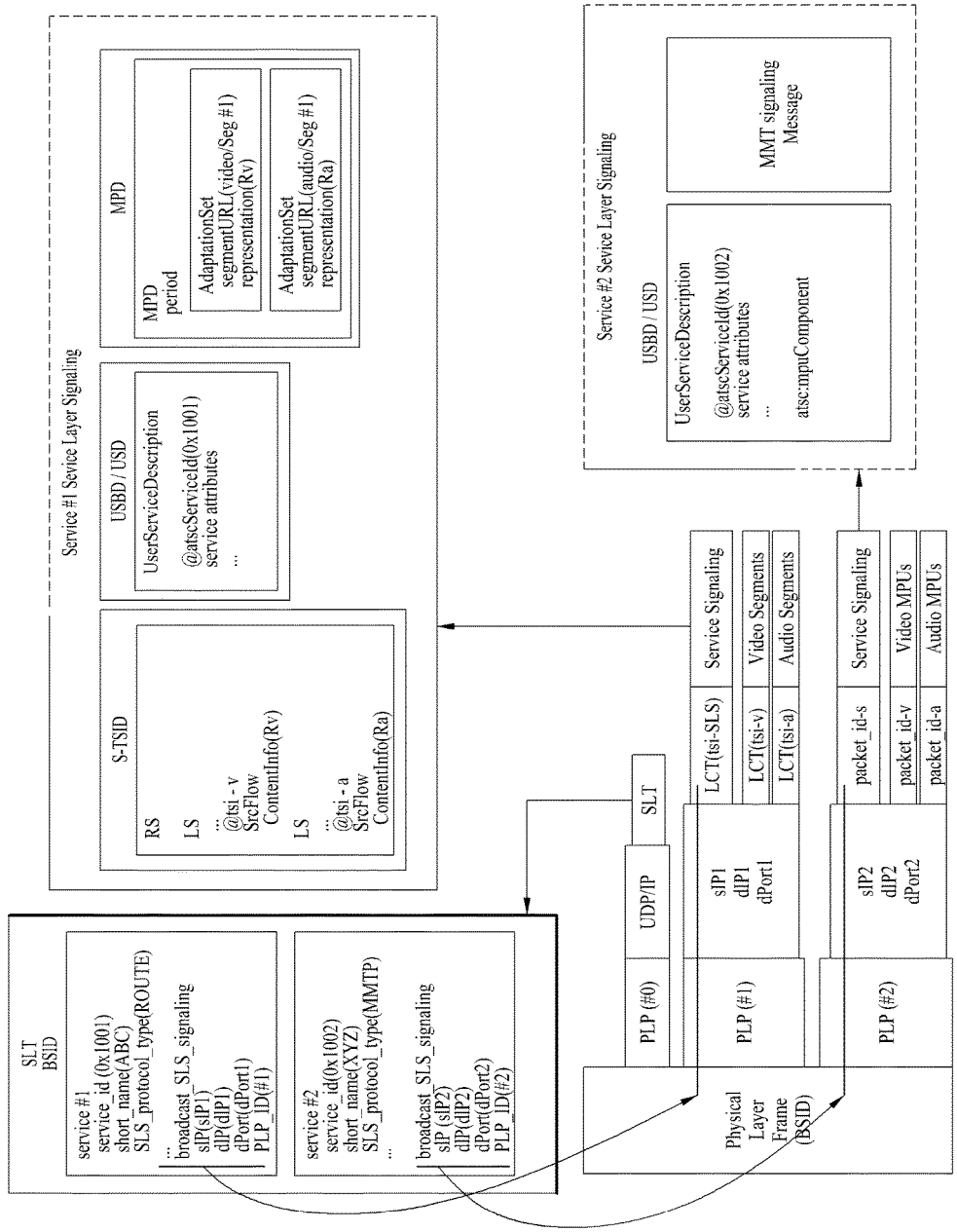
FIG. 2 is a diagram illustrating a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions.

Information on IP streams or transport sessions transmitted through a specific PLP may be acquired through the LMT. In contrast, information on through which PLP a specific transport session is delivered may be acquired.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments.

The signaling_type field may indicate the type of signaling information delivered by the table. The value of signaling_type field for the LMT may be set to 0x01. The PLP_ID field may identify a PLP corresponding to the LMT. The num_session field may indicate the number of higher layer sessions delivered through the PLP identified by the corresponding PLP_ID field.

According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. The SID field may indicate the SIDs (sub stream IDs) of the link layer packets delivering the transport session.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of a service can be delivered through a plurality of ROUTE sessions. In this case, the SLS can be acquired through bootstrap information of an SLT. S-TSID and MPD can be referenced through USBD of the SLS. The S-TSID can describe not only a ROUTE session through which the SLS is delivered but also transport session description information about other ROUTE sessions through which the service components are delivered. Accordingly, all the service components delivered through the multiple ROUTE sessions can be collected. This can be equally applied to a case in which service components of a service are delivered through a plurality of MMTP sessions. For reference, one service component may be simultaneously used by multiple services.

In another embodiment of the present invention, bootstrapping for an ESG service can be performed through a broadcast network or a broadband. URL information of an SLT can be used by acquiring an ESG through a broadband. A request for ESG information may be sent to the URL.

In another embodiment of the present invention, one of the service components of a service can be delivered through a broadcast network and another service component may be delivered over a broadband (hybrid). The S-TSID describes components delivered over a broadcast network such that a ROUTE client can acquire desired service components. In addition, the USBD has base pattern information and thus can describe which segments (which components) are delivered and paths through which the segments are delivered. Accordingly, a receiver can recognize segments that need to be requested from a broadband server and segments that need to be detected from broadcast streams using the USBD.

In another embodiment of the present invention, scalable coding for a service can be performed. The USBD may have all pieces of capability information necessary to render the corresponding service. For example, when a HD or UHD service is provided, the capability information of the USBD may have a value of "HD UHD". The receiver can recognize which component needs to be reproduced to render a UHD or HD service using the MPD.

In another embodiment of the present invention, SLS fragments delivered (USBD, S-TSID, MPD or the like) by LCT packets delivered through an LCT channel which delivers the SLS can be identified through a TOI field of the LCT packets.

In another embodiment of the present invention, application components to be used for application based enhancement/app based service can be delivered over a broadcast network or a broadband as NRT components. In addition, application signaling for application based enhancement can be performed by an AST (Application Signaling Table) delivered along with the SLS. Further, an event which is signaling for an operation to be executed by an application may be delivered in the form of an EMT (Event Message Table) along with the SLS, signaled in MPD, or in-band signaled in the form of a box in DASH representation. The AST and the EMT may be delivered over a broadband. Application based enhancement can be provided using collected application components and the aforementioned signaling information.

In another embodiment of the present invention, a CAP message may be included in the aforementioned LLS table and provided for emergency alert. Rich media content for emergency alert may also be provided. Rich media may be signaled through a CAP message. When rich media are present, the rich media can be provided as an EAS service signaled through an SLT.

In another embodiment of the present invention, linear service components can be delivered through a broadcast network according to the MMT protocol. In this case, NRT data (e.g., application component) regarding the corresponding service can be delivered through a broadcast network according to the ROUTE protocol. In addition, data regarding the corresponding service may be delivered over a broadband. The receiver can access an MMTP session through which the SLS is delivered using bootstrap information of the SLT. The USBD of the SLS according to the MMT can reference an MP table to allow the receiver to acquire linear service components formatted into MPU and delivered according to the MMT protocol. Furthermore, the USBD can further reference S-TSID to allow the receiver to acquire NRT data delivered according to the ROUTE protocol. Moreover, the USBD can further reference the MPD to provide reproduction description for data delivered over a broadband.

In another embodiment of the present invention, the receiver can deliver location URL information through which streaming components and/or file content items (files, etc.) can be acquired to a companion device thereof through a method such as web socket. An application of the companion device can acquire corresponding component data by sending a request to the URL through HTTP GET. In addition, the receiver can deliver information such as system time information and emergency alert information to the companion device.

Figure 8:
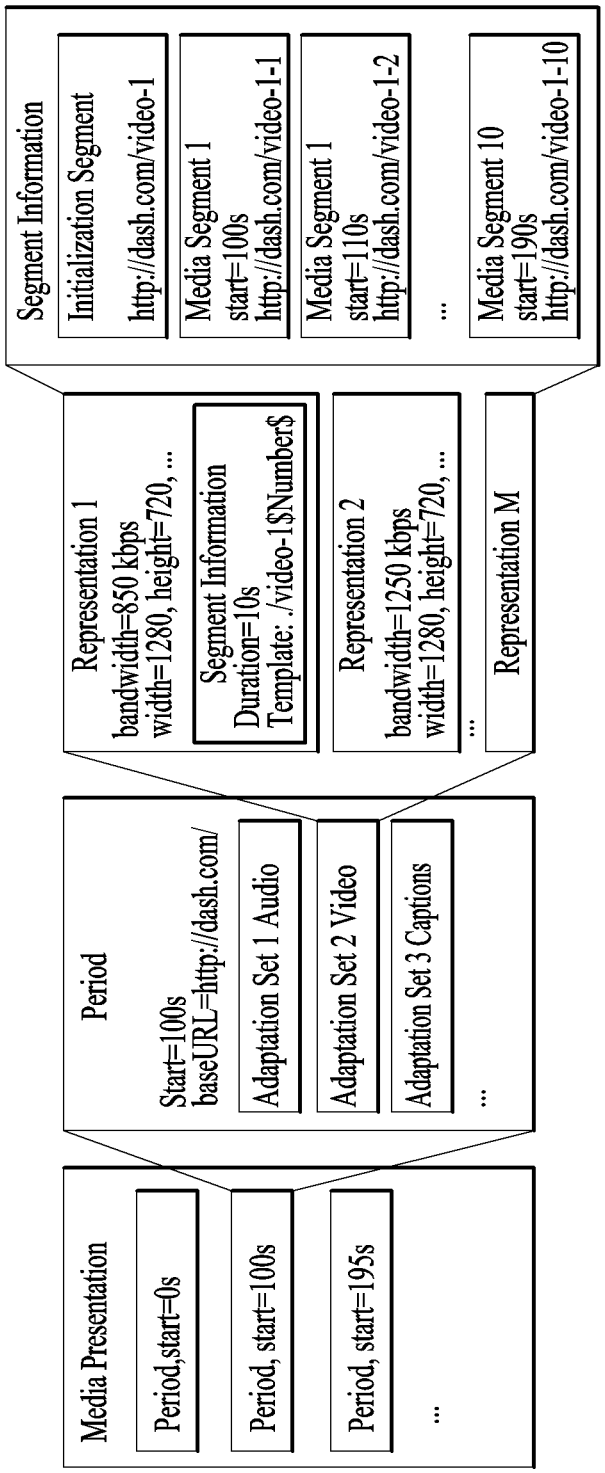
FIG. 8 is a diagram showing a DASH (Dynamic Adaptive Streaming over HTTP) data model according to one embodiment of the present invention.

FIG. 8 is a diagram showing a DASH (Dynamic Adaptive Streaming over HTTP) data model according to one embodiment of the present invention.

A transmission device according to one embodiment of the present invention can signal HDR (High Dynamic Range) configuration information in MPEG DASH such that a DASH based client can provide an HDR service. That is, the transmission device according to one embodiment of the present invention can signal configuration information about HDR content.

According to one embodiment of the present invention, signaling for HDR configuration information in MPEG DASH can be applied to DASH based systems. For example, the signaling can be applied to streaming systems based on ATSC 3.0, DVB IPTV and DASG.

The transmission device according to one embodiment of the present invention can collect HDR related parameters (EOTF, bit depth, peak luminance, codec information, metadata, etc.) to form one set and signal the set. In this case, the transmission device according to one embodiment of the present invention can signal HDR type in the MPD because all receivers may not provide the aforementioned HDR related parameters.

According to the DASH data model according to one embodiment of the present invention, media presentation may include one or more periods. One period may include one or more adaptation sets. One adaptation set may include one or more representations. One representation may include one or more pieces of segment information. The segment information may include an initialization segment and one or more media segments.

Referring to this figure, a period starting from a media time of 100 seconds has baseURL and includes Adaptation Set 1 for audio components, Adaptation Set 2 for video components and/or Adaptation Set 3 for caption components. Here, Adaptation Set 2 includes Representation 1 and Representation 2. Representation 1 indicates a video component having specifications such as bandwidth=850 kbps, width=1280 and height=720, and Representation 2 indicates a video component having specifications such as bandwidth=1250 kbps, width=1280 and height=720. Representation 1 includes segment information including information about a segment which delivers the video component indicated by Representation 1. The segment information includes duration and/or template information of the corresponding segment. In this figure, the segment for the video component indicated by Representation 1 has a duration of 10 seconds and template of ./video-1-$Number$. In this figure, Representation 1 includes an initialization segment and media segment 1 to media segment 10. In addition, the segment information includes information about the segment with respect to Representation 1. In this figure, the segment information includes template information ( ) of the initialization segment, presentation start time information start=100s and template information ( ) of media segment 1, presentation start time information start=110s and template information ( ) of media segment 2, and presentation start time information start=190s and template information ( ) of media segment 10.

Figure 9:
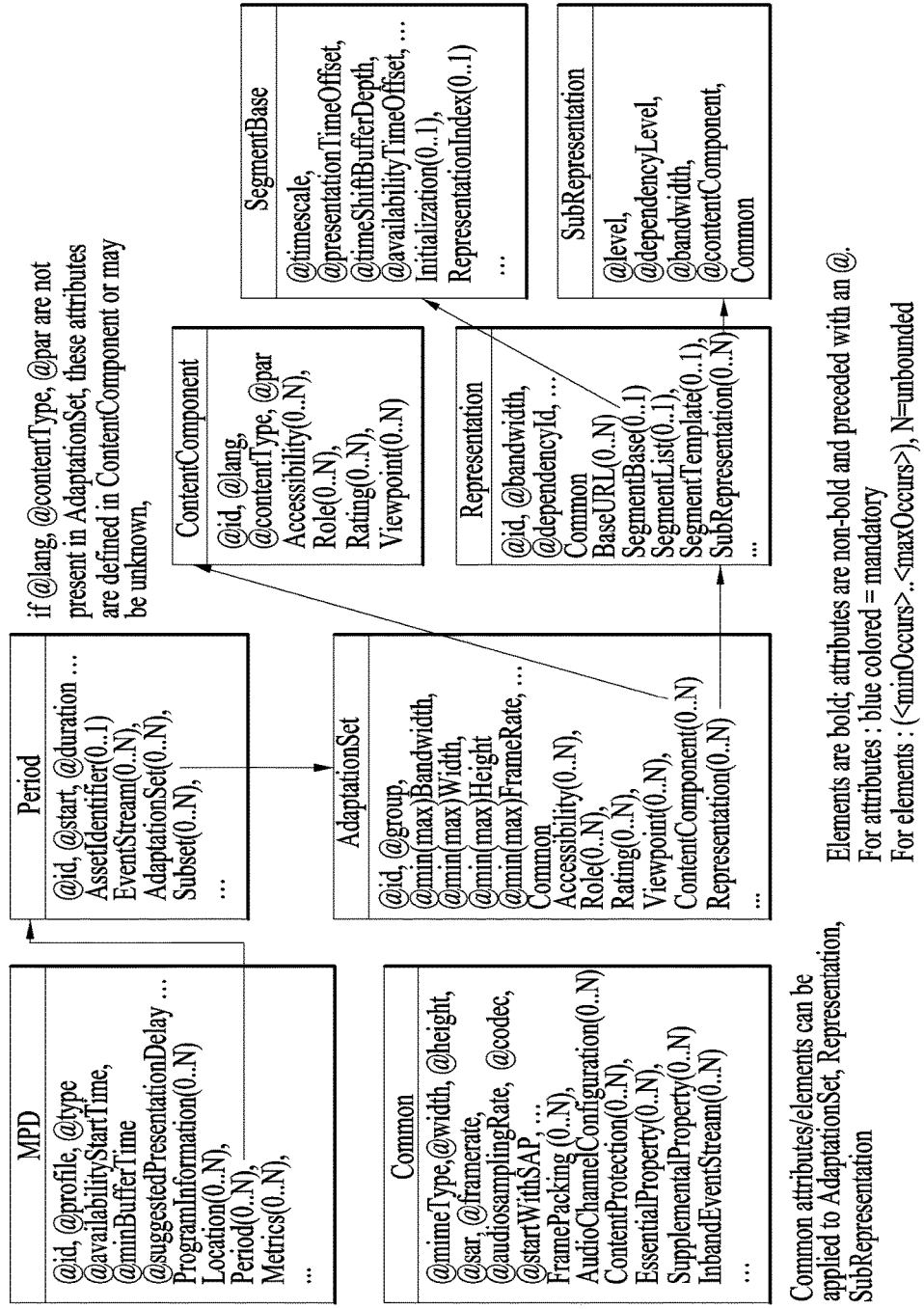
FIG. 9 is a diagram illustrating the DASH data model according to one embodiment of the present invention in more detail.

FIG. 9 is a diagram illustrating the DASH data model according to one embodiment of the present invention in more detail.

The DASH data model according to one embodiment of the present invention can be represented by a relationship among an MPD element, a Period element, an AdaptationSet element, a Representation element, a SubRepresentation element, a ContentComponent element and/or a SegmentBase element.

The MPD element includes @id, @profile, @type, @availabilityStartTime, @minBufferTime, @ suggestedPresentationDelay, programInformation (0 . . . N), Location (0 . . . N), Period (0 . . . N) and/or Metrics (0 . . . N). Here, @profile and/or @minBufferTime may be mandatory fields.

The Period element includes @id, @start, @duration, AssetIdentifier (0 . . . N), EventStream (0 . . . N), AdaptationSet (0 . . . N) and/or Subset (0 . . . N).

The AdaptationSet element includes @id, @group, @min(max)Bandwidth, @min(max)Width, @min(max)Height, @min(max)FrameRate, Common, Accessibility (0 . . . N), Role (0 . . . N), Rating (0 . . . N), Viewpoint (0 . . . N), ContentComponent (0 . . . N) and/or Representation (0 . . . N).

The Representation element includes @id, @bandwidth, @dependencyId, Common, BaseURL (0 . . . N), SegmentBase (0 . . . 1), SegmentList (0 . . . 1), SegmentTemplate (0 . . . 1) and/or SubRepresentation (0 . . . N). Here, @id and/or @bandwidth may be mandatory fields.

The SubRepresentation element includes @level, @dependencyLevel, @bandwidth, @contentComponent and/or Common.

The ContentComponent element includes @id, @lang, @contentType, @par, Accessibility (0 . . . N), Role (0 . . . N), Rating (0 . . . N) and/or Viewpoint (0 . . . N). Here, when AdaptationSet does not include @lang, @contentType and/or @par, these fields may be defined or not in ContentComponent.

The SegmentBase element includes @timescale, @presentationTimeOffset, @ timeShiftBufferDepth, @ availabilityTimeOffset, Initialization (0 . . . N) and/or RepresentationIndex (0 . . . 1).

The DASH data model according to one embodiment of the present invention includes common attributes and elements.

The common attributes and elements @mimeType, @width, @height, @sar, @framerate, @audiosamplingRate, @codec, @startWithSAP, FramePacking (0 . . . N), AudioChannelConfiguraiton (0 . . . N), ContentProtection (0 . . . N), EssentialProperty (0 . . . N), SupplementalProperty (0 . . . N) and/or InbandEventStream (0 . . . N).

The aforementioned common attributes and elements may be included in AdaptationSet, Representation and/or SubRepresentation and applied.

In this figure and the above description, fields having @ in front of the names thereof indicate attributes and fields without @ indicate elements. Furthermore, (0 . . . N) following element names indicates presence of zero to N elements. Here, N refers to infinite.

According to one embodiment of the present invention, description of elements or attributes in the MPD conforms to definition of DASH standards.

The MPD is a description of media presentation for providing a streaming service.

The Period indicates a media presentation interval. Consecutive sequences of all periods constitute media presentation.

The Segment indicates a data unit related to a URL and a byte range described by the MPD.

The Adaptation Set indicates a set of encoded versions which can be exchanged with one or more media content components.

The Representation indicates a set of one or more media streams and encapsulation in a transport format.

The Sub-Representation indicates part of Representation described by the MPD.

FIG. 10 is a diagram illustrating HDR configuration description according to one embodiment of the present invention.

According to one embodiment of the present invention, the HDR configuration description (HDR configuration information) can be included in an HDRConfiguration element and described by this element.

The HDRConfiguration element according to one embodiment of the present invention includes @schemeIdUri, @value and @id. Here, @schemeIdUri may be a mandatory field and @value and @id may be optional fields (L10010).

The @schemeIdUri indicates a URI for identifying the corresponding schema. The semantic of this element can be specific to the schema described by this attribute. This attribute may be a URN or a URL. When the URL is used as this attribute, the attribute can include date information in the form of mmyyyy.

The @value indicates a value for this element. The space and semantic for this value can be defined by the schema identified by the @schemeIdUri.

@id indicates an identifier for this element. Elements having the same attribute value can be identical to each other. That is, when elements having the same element value are present, only one of the elements may be processed and the other element may not be processed.

The HDRConfiguration element according to one embodiment of the present invention may be represented in the form of L10020 in this figure.

FIG. 11 illustrates @schemeIdUri and @value of the HDRConfiguration element according to one embodiment of the present invention.

According to one embodiment of the present invention, @schemeIdUri of the HDRConfiguration element including HDR configuration description may have urn:mpeg:dash:hdr:201x (L11010).

According to one embodiment of the present invention, @value of the HDRConfiguration element including HDR configuration description may include OETF, maxLuminance, minLuminance, maxFrameLuminance, maxPixelLuminance, minPixelLuminance, HDRTypeTransitionFlag, HDRSDRTransitionFlag, SDRHDRTransitionFlag and/or SDRCompatibility (L11020).

The OETF indicates an identifier for an OETF (optoelectronic transfer function) of a source picture of video media components. This attribute can be represented as a non-negative integer in decimal notation. This attribute may be a mandatory field. This attribute can indicate an EOTF that is not an OETF and may be called transfer characteristics.

The maxLuminance indicates the maximum luminance of a mastering display. This attribute can have a value in the range of 100 to 10000. This attribute can be represented as a non-negative integer in the decimal notation. This attribute may be a mandatory field.

The minLuminance indicates the minimum luminance of the mastering display. This attribute can have a value in the range of 0 to 0.10. This attribute can be represented as a non-negative fraction in the decimal notation. This attribute may be a mandatory field.

The maxFrameLuminance indicates a maximum value of the average luminance of one frame of a video media component. This attribute can be represented as a non-negative integer in decimal notation. This attribute may be a mandatory field.

The maxPixelLuminance indicates the luminance of the brightest pixel in a video media component. This attribute can be represented as a non-negative integer in decimal notation. This attribute may be a mandatory field.

The minPixelLuminance indicates the luminance of the darkest pixel in the video media component. This attribute can be represented as a non-negative integer in decimal notation. This attribute may be a mandatory field.

The HDRTypeTransitionFlag indicates the end of the current HDR video media component or transition from the current HDR type to another HDR type in the video media component. This attribute may be an optional field having a default value. When this attribute is not present, this attribute can have a value of "false" which is a default value. When this attribute is present and set to a value "true", the attribute has the aforementioned meaning. Here, when two HDR video media components have different HDR types, this means that one or more attributes/elements constituting one HDR video media component have different values from the other HDR video media component. For example, when HDR type #1 indicates the type of an HDR video media component having oeft:3, max_lum:100, min_lum:0.5, max_frame_lum:0 and max_pixel_lum:0 and HDR type #2 indicates the type of an HDR video media component having oeft:1, max_lum:1000, min_lum:0.05, max_frame_lum:0 and max_pixel_lum:0, these two HDR video media components have different types.

The HDRSDRTransitionFlag indicates the end of the current HDR video media component or transition from HDR to SDR in the video media component. This attribute may be an optional field having a default value. When this attribute is not present, the attribute can be set to "false" which is a default value. When this attribute is present and set to "true", this attribute has the aforementioned meaning.

The SDRHDRTransitionFlag indicates the end of the current SDR video media component or transition from SDR to HDR in the video media component. This attribute may be an optional field having a default value. When this attribute is not present, the attribute can be set to "false" which is a default value. When this attribute is present and set to "true", this attribute has the aforementioned meaning.

The SDRCompatibility indicates whether a video media component is compatible with SDR.

According to one embodiment of the present invention, the OETF attribute means "reserved" when set to 0, OETF according to ITU-R BT.1886 when set to 1, OETF according to ITU-R REC.709 when set to 2, OETF according to ITU-R BT.2020 when set to 3, and reserved future use when set to 2 to 15 (L11030).

According to one embodiment of the present invention, the HDRConfiguration element shown in the figure may be represented by L11040 shown in the figure.

FIG. 12 illustrates description of @value of the HDRConfiguration element according to another embodiment of the present invention.

According to another embodiment of the present invention, @value of the HDRConfiguration element may further include HDRType (L12010).

According to one embodiment of the present invention, a transmission device can configure a set using a combination of HDR related parameters and identify the configured set using @HDRType. For example, Type A indicates a parameter set having an EOTF of SMPTE ST2084, a bit depth of 10 bits/pixel, peak luminance of 1000 nit, a codec of HEVC single codec, and metadata of SMPTE ST.2086.

HDRType can identify an HDR related parameter set which is a combination of HDR related parameters. When this attribute indicates "unspecified" when set to 0, indicates Type A when set to 1, indicates Type B when set to 2, and indicates Type 3 when set to 3. According to one embodiment of the present invention, when this attribute is 0 and thus indicates "unspecified", OETF, maxLuminance, minLuminance, maxFrameLuminance, maxPixelLuminance and minPixelLuminance values can be mandatorily included in the corresponding HDR related parameter set. On the contrary, when this attribute has a non-zero value and thus indicates a determined type, the OETF, maxLuminance, minLuminance, maxFrameLuminance, maxPixelLuminance and minPixelLuminance values may not be included in the corresponding HDR related parameter set, or may be optionally or repeatedly included therein. This attribute can indicate HDR solution type. For example, this attribute can indicate Dolby dual layer, Dolby single layer solution, HLG, PRIME SINGLE and solution of Technicolor.

According to one embodiment of the present invention, the HDRConfiguration element having @HDRType as a value of @value can be represented by L12020 shown in this figure.

FIG. 13 is a diagram showing a configuration of common attributes and elements according to one embodiment of the present invention.

According to one embodiment of the present invention, HDR configuration description can be included in common attributes and elements. The common attributes and elements can be applied to an adaptation set, representation and/or sub-representation.

The common attributes and elements according to one embodiment of the present invention can include @profile, @HDRFlag, @HDRTypeTransitionFlag, @HDRSDRTransitionFlag, @SDRHDRTransitionFlag, @SDRCompatibility, FramePacking and/or HDRConfiguration.

@profile indicates a profile which conforms to a related representation in a list of media presentation profiles. The value of this attribute may be a subset of values for higher hierarchical texts (representation, adaptation set and MPD).

@HDRFlag indicates whether the corresponding video media component supports HDR. This attribute may be an optional field.

@HDRTypeTransitionFlag, @HDRSDRTransitionFlag, @SDRHDRTransitionFlag and @SDRCompatibility have been described above.

FramePacking indicates frame-packing arrangement information of the corresponding video media component type. There are zero or N FramePacking elements.

HDRConfiguration indicates HDR configuration information of a video media component. There are zero or N HDRConfiguration elements.

FIG. 14 is a diagram showing a configuration of common attributes and elements according to another embodiment of the present invention.

According to another embodiment of the present invention, common attributes and elements can include @profile, @HDRFlag, @HDRTypeTransitionFlag, @HDRSDRTransitionFlag, @SDRHDRTransitionFlag, @SDRCompatibility, @OETF, @maxLuminance, @minLuminance, @maxFrameLuminance, @maxPixelLuminance and/or @minPixelLuminance.

FIG. 15 is a diagram showing a configuration of common attributes and elements according to another embodiment of the present invention.

According to another embodiment of the present invention, the common attributes and elements may further include @HDRType. This field has been described above.

FIG. 16 is a diagram showing a configuration of an EssentialProperty descriptor and a SupplementaryProperty descriptor according to one embodiment of the present invention.

According to one embodiment of the present invention, HDR configuration descriptor can be signaled using the EssentialProperty descriptor and/or SupplementaryProperty descriptor.

According to one embodiment of the present invention, the EssentialProperty descriptor and/or SupplementaryProperty descriptor can be included in the adaptation set when all representations in the adaptation set provide the same HDR capabilities. If not, the EssentialProperty descriptor and/or SupplementaryProperty descriptor can be included in each representation or sub-representation.

According to one embodiment of the present invention, the semantics of the EssentialProperty descriptor and/or SupplementaryProperty descriptor may be the same as the semantics of the aforementioned HDRConfiguration element. That is, the EssentialProperty descriptor and/or SupplementaryProperty descriptor include the fields included in the aforementioned HDRConfiguration element. Here, the EssentialProperty descriptor and/or SupplementaryProperty descriptor can be represented by L16010 in this field.

According to another embodiment of the present invention, the EssentialProperty descriptor and/or SupplementaryProperty descriptor can include @schemeIdUri, @value, @HDRTypeTransitionFlag, @HDRSDRTransitionFlag, @SDRHDRTransitionFlag, @SDRCompatibility, @OETF, @maxLuminance, @minLuminance, @maxFrameLuminance, @maxPixelLuminance and/or @minPixelLuminance (L16030). @value indicates the version of the descriptor. In the present embodiment, @schemeIdUri can have urn:mpeg:dash:hdr:201x. The other fields have been described above. According to another embodiment of the present invention, the EssentialProperty descriptor and/or SupplementaryProperty descriptor can be presented as L16030 in the figure.

According to one embodiment of the present invention, a descriptor in the specification can have the same meaning as an element. Further, although only the embodiment of the EssentialProperty descriptor is illustrated in the figure, the description of the EssentialProperty descriptor can be equally applied to the SupplementaryProperty descriptor.

FIG. 17 is a diagram showing a configuration of the EssentialProperty descriptor and the SupplementaryProperty descriptor according to another embodiment of the present invention.

According to another embodiment of the present invention, the EssentialProperty descriptor and the SupplementaryProperty descriptor can include @schemeIdUri and/or @value. @schemeIdUri has urn:mpeg:dash:hdr.201x and @value includes a value for HDRType. Here, the EssentialProperty descriptor and the SupplementaryProperty descriptor can be represented by L17010 shown in the figure.

According to another embodiment of the present invention, the EssentialProperty descriptor and/or the SupplementaryProperty descriptor can include @schemeIdUri, @value and/or @HDRType. @value indicates the version of the descriptor. In the present embodiment, @schemeIdUri can have urn:mpeg:dash:hdr.201x. @HDRType has been described above. According to another embodiment of the present invention, the EssentialProperty descriptor and the SupplementaryProperty descriptor can be represented by L17030 shown in the figure.

According to one embodiment of the present invention, a descriptor in the specification can have the same meaning as an element. Further, although only the embodiment of the EssentialProperty descriptor is illustrated in the figure, the description of the EssentialProperty descriptor can be equally applied to the SupplementaryProperty descriptor.

FIG. 18 is a diagram showing a configuration of an accessibility descriptor according to one embodiment of the present invention.

According to one embodiment of the present invention, the accessibility descriptor can be included in the adaptation set when all representations in the adaptation set provide the same capabilities. If not, the accessibility descriptor can be included in ContentComponent.

According to one embodiment of the present invention, the accessibility descriptor has @schemeIdUri set to urn:mpeg:dash:hdr:201x and includes @value which is an optional field for describing an HDR configuration.

According to one embodiment of the present invention, when @value is not present, the corresponding representation can support HDR capability. However, when @value is present, @value can include HDR configuration description.

According to one embodiment of the present invention, @value can include EOTF, EOTF_func, maxLuminance, minLuminance, maxFrameLuminance, maxPixelLuminance, minPixelLuminance, HDRTypeTransitionFlag, HDRSDRTransitionFlag, SDRHDRTransitionFlag and/or SDRCompatibility. Here, HDRTypeTransitionFlag, HDRSDRTransitionFlag and SDRHDRTransitionFlag have the same meaning as HDR_type_transition, HDR_SDR_transition and SDR_HDR_transition. The aforementioned fields have been described.

According to one embodiment of the present invention, @value can be represented by L18010 shown in the figure in ABNF (Augmented Backus-Naur Form).

According to one embodiment of the present invention, the EOTF_function field indicates "reserved" when set to 0, indicates an OETF according to ITU-R BT.1886 when set to 1, indicates an OETF according to ITU-R REC.709 when set to 2, indicates an OETF according to ITU-R BT.2020 when set to 3, and indicates reserved future use when set to 4 (L18020).

According to one embodiment of the present invention, the accessibility descriptor can be represented by L18030 shown in the figure.

FIG. 19 is a diagram showing a configuration of the accessibility descriptor according to another embodiment of the present invention.

According to another embodiment of the present invention, @value of the accessibility descriptor may further include HDRType. Here, HDRType has the same meaning as HDR_type. The HDRType field has been described above.

According to one embodiment of the present invention, @value can be represented by L19010 shown in the figure in ABNF (Augmented Backus-Naur Form)

According to one embodiment of the present invention, the accessibility descriptor can be represented by L19020 shown in the figure.

FIG. 20 is a diagram showing a configuration of a ContentComponent element according to an embodiment of the present invention.

According to one embodiment of the present invention, the HDR configuration description can be included in the ContentComponent element.

The ContentComponent element according to an embodiment of the present invention can include @id, @HDRFlag, @HDRTypeTransitionFlag, @HDRSDRTransitionFlag, @SDRHDRTransitionFlag, @SDRCompatibility, Accessibility and/or HDRConfiguration.

The ContentComponent element indicates description of one content component.

@id indicates the ID of the corresponding media component. This attribute can have a unique value in the corresponding adaptation set.

Accessibility indicates information about accessibility schema.

Fields other than the aforementioned fields have been described.

FIG. 21 is a diagram showing a configuration of the ContentComponent element according to another embodiment of the present invention.

According to another embodiment of the present invention, the ContentComponent element may further include @HDRType. This field has been described.

FIG. 22 is a diagram showing a configuration of a SegmentBase element according to one embodiment of the present invention.

According to one embodiment of the present invention, the HDR configuration description can be included in the SegmentBase element.

The SegmentBase element according to one embodiment of the present invention describes the SegmentBase element and this element describes a type for segment base information indicating a base type for other elements.

The SegmentBase element according to one embodiment of the present invention can include @timescale, @HDRFlag, @HDRTypeTransitionFlag, @HDRSDRTransitionFlag, @SDRHDRTransitionFlag, @SDRCompatibility, Initialization and/or HDRConfiguration.

@timescale describes a time scale in seconds, which is used to adjust different real-time duration values in segment information.

Initialization indicates a URL including an available byte range for the initialization segment.

Fields other than the aforementioned fields have been described above.

According to one embodiment of the present invention, the aforementioned elements and/or attributes were signaled at a parent level, and if the elements and/or attributes are signaled at a child level and values at the parent level differ from values at the child level, values of the elements and/or attributes signaled at the higher level can override values signaled at the lower level.

FIG. 23 is a diagram showing a configuration of the SegmentBase element according to another embodiment of the present invention.

According to another embodiment of the present invention, the SegmentBase element may further include @HDRType. This field has been described above.

FIG. 24 is a diagram showing a configuration of an AdaptationSet element according to one embodiment of the present invention.

The AdaptationSet element according to one embodiment of the present invention can include @xlink:href, @minDisplayLuminance, @maxDisplayLuminance, @maxAFLuminance, @maxCPLuminance and/or @minCPLuminance.

@xlink:href indicates a reference to a remote element entity including the AdaptationSet element. This attribute may be an optional field.

@minDisplayLuminance indicates a minimum mastering display luminance value of all representations in the adaptation set. When this attribute is not present, the value of the attribute may be unknown. This attribute may be an optional field.

@maxDisplayLuminance indicates a maximum mastering display luminance value of all representations in the adaptation set. When this attribute is not present, the value of the attribute may be unknown. This attribute may be an optional field.

@maxAFLuminance indicates a maximum average frame luminance level of all representations in the adaptation set. When this attribute is not present, the value of the attribute may be unknown. This attribute may be an optional field.

@maxCPLuminance indicates a maximum content pixel luminance value of all representations in the adaptation set. When this attribute is not present, the value of the attribute may be unknown. This attribute may be an optional field.

@minCPLuminance indicates a minimum content pixel luminance value of all representations in the adaptation set. When this attribute is not present, the value of the attribute may be unknown. This attribute may be an optional field.

According to one embodiment of the present invention, a DASH client can recognize minimum and/or maximum luminance values, a maximum average frame luminance level and a maximum content pixel luminance value of the mastering display for all representations in the corresponding adaptation set using the aforementioned attribute values. However, for substantial HDR related processes, the DASH client requires detailed information about HDR configuration elements included in adaptation sets, representations and/or sub-representations.

FIG. 25 is a diagram showing a configuration of the AdaptationSet element according to another embodiment of the present invention.

The AdaptationSet element according to another embodiment of the present invention can include @xlink:href, @minDisplayLuminance, @maxDisplayLuminance, @maxAFLuminance, @maxCPLuminance and/or @minCPLuminance. Here, these attributes may have different meaning from those described in the above-described embodiment.

@minDisplayLuminance indicates a minimum @minLuminance value in all representations in the adaptation set. The value of this attribute can have the same unit as @minLuminance. When this attribute is not present, the value of the attribute may be unknown. This attribute may be an optional field.

@maxDisplayLuminance indicates a maximum @maxLuminance value in all representations in the adaptation set. The value of this attribute can have the same unit as @maxLuminance. When this attribute is not present, the value of the attribute may be unknown. This attribute may be an optional field.

@maxAFLuminance indicates a maximum @maxFrameLuminance value in all representations in the adaptation set. The value of this attribute can have the same unit as @maxFrameLuminance. When this attribute is not present, the value of the attribute may be unknown. This attribute may be an optional field.

@maxCPLuminance indicates a maximum @maxPixelLuminance value in all representations in the adaptation set. The value of this attribute can have the same unit as @maxPixelLuminance. When this attribute is not present, the value of the attribute may be unknown. This attribute may be an optional field.

@minCPLuminance indicates a minimum @maxPixelLuminance value in all representations in the adaptation set. The value of this attribute can have the same unit as @maxPixelLuminance. When this attribute is not present, the value of the attribute may be unknown. This attribute may be an optional field.

FIG. 26 is a diagram showing a configuration of the AdaptationSet element according to another embodiment of the present invention.

The AdaptationSet element according to another embodiment of the present invention may further include @HDRType. This field has been described above.

Figure 27:
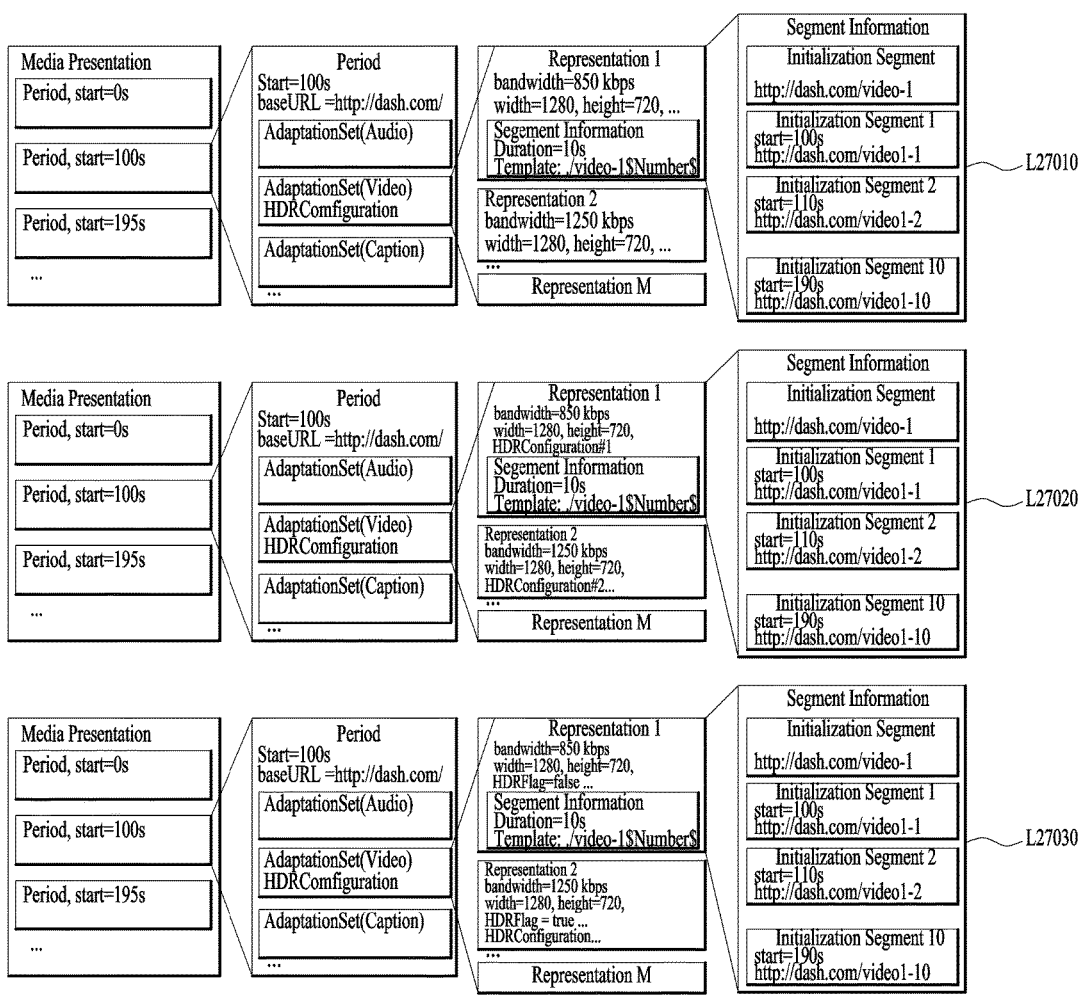
FIG. 27 is a diagram showing differences in configurations and effects according to positions including HDR configuration description according to one embodiment of the present invention.

FIG. 27 is a diagram showing differences in configurations and effects according to positions including the HDR configuration description according to one embodiment of the present invention;

According to one embodiment of the present invention, the adaptation set may include HDR configuration description. Here, the HDR configuration description can be included in the adaptation set by being included in the HDRConfiguration descriptor, the EssentialProperty descriptor and/or the SupplementaryProperty descriptor. In this case, the HDR configuration description can be applied to representations in the corresponding adaptation set. Here, the HDR configuration description can have the same meaning as the HDR configuration parameter. Referring to L27010 of the figure, the HDR configuration description is included in AdaptationSet (video). Here, the HDR configuration description can be applied to all representations from Representation 1 to Representation M (L27010).

According to another embodiment of the present invention, different HDR configuration descriptions can be included in representations and signaled. That is, the HDR configuration description can be included in a representation without being included in the adaptation set, distinguished from the above-described embodiments. In this case, the HDR configuration description can be applied to the corresponding representation. Referring to L27020 of the figure, the figure shows an embodiment in which different HDR configuration descriptions are signaled in different representations. Different HDR configuration descriptions can be applied by selecting representations. For example, when Representation 1 is selected, HDRConfiguration#1 can be applied in order to support HDR rendering. When Representation 2 is selected, HDRConfiguration#2 can be applied in order to support HDR rendering (L27020).

According to another embodiment of the present invention, one adaptation set can include zero or more representations which do not support HDR rendering and zero or more representations which support HDR rendering. In this case, the HDRFlag attribute included in the representation element can be set to "false" to signal that the corresponding representation cannot support HDR rendering. Referring to L27030 of the figure, AdaptationSet (Video) includes Representation 1 which cannot support HDR rendering and Representation 2 which can support HDR rendering (L27030).

Figure 28:
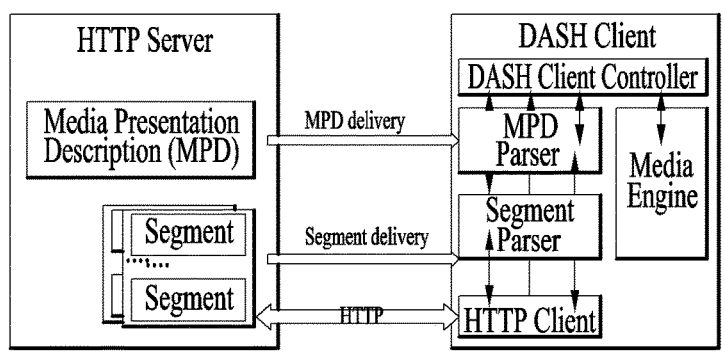
FIG. 28 is a diagram showing a configuration of a system including an HTTP server and a DASH client according to one embodiment of the present invention.

FIG. 28 is a diagram showing a configuration of a system including an HTTP server and a DASH client according to one embodiment of the present invention.

According to one embodiment of the present invention, DASH (Dynamic Adaptive Streaming over HTTP) is a method for supporting HTTP based adaptive streaming and can support seamless A/V content reproduction. The figure shows the overall operation procedure for DASH based adaptive streaming.

A DASH client according to one embodiment of the present invention includes a DASH client controller, an MPD parser, a segment parser, an HTTP client and/or a media engine.

MPD (Media Presentation Description) is a file including detailed information used for the DASH client to dynamically acquire segments and can be represented in XML.

The DASH client controller dynamically generates a command for requesting the MPD and segments on the basis of a network state and permits acquired information to be used in the media engine.

The MPD parser parses the acquired MPD in real time and causes the DASH client controller to generate a command for acquiring necessary segments.

The segment parser can parse an acquired segment in real time and perform a specific operation of the media engine depending on the contents of the segment.

The HTTP client requests a necessary segment from an HTTP server and delivers an MPD/segment included in an HTTP response acquired from the server to the MPD/segment parser.

The media engine displays a segment on the screen using media information included in the segment.

According to one embodiment of the present invention, the DASH client acquires an MPD first. Then, the DASH client selects an appropriate representation using information described in the MPD and requests a corresponding segment from a server using access information for the segment included in the representation. After acquisition of the segment, the DASH client delivers the segment to the media engine to display the segment on the screen. The DASH client adaptively requests and acquires a necessary segment by reflecting presentation time and network state therein in real time and delivers the segment to the media engine, thereby supporting seamless content reproduction.

Figure 29:
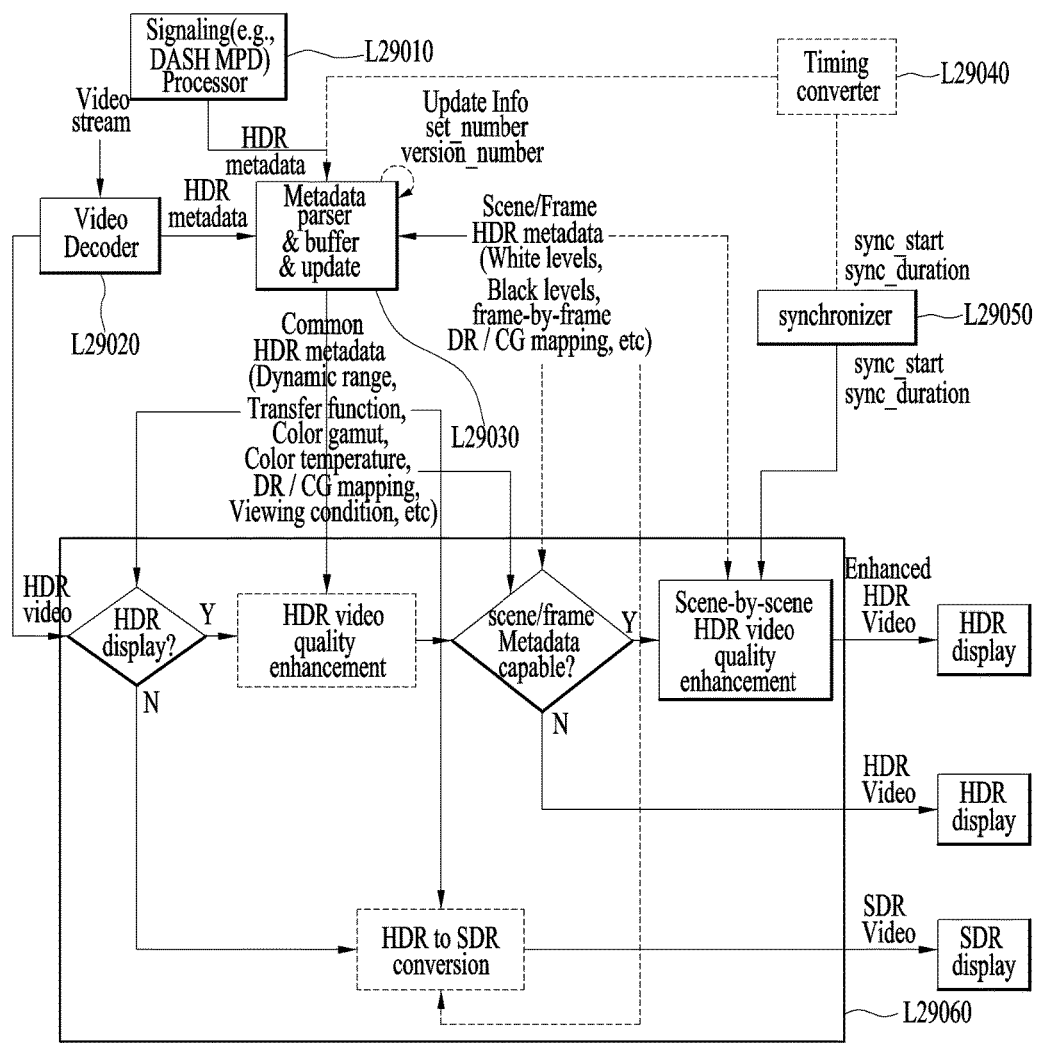
FIG. 29 is a diagram showing a configuration of a receiver according to one embodiment of the present invention.

FIG. 29 is a diagram showing a configuration of a receiver according to one embodiment of the present invention.

The receiver according to one embodiment of the present invention includes a signaling processor L29010, a video decoder L29020, a metadata processor (metadata parser & buffer & update) L29030, a timing converter L29040, a synchronization processor L29050 and/or an HDR processor L29060.

The signaling processor L29010 processes signaling of an MPD and delivers HDR metadata to the metadata processor L29030.

The video decoder L29020 receives a video stream and delivers HDR metadata included in the video stream to the metadata processor L29030. The video decoder delivers HDR video to the HDR processor L29060.

The metadata processor L29030 delivers common HDR metadata to the HDR processor L29060. The metadata processor updates information using set_number and/or version_number. The metadata processor delivers Scene/Frame HDR metadata to the HDR processor L29060.

The timing converter L29040 delivers timing information to the metadata processor L29030 and the synchronization processor L29050.

The synchronization processor L29050 can synchronize video data on a scene-by-scene basis using sync_start and/or sync_duration.

The HDR processor L29060 determines whether a display of the receiver is an HDR display using the common HDR metadata, and when the display is an HDR display, performs quality enhancement of HDR video using the common HDR metadata. The HDR processor L29060 determines whether scene/frame metadata is available and performs scene-by-scene HDR video quality enhancement when the scene/frame metadata is available. In addition, the HDR processor delivers the enhanced HDR video on which scene-by-scene HDR video quality enhancement has been performed to the HDR display. When the display of the receiver is not an HDR display, the HDR processor transforms HDR video into SDR video. Here, the common HDR metadata and/or scene/frame HDR metadata can be used. The SDR video data is delivered to an SDR display. When the scene/frame metadata is not available, the HDR processor delivers HDR video on which scene-by-scene or frame-by-frame quality enhancement has not been performed to the HDR display. Here, the common HDR metadata includes a dynamic range, a transfer function, a color gamut, a color temperature, DR/CG mapping, viewing condition, etc. The scene/frame HDR metadata includes white levels, black levels, frame-by-frame, DR/CG mapping, etc.

Figure 30:
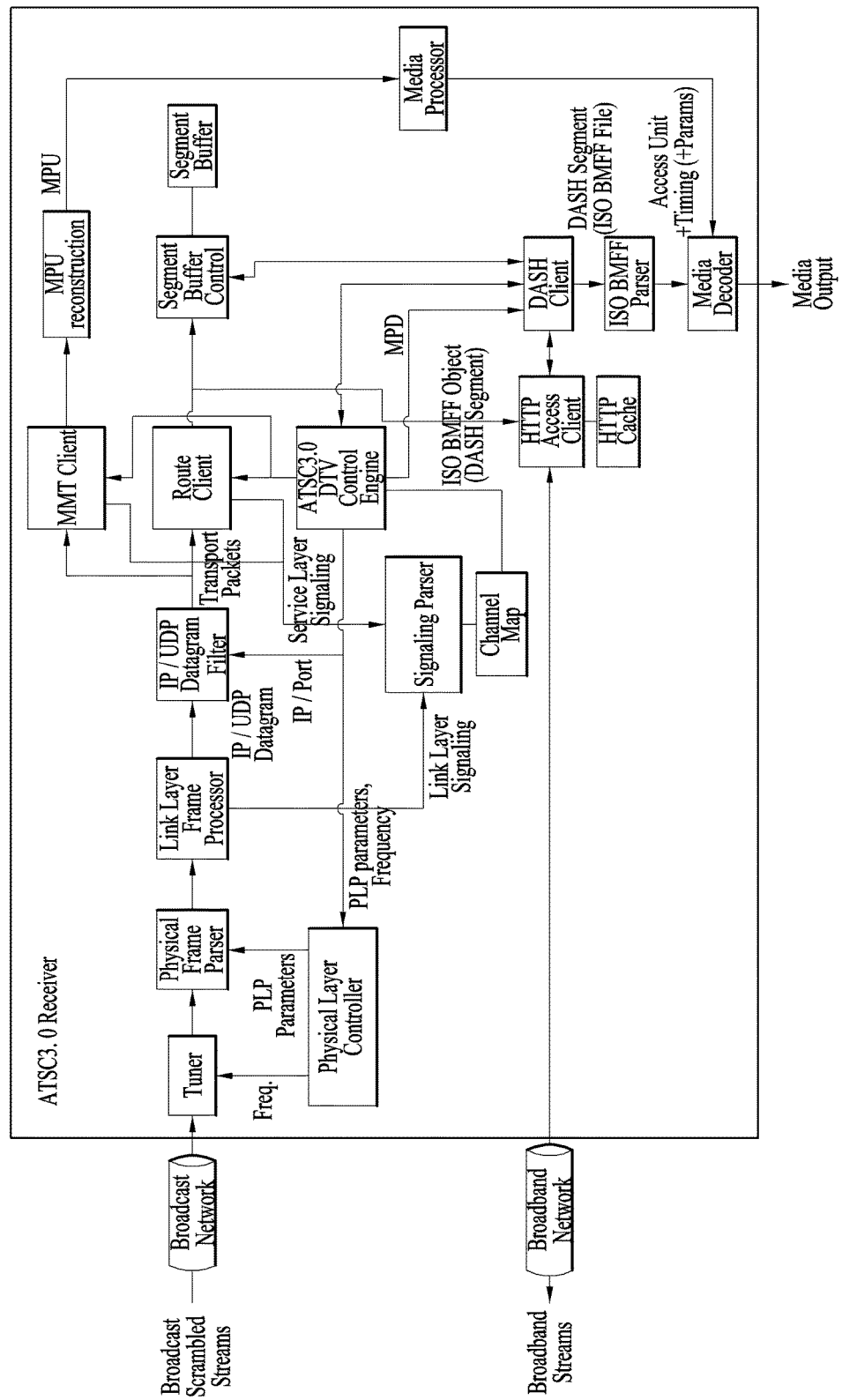
FIG. 30 is a block diagram of a hybrid broadcast receiver according to one embodiment of the present invention.

FIG. 30 is a block diagram of a hybrid broadcast receiver according to one embodiment of the present invention.

The receiver according to one embodiment of the present invention may include a tuner, a physical layer controller, a physical frame parser, a link layer frame processor, an IP/UDP datagram filter, an ATSC 3.0 DTV control engine, a route client, a segment buffer control, an MMT client, MPU reconstruction, a media processor, a signaling parser, a DASH client, an ISO BMFF parser, a media decoder and/or an HTTP access client. The components of the receiver may be processors which are hardware executing corresponding functions.

The tuner can receive a broadcast signal through a terrestrial broadcast channel, process the broadcast signal and convert the processed broadcast signal into an appropriate form (physical frames or the like).

The physical layer controller can control operations of the tuner and the physical frame parser using RF information of a broadcast channel to be received.

The physical frame parser can parse received physical frames and acquire link layer frame through processing related thereto.

The link layer frame processor can acquire link layer signaling from link layer frames or acquire IP/UDP datagrams and perform related computations.

The IP/UDP datagram filter can filter specific IP/UDP datagrams from received IP/UDP datagrams.

The ATSC 3.0 DTV control engine can interface with components and control operations of the components through parameter delivery.

The route client can process ROUTE (Real-Time Object Delivery over Unidirectional Transport) packets which support real-time object delivery and collect and process packets to generate one or more ISOBMFF (ISO Base Media File Format) objects.

Segment buffer control can control a buffer related to segment transmission between the route client and the DASH client.

The MMT client can process MMT (MPEG Media Transport) protocol packets which support real-time object delivery and collect and process packets.

MPU reconstruction can reconstruct an MPU (Media Processing Unit) from an MMTP packet.

The media processor can collect and process the reconstructed MPU.

The signaling parser can acquire and parse DTV broadcast service related signaling (link layer/service layer signaling) and generate and/or manage a channel map on the basis of the DTV broadcast service related signaling. This component can process low level signaling and service level signaling.

The DASH client can process real-time streaming or adaptive streaming related computation and acquired DASH segments.

The ISO BMFF parser can extract audio/video data and related parameters from an ISO BMFF object.

The media decoder can decode and/or present received audio and video data.

The HTTP access client can request specific information from the HTTP server and process a response to the request.

FIG. 31 is a diagram showing a configuration of HDR metadata set description according to one embodiment of the present invention.

According to one embodiment of the present invention, the HDR metadata set description is included in the HDRMetadataSet element and described thereby.

According to one embodiment of the present invention, a receiver can generate HDR content upon reception of SDR content and HDR metadata set description.

The HDRMetadataSet element according to one embodiment of the present invention includes @schemeIdUri, @value and/or @id. Here, @schemeIdUri may be a mandatory field and @value and @id may be optional fields (L31010).

@schemeIdUri indicates a URI which identifies a corresponding schema. The semantic of this element can be specified by the schema described by this attribute. This attribute may be a URN or URL. When a URL is used as this attribute, the attribute can include date information in the form of mmyyyy.

@value indicates a value for this element. The space and semantics with respect to this value can be defined by the aforementioned schema identified by @schemeIdUri.

@id indicates the ID for this element. Elements having the same attribute value can be identical to each other. That is, when there are elements having the same attribute value, only one of the elements can be processed and other elements may not be processed.

The HDRMetadataSet element according to one embodiment of the present invention can be represented by L31020 shown in the lower part of the figure.

FIG. 32 illustrates @schemeIdUri and @value of the HDRMetadataSet element according to one embodiment of the present invention.

According to one embodiment of the present invention, when SDR content includes SDR content and an HDR metadata set description, this means that the SDR content can be transformed into HDR content.

According to one embodiment of the present invention, @schemeIdUri of the HDR metadata set description can have urn:mpeg:dash:hdrmset:201x (S32010).

According to one embodiment of the present invention, @value of the HDRMetadataSet element including the HDR metadata set description includes HDRDynamicRangeType, HDRLuminanceMax, HDRLuminanceMin, HDREOTFType, HDRMaxFrameLuminance, HDRMaxPixelLuminance, HDRMinPixelLuminance, DRTransformCurveType, numOfSectionsPlus1, SectionNum, intersection, intersectionX, gain, offset and/or coeffA (S32020).

The HDRDynamicRangeType indicates the dynamic range of presented HDR video when an HDR metadata set description is added to SDR content to provide HDR video. In addition, this field indicates the dynamic range of presented HDR video when residual data of an enhancement layer as well as an HDR metadata set description are added to SDR content to provide HDR video. This field indicates that the corresponding HDR video has a dynamic range of a reference monitor determined in SMPTE when the field has a value of 1. Other field values can be used to reference values determined in the future. This attribute may be an optional field.

The HDRLuminanceMax indicates a maximum luminance value that can be represented in a mastering display. This attribute may be an optional field.

The HDRLuminanceMin indicates a maximum luminance value that can be represented in the mastering display. This attribute may be an optional field.

The HDREOTFType indicates an EOTF type of HDR video created by additionally applying the HDR metadata set description to base layer video (SDR video). Although an additional EOTF may not be required, in general, EOTF may be required when a receiver is separated or depending on display type. Furthermore, this field may be extended to include an arbitrary EOTF. This attribute may be an optional field.

HDRMaxFrameLuminance indicates a maximum average luminance value of one frame of an HDR video media component. When this attribute is applied to only one frame, the attribute indicates average luminance corresponding to one frame. This attribute can be represented as a non-negative integer in decimal notation. This attribute may be an optional field.

HDRMaxPixelLuminance indicates a maximum pixel luminance value in an HDR video media component. This attribute can be represented as a non-negative integer in decimal notation. This attribute may be an optional field.

HDRMinPixelLuminance indicates a minimum pixel luminance value in an HDR video media component. This attribute can be represented as a non-negative integer in decimal notation. This attribute may be an optional field.

DRTransformCurveType indicates a dynamic range transformation curve type. This field indicates a linear function when it is 0, indicates a logarithmic function when set to 1, indicates an exponential function when set to 2, indicates an inverse s-curve when set to 3, indicates a piecewise non-linear curve when set to 4, indicates a look-up table when set to 5 and indicates "reserved" when set to 6 to 15. This field may be a mandatory field.

numOfSectionsPlus1 has a value when DRTransformCurveType has a value in the range of 0 to 4. This field indicates the number of intersections when a transformation curve function according to DRTransformCurveType is classified as intersection. According to one embodiment of the present invention, intersection, intersection, gain, offset and coeffA can be optionally included depending on the value of this field and/or a transformation curve function according to DRTransformCurveType. When the transformation curve function according to DRTransformCurveType is not classified as a section, numOfSections may be 0 and numOfSectionsPlus1 may be 1.

SectionNum indicates a section number when a dynamic range transform curve according to DRTransformCurveType is divided into one or more sections.

intersectionX can be present when DRTransformCurveType is 3 or 4. When DRTransformCurveType is 0, 1 or 2, this field may not be present. For example, when the dynamic range transform curve is divided into two sections, the first intersection includes a value and the second intersectionX may not include a value.

intersection may be present when DRTransformCurveType is 4. When DRTransformCurveType is 0, 1, 2 or 3, this field may not be present. For example, when the dynamic range transform curve is divided into two sections, the first intersection includes a value and the second intersectionX may not include a value.

The gain can be present when DRTransformCurveType is 0, 1, 2, 3 or 4.

The offset can be present when DRTransformCurveType is 0, 1, 2, 3 or 4.

The coeffA can be present when DRTransformCurveType is 1, 2, 3 or 4. This field may not be present when DRTransformCurveType is 0.

FIG. 33 illustrates description of @value of the HDRMetadataSet element according to one embodiment of the present invention.

This figure shows a table which follows the table shown in the aforementioned figure and a description will be given following the above description.

According to one embodiment of the present invention, @value of the HDRMetadataSet element including the HDR metadata set description may further include entryLength, entryNum, inValue, outValue, HDRTypeTransition, HDRStart and/or HDREnd (L33010).

entryLength indicates the entry length of a look-up table when DRTransformCurveType is 5. Values of inValue and outValue can be repeatedly included depending on the value of entryLength.

entryNum indicates the number of current entries among the total entrylength when DRTransformCurveType is 5.

inValue can be present when DRTransformCurveType is 5. This field indicates an input value for transforming SDT content into HDR content.

outValue can be present when DRTransformCurveType is 5. This field indicates a converted output value when an input value for transforming SDT content into HDR content is received.

HDRTypeTransition indicates whether HDR type changes in the corresponding media component or the next media component. Here, HDR type change refers to change of the attribute of the element indicating HDR metadata or change of the attribute value. For example, HDR type #1 ■ oeft:3, max_lum:100, min_lum:0.5, max_frame_lum:0, max_pixel_lum:0, HDR type #2 ■ oeft:1, max_lum:1000, min_lum: 0.05, max_frame_lum:0, max_pixel_lum:0.

HDRStart indicates whether the corresponding SDR video media component includes a start point at which SDR is transformed into HDR.

HDREnd indicates whether the corresponding SDR video media component includes a part to which the HDR metadata set description is not applied.

According to one embodiment of the present invention, Set Type #1 or Set Type #2 can be included depending on the value of DRTransformCurveType.

According to one embodiment of the present invention, when DRTransformCurveType is 0 to 4, @value of the HDR metadata set description includes Set Type #1 (L32030). Set Type #1 includes numOfSectionsPlus1, SectionNum, intersectionX, intersection, gain, offset and/or coeffA. Here, when numOfSections has a value greater than 1, the values of intersectionX, intersection, gain, offset and/or coeffA can be repeated by the value of numOfSections and signaled.

According to one embodiment of the present invention, when DRTransformCurveType is 5, @value of the HDR metadata set description includes Set Type #2 (L33020). Set Type #2 (L33020) includes entryLength, entryNum, inValue and/or outValue. Here, when entryNum is greater than 1, the values of entryNum, inValue and/or outValue can be repeated by the value of entryNum and signaled.

According to one embodiment of the present invention, the HDRMetadataSet element including the HDR metadata set description can be represented as indicated by L33030 shown in the low part of the figure.

FIG. 34 is a diagram showing description of HDRDynamicRangeType and DRTransformCurveType according to one embodiment of the present invention.

HDRDynamicRangeType and DRTransformCurveType illustrated in the figure have been described above in detail.

FIG. 35 illustrates description of @schemeIdUri and @value of the HDRMetadataSet element according to one embodiment of the present invention.

According to one embodiment of the present invention, when SDR content includes SDR content and HDR metadata set description, this indicates that the SDR content can be transformed into HDR content.

According to another embodiment of the present invention, the HDR metadata set description can have urn:mpeg:dash:hdrmset:201x (L35010).

According to another embodiment of the present invention, @value of the HDRMetadataSet element including the HDR metadata set description includes HDRDynamicRangeType, HDRLuminanceMax, HDRLuminanceMin, HDREOTFType, HDRMaxFrameLuminance, HDRMaxPixelLuminance, HDRMinPixelLuminance, DRTransformCurveType, HDRStart and/or HDREnd (L35020). These fields have been described above.

According to one embodiment of the present invention, the HDREOTFType field indicates "reserved" when set to 0, indicates an EOTF according to ITU-R BT.1886 when set to 1, indicates an EOTF according to ITU-R REC.709 when set to 2, indicates an EOTF according to ITU-R BT.2020 when set to 3, and indicates reserved future use when set to 4 to 15 (L35050).

FIG. 36 is a diagram showing a configuration of a dynamic range transformation curve set description according to one embodiment of the present invention.

According to one embodiment of the present invention, the dynamic range transformation curve set description is included in a DRTransformationCurveSet element and described thereby.

According to one embodiment of the present invention, a receiver can map SDR to HDR using a DR transformation curve described by the dynamic range transformation curve set description.

The DRTransformationCurveSet element according to one embodiment of the present invention includes @schemeIdUri, @value and/or @id. Here, @schemeIdUri may be a mandatory field and @value and @id may be optional fields (L36010).

@schemeIdUri indicates the URI that identifies the corresponding schema. The semantics of this element can be specified by the schema described by this attribute. This attribute may be a URN or a URL. When a URL is used as this attribute, the attribute can include date information in the form of mmyyyy.

@value indicates the value for the element. The space and semantics for this value can be defined by the schema identified by @schemeIdUri.

@id indicates the ID for this element. Elements having the same attribute value can be identical to each other. That is, when there are elements having the same attribute value, only one of the elements can be processed and other elements may not be processed.

According to one embodiment of the present invention, @schemeIdUri of the dynamic range transformation curve set description can have urn:mpeg:dash:drtcurveset:201x (L36020).

According to one embodiment of the present invention, @value of the DRTransformationCurveSet element including the dynamic range transformation curve set description includes numOfSectionsPlus1, SectionNum, intersectionX, intersection, gain, offset and/or coeffA (L36030). These fields have been described above.

According to one embodiment of the present invention, when DRTransformCurveType is 0 to 4 and numOfSections is greater than 1, the values of intersectionX, intersection, gain, offset and/or coeffA can be repeated by the value of numOfSections and signaled (L36040).

FIG. 37 is a diagram showing a configuration of dynamic range transformation look-up table set description according to one embodiment of the present invention.

According to one embodiment of the present invention, the dynamic range transformation look-up table set description can be included in a DRTransformationLUTSet element and described thereby.

According to one embodiment of the present invention, a receiver can map SDR to HDR using a DR transformation LUT described by the dynamic range transformation look-up table set description.

The DRTransformationLUTSet element according to one embodiment of the present invention includes @schemeIdUri, @value and/or @id. Here, @schemeIdUri may be mandatory field and @value and @id may be optional fields (L37010).

@schemeIdUri indicates the URI which identifies the corresponding schema. The semantics of this element can be specified by the schema described by this attribute. This attribute may be a URN or a URL. When a URL is used as this attribute, the attribute can include date information in the form of mmyyyy.

@value indicates the value for the element. The space and semantics for this value can be defined by the schema identified by @schemeIdUri.

@id indicates the ID for this element. Elements having the same attribute value can be identical to each other. That is, when there are elements having the same attribute value, only one of the elements can be processed and other elements may not be processed.

According to one embodiment of the present invention, @schemeIdUri of the dynamic range transformation look-up table set description can have urn:mpeg:dash:drtlutset:201x (L37020).

According to one embodiment of the present invention, @value of the DRTransformationLUTSet element including the dynamic range transformation look-up table set description can include entryLength, entryNum, inValue and/or outValue (L37030). These fields have been described above.

According to one embodiment of the present invention, when DRTransformCurveType is 5 and entryNum is greater than 1, the values of entryNum, inValue and/or outValue can be repeated by the value of entryNum and signaled (L37040).

FIG. 38 is a diagram showing a configuration of an SDR metadata description according to one embodiment of the present invention.

According to one embodiment of the present invention, the SDR metadata description can be included in an SDRMetadata element and be described thereby.

According to one embodiment of the present invention, when SDR content includes SDR content and the HDR metadata set description, which means that the SDR content can be transformed into HDR content. Further, the SDR content can additionally include the SDR metadata description indicating information about the SDR content.

The SDRMetadata element according to one embodiment of the present invention includes @schemeIdUri, @value and/or @id. Here, schemeIdUri may be a mandatory field and @value and @id may be optional fields (L38010).

@schemeIdUri indicates the URI which identifies the corresponding schema. The semantics of this element can be specified by the schema described by this attribute. This attribute may be a URN or a URL. When a URL is used as this attribute, the attribute can include date information in the form of mmyyyy.

@value indicates the value for the element. The space and semantics for this value can be defined by the schema identified by @schemeIdUri.

@id indicates the ID for this element. Elements having the same attribute value can be identical to each other. That is, when there are elements having the same attribute value, only one of the elements can be processed and other elements may not be processed.

According to one embodiment of the present invention, @schemeIdUri of the SDR metadata description can have urn:mpeg:dash:drtlutset:201x (L38020).

According to one embodiment of the present invention, @value of the SDRMetadata element including the SDR metadata description can include SDRDynamicRangeType, SDRLuminanceMax, SDRLuminanceMin, SDREOTFType, SDRMaxFrameLuminance, SDRMaxPixelLuminance and/or SDRMinPixelLuminance (L38030).

SDRDynamicRangeType indicates the dynamic range of a base layer image. This field indicates that corresponding HDR video has a luminance range of the reference monitor determined in SMPTE when set to 1, indicates that the HDR video has an arbitrary luminance range when set to 2, and other values thereof can be used to indicate standard values determined in the future. This attribute may be an optional field.

SDRLuminanceMax indicates a maximum luminance value that can be represented in the SDR mastering display.

SDRLuminanceMin indicates a minimum luminance value that can be represented in the SDR mastering display.

SDREOTFType indicates an EOTF function type used to encode SDR video. Widely used EOTFs such as ITU-R BT.1886 and REC.709 can be delivered using VUI information, in general. This field can be set to a value which indicates the same EOTF as the corresponding part of VUI. Further, this field can be extended to include an arbitrary EOTF. This attribute may be an optional field.

SDRMaxFrameLuminance indicates a maximum average luminance value of one frame of an SDR video media component. When this attribute is applied to only one frame, the attribute indicates an average luminance of the one frame. This attribute can be represented by a non-negative integer in decimal notation. This attribute may be an optional field.

SDRMaxPixelLuminance indicates a maximum pixel luminance in the SDR video media component. This attribute can be represented by a non-negative integer in decimal notation. This attribute may be an optional field.

SDRMinPixelLuminance indicates a minimum pixel luminance in the SDR video media component. This attribute can be represented by a non-negative integer in decimal notation. This attribute may be an optional field.

According to one embodiment of the present invention, the SDRMetadata element including the SDR metadata description can be represented by L38040 shown in the figure.

FIG. 39 is a diagram showing a configuration of a subset element according to one embodiment of the present invention.

According to one embodiment of the present invention, the HDR metadata set description can be included in the subset element. In addition, the subset element can be included in the period element of the MPD.

According to one embodiment of the present invention, the HDRMetadataSet element, DRTransformationCurveSet element, DRTransformationLUTSet element and/or SDRMetadata element can be included in the subset element, common element, AdaptationSet element, Representation element, Sub-Representation element, ContentComponent element and/or segment base element.

The subset element according to one embodiment of the present invention includes @contains, @id, @HDRType-Transition, @HDRStart, @HDREnd, HDRMetadataSet, DRTransformationCurveSet, DRTransformationLUTSet and/or SDRMetadata.

@contains describes adaptation sets included in one subset. This field can be described in the form of a list of @id values of adaptation sets separated by a white space.

@id indicates a unique identifier for the corresponding subset.

Other attributes and elements have been described above.

According to one embodiment of the present invention, when information included in the HDRMetadataSet element is applied to only one frame, the value of @HDRMaxFrameLuminance included in this element indicates an average luminance of one frame.

FIG. 40 is a diagram showing a configuration of an HDRMetadataProperty element according to one embodiment of the present invention.

According to one embodiment of the present invention, an HDRMetadataProperty element similar to the EssentialProperty element or SupplementaryProperty element present in DASH can be defined.

The HDRMetadataProperty element according to one embodiment of the present invention includes @schemeIdUri, @value and/or @id. Here, schemeIdUri may be a mandatory field and @value and @id may be optional fields (L40010).

@schemeIdUri indicates the URI which identifies the corresponding schema. The semantic of this element can be specified by the schema described by this attribute. This attribute may be a URN or a URL. When a URL is used as this attribute, the attribute can include date information in the form of mmyyyy.

@value indicates the value for the element. The space and semantic for this value can be defined by the schema identified by @schemeIdUri.

@id indicates the ID for this element. Elements having the same attribute value can be identical to each other. That is, when there are elements having the same attribute value, only one of the elements can be processed and other elements may not be processed.

According to one embodiment of the present invention, the HDRMetadataProperty element can be represented as indicated by L40020 shown in the figure.

The HDRMetadataProperty element according to one embodiment of the present invention can be included in the common element or attribute of the MPD. Accordingly, the HDRMetadataProperty element according to one embodiment of the present invention can be included in the AdaptationSet element, Representation element and/or SubRepresentation element of the MPD.

FIG. 41 is a diagram illustrating HDRMetadataProperty description according to one embodiment of the present invention.

According to one embodiment of the present invention, a transmitter can signal HDR type of an HDR video stream using a supplementary property and/or an elementary property. Furthermore, the transmitter can signal additional HDR related metadata for transforming SDR video into HDR video using the HDRMetadataProperty description.

According to one embodiment of the present invention, the HDR metadata set description, DR transformation curve set description, DR transformation LUT set description and/or SDRMetadata description using an HDRMetadataProperty descriptor. The HDRMetadataProperty descriptor according to one embodiment of the present invention can be included in the AdaptationSet element when all representations in the corresponding adaptation set provide the same information for HDR. In addition, the HDRMetadataProperty descriptor can be included in the Representation element and/or SubRepresentation element to signal HDR information corresponding to each representation and/or sub-representation. Here, the HDRMetadataProperty descriptor may have the same meaning as the HDRMetadataProperty element.

According to one embodiment of the present invention, the HDRMetadataProperty element including the HDR metadata set description, DR transformation curve set description, DR transformation LUT set description and/or SDRMetadata description can be represented as indicated by L41010 shown in the figure.

According to another embodiment of the present invention, the HDR metadata set description, DR transformation curve set description, DR transformation LUT set description and/or SDRMetadata description can be defined as attributes of the HDRMetadataProperty element.

According to another embodiment of the present invention, the HDRMetadataSet element, DRTCurveSet element, DRTLUTSet element and/or SDRMetadata element including the HDR metadata set description, DR transformation curve set description, DR transformation LUT set description and/or SDRMetadata description can have @schemeIdUri and @value as represented by L41020. Here, the @value element indicates the version of the aforementioned elements.

According to another embodiment of the present invention, the HDRMetadataProperty element including the HDR metadata set description, DR transformation curve set description, DR transformation LUT set description and/or SDRMetadata description can be represented as indicated by L41030 shown in the figure.

FIG. 42 is a diagram showing a configuration of an HDRMetadata element according to one embodiment of the present invention.

According to one embodiment of the present invention, HDRMetadata description including information for HDR can be included in the HDRMetadata element.

The HDRMetadata element according to one embodiment of the present invention can include @HDRDynamicRangeType, @HDRLuminanceMax, @HDRLuminanceMin, @HDREOTFType, @HDRMaxFrameLuminance, @HDRMaxPixelLuminance, @HDRMinPixelLuminance, @DRTransformCurveType, DRTC and/or DRTLUT. Here, fields other than DRTC and DRTLUT have been described above. Zero or more DRTC elements and/or the DRTLUT elements can be present.

FIG. 43 is a diagram showing a configuration of the DRTC (Dynamic range Transformation curve) element according to one embodiment of the present invention.

According to one embodiment of the present invention, the DRTC element can include a DRTCSection element. According to one embodiment of the present invention, as many DRTCSection elements as the number of intersections can be present when the transformation curve indicated by @DRTransformCurveType includes many intersections.

The DRTC element according to one embodiment of the present invention includes information about a transformation curve for transforming SDR video into HDR video. The DRTC element can be present when a function having DRTransformCurveType of 0 to 4 is represented. The DRTC element can have different attribute values according to DRTransformCurveType values. In the case of a function having DRTransformCurveType of 3 or 4, intersections are present and thus the DRTC element includes the DRTCSection element. The DRTCSection element can be repeated by the number of intersections and signaled. In the case of a function having DRTransformCurveType of 0, 1 or 2, there is no separation by intersections and thus the attribute of the DRTCSection element can be signaled only once. That is, the attribute is not repeatedly signaled. The DRTCSection element can include an attribute per intersection when an intersection of a transformation curve for transforming SDR video into HDR video is separated into multiple intersections.

The DRTC element according to one embodiment of the present invention includes the DRTCSection element, and the DRTCSection element includes @sectionNum, @intersectionX, @intersectionY, @gain, @offset and/or @coeffA. These fields have been described above (S43010).

L43020 to L43060 shown in the figure indicate functions of transformation curves identified by DRTransformCurveType. L43020 indicates a linear function, L43030 indicates a logarithmic function, L43040 indicates an exponential function, L43050 indicates an inverse s-curve, and L43060 indicates piecewise non-linear curves.

FIG. 44 is a diagram showing a configuration of a DRTLUT element according to one embodiment of the present invention.

According to one embodiment of the present invention, the DRTLUT element can include DRTLEntry elements. According to one embodiment of the present invention, there are DRTLEntry elements corresponding to an entry length.

The DRTLUT element according to one embodiment of the present invention includes information about a transformation look-up table for transforming SDR video into HDR video. The DRTLUT element can be present in the case of a look-up table having DRTransformCurveType of 5. The DRTLEntry element can include inValue and outValue values which are repeated by the entry length. The DRTLEntry element can include attribute values corresponding to the entry length of an LUT for transforming SDR video into HDR video. A look-up table according to one embodiment of the present invention can signal outValue corresponding to inValue. Here, when the look-up table includes all luminance values in a mapping range, inValue may not be transmitted and outValue can be signaled as a difference from a luminance value.

The DRTLUT element according to one embodiment of the present invention includes the DRTLEntry element, and the DRTLEntry element includes @entryNum, @inValue and/or @outValue. These fields have been described above (L44010).

According to one embodiment of the present invention, when the HDRMetadata element includes DRTC as an element and the DRTC element includes DRTSection as an element (when DRTransformCurveType is 0 to 4), the HDRMetadata element can be represented as indicated by L44020.

According to one embodiment of the present invention, when the HDRMetadata element includes DRTLUT as an element and the DRTLUT element includes DRTLEntry as an element (when DRTransformCurveType is 5), the HDRMetadata element can be represented as indicated by L44030.

FIG. 45 is a diagram showing a configuration of the subset element according to another embodiment of the present invention.

According to one embodiment of the present invention, the subset element can be configured such that attributes of the HDRMetadataSet element are included as attributes of the subset element and transformation curves or LUTs are included as lower elements of the subset element. In addition, the subset element can be included in the period element of the MPD.

According to one embodiment of the present invention, elements and/or attributes included as lower elements and/or attributes of the subset element can be included in the subset element, Common element, AdaptationSet element, Representation element, Sub-Representation element, Content-Component element and/or Segment base element.

The subset element according to one embodiment of the present invention includes @contains, @id, @HDRTypeTransition, @HDRStart, @HDREnd, @HDRDynamicRangeType, @HDRLuminanceMax, @HDRLuminanceMin, @HDREOTFType, @HDRMaxFrameLuminance, @HDRMaxPixelLuminance, @HDRMinPixelLuminance, @DRTransformCurveType, @SDRDynamicRangeType, @SDRLuminanceMax, @SDRLuminanceMin, @SDREOTFType, @SDRMaxFrameLuminance, @SDRMaxPixelLuminance, DRTC and/or DRTLUT. These fields have been described above.

FIG. 46 is a diagram showing a configuration of the subset element according to another embodiment of the present invention.

This figure shows a table which follows the table of the previous figure and has been described above.

FIG. 47 is a diagram showing a configuration of the subset element according to another embodiment of the present invention.

According to one embodiment of the present invention, the HDRMetadata element including the DRTC element and/or DRTLUT element can be included in the subset element. In addition, the subset element can be included in the period element of the MPD.

According to one embodiment of the present invention, elements and/or attributes included as lower elements and/or attributes of the subset element can be included in the subset element, common element, AdaptationSet element, Representation element, Sub-Representation element, Content-Component element and/or Segment base element.

The subset element according to one embodiment of the present invention includes @contains, @id, @HDRTypeTransition, @HDRStart, @HDREnd, HDRMetadata and/or SDRMetadata. These fields have been described.

FIG. 48 is a diagram showing a configuration of the Representation element according to one embodiment of the present invention.

According to one embodiment of the present invention, associated representation can be described by the Representation element including @associationId and/or @associationType. Associated representation is the same as normal representations except that the associated representation provides information about association with other representations. Distinguished from complementary representations, segments of the associated representation may not be information necessary for decoding and/or presentation of a representation identified by @associationId. (Optional) associated representation can be regarded as supplementary or descriptive information. According to one embodiment of the present invention, association type of the associated representation can be described by @associationType.

According to one embodiment of the present invention, @associationId and/or @associationType can only be used for representations which are not present in the same adaptation set.

The Representation element according to one embodiment of the present invention can include @id, @associationId and/or @associationType.

@id indicates a unique identifier for corresponding representation.

@associationId can describe all associated representations in decoding and/or presentation procedures. This field can be described in the form of a list of @id values separated by a white space.

@associationType describes an association type for each representation. Here, representations can be associated through @associationId. The value of this attribute indicates four character codes for a track reference type registered with MP4 registration authority. This attribute may not be present when @associationId is not present. This attribute can have as many values as the number of identifiers indicated by @associationId. This field can be described in the form of a list of @id values separated by a white space.

A track reference type according to one embodiment of the present invention includes "hint", "cdsc", "font", "hind", "vdep", "vplx", "subt" and/or "svdp".

A referenced track can include original media for "hint" track.

"cdsc" track describes a referenced track.

"font" track is defined in a referenced track and uses a delivered font.

"hind" track depends on a referenced hint track. That is, this track can be used only when the referenced hint track is used.

"vdep" track includes auxiliary depth video information for a referenced video track.

"vplx" track includes auxiliary parallax video information for a referenced video track.

"subt" track includes subtitles, timed text and/or graphical overlay information for a referenced track or another track of an alternative group including the referenced track.

"mtdt" track includes HDR metadata and/or other types of metadata for a referenced track.

"svdp" track describes a reference track having dependency on a referenced track. This track includes stereoscopic related metadata. This track can identify tracks of primary view and additional view sequences for left/right sequence types.

FIG. 49 is a diagram showing a configuration of MPD according to one embodiment of the present invention.

In the shown embodiment, each adaptation set includes one representation. In the case of an adaptation set for the HDR service, the HDRMetadataProperty element is included in the AdaptationSet element.

According to one embodiment of the present invention, the period element includes four AdaptationSet elements (Adaptation set 1, Adaptation set 2, Adaptation set 3 and Adaptation set 4).

Adaptation set 1 (HD SDR service, L49010) includes base video for HD SDR service. The AdaptationSet element which describes Adaptation set 1 includes the HDRMetadataProperty element which describes SDRMetadata description.

Adaptation set 2 (HD HDR service, L49020) includes base video and HDR metadata for HD HDR service. The AdaptationSet element which describes Adaptation set 2 includes the HDRMetadataProperty element which describes HDRMetadataSet description, the HDRMetadataProperty element which describes DRTransformationCurveSet description and the HDRMetadataProperty element which describes SDRMetadata description.

Adaptation set 3 (HD HDR service, L49030) includes enhancement video (additional video for UHD) for UHD SDR service. The AdaptationSet element which describes Adaptation set 3 includes the HDRMetadataProperty element which describes SDRMetadata description. Here, the Representation element included in the AdaptationSet element which describes Adaptation set 3 has v0 as a dependencyId attribute value, which indicates that enhancement video for the corresponding representation is video having dependency on base video for the representation included in Adaptation set 1.

Adaptation set 4 (HD HDR service, L49040) includes enhancement video (additional video for UHD) for UHD SDR service. The AdaptationSet element which describes Adaptation set 4 includes the HDRMetadataProperty element which describes HDRMetadataSet description, the HDRMetadataProperty element which describes DRTransformationCurveSet description and the HDRMetadataProperty element which describes SDRMetadata description. Here, the Representation element included in the AdaptationSet element which describes Adaptation set 4 has v1 as a dependencyId attribute value, which indicates that enhancement video for the corresponding representation is video having dependency on base video for the representation included in Adaptation set 2.

FIG. 50 is a diagram showing a configuration of MPD according to another embodiment of the present invention.

According to one embodiment of the present invention, the HDR service can be provided using only SDR video and HDR metadata, and enhancement data for HDR can be further transmitted in addition to the SDR video and the HDR metadata.

According to one embodiment of the present invention, when the enhancement data for HDR is additionally transmitted in addition to the SDR video and the HDR metadata, a new adaptation set (Adaptation set Y) for signaling information about the enhancement data for HDR can be additionally defined. Alternatively, enhancement data for HDR may be provided for each resolution. In this case, a new adaptation set and/or representation for describing each piece of enhancement data can be defined.

Adaptation set X (HD HDR service, L50010) includes base video and HDR metadata for HD HDR service. Adaptation set X indicates the configuration of the AdaptationSet element in the MPD when HDR service is provided using only SDR video and HDR metadata. The AdaptationSet element which describes Adaptation set X includes an HDRMetadataProperty element which describes HDRMetadataSet description, an HDRMetadataProperty element which describes DRTransformationCurveSet description and an HDRMetadataProperty element which describes SDRMetadata description.

Adaptation set Y (HD HDR service, L50020) includes base video, enhancement video and HDR metadata for the HD HDR service. Adaptation set Y indicates the configuration of the AdaptationSet element in the MPD when HDR service is provided using SDR video, enhancement video data for HDR and HDR metadata. The AdaptationSet element which describes Adaptation set Y includes the HDRMetadataProperty element which describes HDRMetadataSet description and the HDRMetadataProperty element which describes DRTransformationCurveSet description. Furthermore, The AdaptationSet element which describes Adaptation set Y includes a Representation element (id="v1 ") for base video (SDR video) and a Representation element (id="v2") for enhancement video (HDR video). The representation element (id="v2") has v1 as a dependencyID attribute value, which indicates that the enhancement video described in the Representation element (id="v2") has dependency on the base video described in the Representation element (id="v1").

FIG. 51 is a diagram showing a configuration of MPD according to another embodiment of the present invention.

According to one embodiment of the present invention, one adaptation set can include one or more representations, and in the case of an adaptation set for the HDR service, the HDRMetadataProperty element is included in the AdaptationSet element and/or the Representation element.

According to another embodiment of the present invention, a new adaptation set and/or representation for describing information about enhancement data for HDR can be defined. Further, enhancement data for HDR may be provided for each resolution. In this case, a new adaptation set and/or representation for describing each piece of enhancement data can be defined.

According to one embodiment of the present invention, the period element includes two AdaptationSet elements (Adaptation set 1 and Adaptation set 2).

Adaptation set 1 (HD SDR service/UHD SDR service, L51010) includes base video, enhancement video and HDR metadata. The AdaptationSet element which describes Adaptation set 1 includes a Representation element (id="v0") for base video (HD video) and a Representation element (id="v1") for enhancement video (UHD video). The Representation element (id="v1") has V0 as a dependencyID attribute value, which indicates that the enhancement video described in the Representation element (id="v1") has dependency on the base video described in the Representation element (id="v0"). The AdaptationSet element which describes Adaptation set 1 includes an HDRMetadataProperty element which describes SDRMetadata description.

Adaptation set 2 (HD HDR service/UHD HDR service, L51020) includes base video, enhancement video and HDR metadata. The AdaptationSet element which describes Adaptation set 2 includes a Representation element (id="v2") for base video (HD video) and a Representation element (id="v3") for enhancement video (UHD video). The Representation element (id="v3") has V2 as a dependencyID attribute value, which indicates that the enhancement video described in the Representation element (id="v3") has dependency on the base video described in the Representation element (id="v2"). The Representation element (id="v2") includes an HDRMetadataProperty element which describes HDRMetadataSet description, an HDRMetadataProperty element which describes DRTransformationCurveSet description and an HDRMetadataProperty element which describes SDRMetadata description.

FIG. 52 is a diagram showing a configuration of MPD according to another embodiment of the present invention.

According to one embodiment of the present invention, the period element can include a subset element, and the subset element can include HDR metadata for the HDR service.

According to another embodiment of the present invention, a new adaptation set, representation and/or subset for describing information about enhancement data for HDR can be defined. Furthermore, enhancement data for HDR may be provided for each resolution. In this case, a new adaptation set, representation and/or subset for describing each piece of enhancement data can be defined.

According to one embodiment of the present invention, the period element includes two AdaptationSet elements (Adaptation set 1 and Adaptation set 2) and four subset elements (Subset 1, Subset 2, Subset 3 and Subset 4).

Adaptation set 1 (HD SDR service, L52010, id=A0) includes base video for HD SDR service. Adaptation set 2 (UHD SDR service, L52020, id=A1) includes enhancement video (additional video for UHD) for UHD SDR service. A Representation element included in the AdaptationSet element which describes Adaptation set 2 has V0 as a dependencyID attribute value, which indicates that the enhancement video for the corresponding representation has dependency on the base video for representation included in Adaptation set 1.

Subset 1 (HD SDR service, L52030) includes Adaptation set 1 (HD SDR service, L52010, id=A0) and the Subset element which describes Subset 1 includes an SDRMetadata element.

Subset 2 (HD SDR service, L52030) includes Adaptation set 1 (HD SDR service, L52010, id=A0) and the Subset element which describes Subset 2 includes an HDRMetadata element including an SDRMetadata element and a DRTC element.

Subset 3 (UHD SDR service, L52030) includes Adaptation set 1 (HD SDR service, L52010, id=A0) and Adaptation set 2 (UHD SDR service, L52020, id=A1).

Subset 4 (UHD SDR service, L52030) includes Adaptation set 1 (HD SDR service, L52010, id=A0) and Adaptation set 2 (UHD SDR service, L52020, id=A1, and the subset element which describes Subset 3 includes an HDRMetadata element including a DRTC element.

FIG. 53 is a diagram showing a configuration of MPD according to another embodiment of the present invention.

According to one embodiment of the present invention, the AdaptationSet element can include a Role element which indicates whether the corresponding adaptation set includes main data or metadata.

According to another embodiment of the present invention, a new adaptation set, representation and/or subset for describing information about enhancement data for HDR can be defined. Furthermore, enhancement data for HDR may be provided for each resolution. In this case, a new adaptation set, representation and/or subset for describing each piece of enhancement data can be defined.

According to one embodiment of the present invention, the period element includes four AdaptationSet elements (Adaptation set 1, Adaptation set 2, Adaptation set 3 and Adaptation set 4).

Adaptation set 1 (HD SDR service, L53010) includes base video for HD SDR service. The AdaptationSet element which describes Adaptation set 1 includes a Role element having "main" as a value of @value.

Adaptation set 2 (HDR metadata, L53020) includes HDR metadata. The AdaptationSet element which describes Adaptation set 2 includes a Role element having "metadata" as a value of @value.

Adaptation set 3 (UHD SDR service, L53030) includes enhancement video (additional video for UHD) for UHD SDR service. The AdaptationSet element which describes Adaptation set 3 includes a Role element having "main" as a value of @value. Here, a representation element included in the AdaptationSet element which describes Adaptation set 3 has v0 as a dependencyID attribute value, which indicates that enhancement video for the corresponding representation has dependency on the base video for representation included in Adaptation set 1.

Adaptation set 4 (UHD SDR service, L53040) includes enhancement video (additional video for UHD) for UHD SDR service. The AdaptationSet element which describes Adaptation set 4 includes a Role element having "main" as a value of @value. Here, a representation element included in the AdaptationSet element which describes Adaptation set 4 has "vo v1" as a dependencyID attribute value, which indicates that enhancement video for the corresponding representation has dependency on the base video for representation included in Adaptation set 1 and the HDR metadata included in Adaptation set 2.

FIG. 54 is a diagram showing a configuration of MPD according to another embodiment of the present invention.

According to one embodiment of the present invention, a representation element can include @associationId and/or @associationType for providing information about association of the corresponding representation with another representation in a different adaptation set.

According to one embodiment of the present invention, the period element includes five AdaptationSet elements (Adaptation set 1, Adaptation set 2, Adaptation set 3, Adaptation set 4 and Adaptation set 5).

Adaptation set 1 (HD SDR service, L54010) includes base video for HD SDR service. The AdaptationSet element which describes Adaptation set 1 includes a Role element having "main" as a value of @value.

Adaptation set 2 (HDR metadata, L54020) includes HDR metadata. The AdaptationSet element which describes Adaptation set 2 includes a Role element having "metadata" as a value of @value. A representation element included in the AdaptationSet element which describes Adaptation set 2 includes "v3" as a value of @associationId and "mtdt" as a value of @associationType. Accordingly, it is possible to signal that the representation element (id="v1") included in the AdaptationSet element which describes Adaptation set 2 is associated with the representation element (id="v3") included in the AdaptationSet element which describes Adaptation set 4 and the representation element (id="v1") includes HDR metadata for the representation element (id="v3").

Adaptation set 3 (HD HDR service, L54030) includes base video for HD HDR service. The AdaptationSet element which describes Adaptation set 3 includes a Role element having "main" as a value of @value. Here, a representation element included in the AdaptationSet element which describes Adaptation set 3 includes "v1" as a dependencyID attribute value, which indicates that enhancement video for the corresponding representation has dependency on the HDR metadata for the representation included in Adaptation set 2.

Adaptation set 4 (UHD SDR service, L54040) includes enhancement video (additional video for UHD) for UHD SDR service. The AdaptationSet element which describes Adaptation set 4 includes a Role element having "main" as a value of @value. Here, a representation element included in the AdaptationSet element which describes Adaptation set 4 includes "vo" as a dependencyID attribute value, which indicates that enhancement video for the corresponding representation has dependency on the base video for the representation included in Adaptation set 1.

Adaptation set 5 (UHD HDR service, L54050) includes enhancement video (additional video for UHD) for UHD HDR service. The AdaptationSet element which describes Adaptation set 5 includes a Role element having "main" as a value of @value. Here, a representation element included in the AdaptationSet element which describes Adaptation set 5 includes "v2" as a dependencyID attribute value, which indicates that enhancement video for the corresponding representation has dependency on the base video for the representation included in Adaptation set 3.

FIG. 55 is a diagram showing a configuration of MPD according to another embodiment of the present invention.

According to another embodiment of the present invention, the representation element can include @associationId and/or @associationType for providing stereoscopic information about association of the corresponding representation with another representation in a different adaptation set. Stereoscopic information according to one embodiment of the present invention can include layer information, view information, disparity information and/or 3D information.

According to one embodiment of the present invention, the period element includes five AdaptationSet elements (Adaptation set 1, Adaptation set 2, Adaptation set 3, Adaptation set 4 and Adaptation set 5).

Adaptation set 1 (HD video for 2D services, L55010) includes video for 2D HD service on the basis of a right image. Here, it is assumed that a conventional receiver is not aware of the role schema. The AdaptationSet element which describes Adaptations set 1 includes a Role element having "main" as a value of @value.

Adaptation set 2 (HD video for 3D service, L55020) includes base video (right image) for SHVC. The AdaptationSet element which describes Adaptations set 2 includes a Role element having "main" as a value of @value and a Role element having "r0" as a value of @value.

Adaptation set 3 (UHD video for 2D service, L55030) includes enhancement video (additional video for UHD). The AdaptationSet element which describes Adaptation set 3 includes a Role element having "main" as a value of @value. Here, a representation element included in the AdaptationSet element which describes Adaptation set 3 has "vo" as a dependencyID attribute value, which indicates that enhancement video for the corresponding representation has dependency on the base video for the representation included in Adaptation set 1.

Adaptation set 4 (UHD video for 3D service, L55040) includes enhancement video (additional video for a left image). The AdaptationSet element which describes Adaptation set 4 includes a Role element having "main" as a value of @value and a Role element having "10" as a value of @value. Here, a representation element included in the AdaptationSet element which describes Adaptation set 4 has "v1" as a dependencyID attribute value, which indicates that enhancement video for the corresponding representation has dependency on the base video for the representation included in Adaptation set 2.

Adaptation set 5 (metadata for stereoscopic, L55050) includes stereoscopic metadata. The AdaptationSet element which describes Adaptation set 5 includes a Role element having "metadata" as a value of @value. A representation element included in the AdaptationSet element which describes Adaptation set 5 includes "v1 v3" as a value of @associationId and "svdp" as a value of @associationType. Accordingly, it is possible to signal that the representation element (id="v1") included in the AdaptationSet element which describes Adaptation set 2 and the representation element (id="v3") included in the AdaptationSet element which describes Adaptation set 4 are associated with the representation element (id="v4") included in the AdaptationSet element which describes Adaptation set 5 and the representation element (id="v4") includes stereoscopic metadata for the representation element (id="v1") and the representation element (id="v3").

Figure 56:
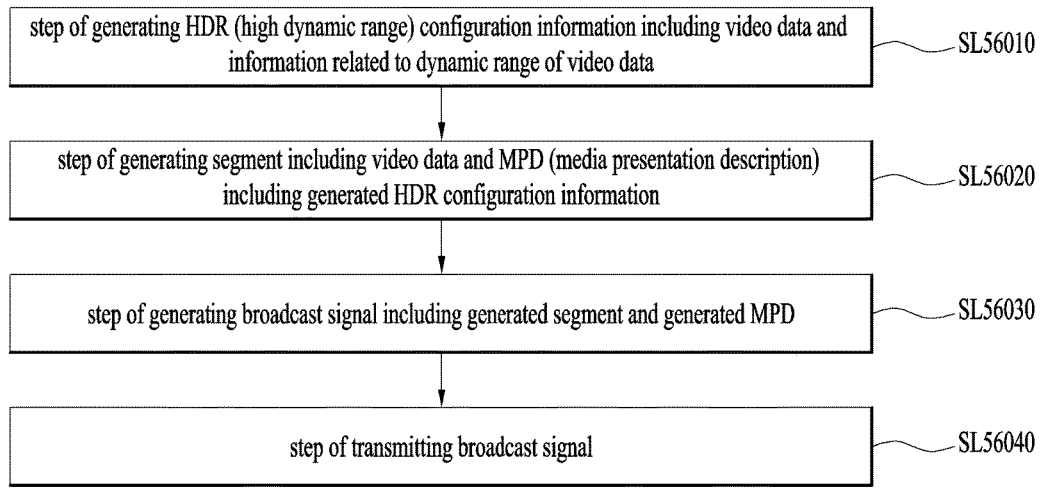
FIG. 56 is a diagram illustrating a broadcast signal transmission method according to one embodiment of the present invention.

FIG. 56 illustrates a method of transmitting a broadcast signal according to one embodiment of the present invention.

The method of transmitting a broadcast signal according to one embodiment of the present invention may include a step SL56010 of generating video data and HDR (High Dynamic Range) configuration information including information related to a dynamic range of the video data, a step SL56020 of generating a segment including the generated video data and an MPD (Media Presentation Description) including the generated HDR configuration information, a step SL56030 of generating a broadcast signal including the generated segment and the generated MPD, and/or a step SL56040 of transmitting the generated broadcast signal.

According to another embodiment of the present invention, the HDR configuration information may include at least one of OETF (optoelectronic transfer function) identification information for identifying an OETF applied to the video data, maximum luminance information indicating a maximum luminance of a mastering display for mastering the video data, minimum luminance information indicating a minimum luminance of the mastering display for mastering the video data, maximum frame luminance information indicating a maximum average luminance of a frame including the video data, maximum pixel luminance information indicating a maximum pixel luminance of the video data, and minimum pixel luminance information indicating a minimum pixel luminance of the video data.

According to another embodiment of the present invention, the HDR configuration information may include HDR type information for identifying a parameter set including at least one of the OETF identification information, the maximum luminance information, the minimum luminance information, the maximum frame luminance information, the maximum pixel luminance information and the minimum pixel luminance information.

According to another embodiment of the present invention, the HDR configuration information may include at least one of information indicating whether the video data is HDR, information indicating whether the parameter set of the video data has been changed, information indicating whether the dynamic range of the video data has been changed from HDR to SDR (Standard Dynamic Range), information indicating whether the dynamic range of the video data has been changed from SDR to HDR, and information indicating whether the video data is compatible with SDR.

According to another embodiment of the present invention, the HDR configuration information may be included in at least one of a Period element, an AdaptationSet element, a Representation element, a SubRepresentation element, a ContentComponent element, a SegmentBase element, an EssentialProperty element, a SupplementaryProperty element, an Accessibility element and a Subset element in the MPD.

According to another embodiment of the present invention, when the video data is SDR video data, the method of transmitting a broadcast signal may further include a step of generating at least one of HDR metadata set information for transforming the SDR of the video data into an HDR, transformation curve set information indicating information about a transformation curve used to transform the SDR of the video data into an HDR, LUT (Look-up Table) set information indicating information about an LUT used to transform the SDR of the video data into an HDR, and SDR information indicating SDR related information of the video data, and the MPD may include at least one of the HDR metadata set information, the transformation curve set information, the LUT set information and the SDR information.

According to another embodiment of the present invention, at least one of the HDR metadata set information, the transformation curve set information, the LUT set information and the SDR information may be included in at least one of the Period element, the AdaptationSet element, the Representation element, the SubRepresentation element, the ContentComponent element, the SegmentBase element, the EssentialProperty element, the SupplementaryProperty element, the Accessibility element and the Subset element in the MPD.

According to another embodiment of the present invention, the MPD may include a representation element including information about association of representations, the representation element may include information for identifying a representation associated with a representation described by the representation element and association type information indicating a type of association between the associated representation and the representation described by the representation element, and the association type information may include information indicating that the representation described by the representation element includes HDR related information for the associated representation, and information indicating that the representation described by the representation element includes stereoscopic information for the associated representation.

Figure 57:
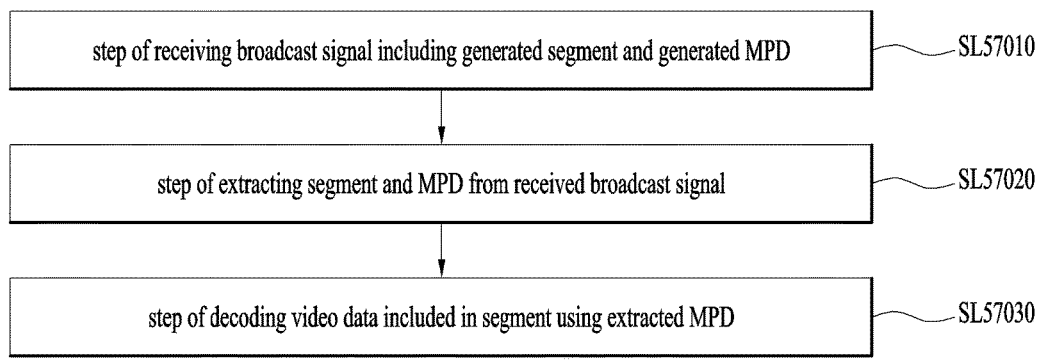
FIG. 57 is a diagram illustrating a broadcast signal reception method according to one embodiment of the present invention.

FIG. 57 illustrates a method of receiving a broadcast signal according to one embodiment of the present invention.

The method of receiving a broadcast signal according to one embodiment of the present invention may include a step SL57010 of receiving a broadcast signal including a segment and an MPD (Media Presentation Description), a step S57020 of extracting the segment and the MPD from the received broadcast signal and/or a step S57030 of decoding video data included in the segment using the extracted MPD. Here, the segment may include video data and the MPD may include HDR (High Dynamic Range) configuration information including information related to the dynamic range of the video data.

According to another embodiment of the present invention, the HDR configuration information may include at least one of OETF (optoelectronic transfer function) identification information for identifying an OETF applied to the video data, maximum luminance information indicating a maximum luminance of a mastering display for mastering the video data, minimum luminance information indicating a minimum luminance of the mastering display for mastering the video data, maximum frame luminance information indicating a maximum average luminance of a frame including the video data, maximum pixel luminance information indicating a maximum pixel luminance of the video data, and minimum pixel luminance information indicating a minimum pixel luminance of the video data.

According to another embodiment of the present invention, the HDR configuration information may include HDR type information for identifying a parameter set including at least one of the OETF identification information, the maximum luminance information, the minimum luminance information, the maximum frame luminance information, the maximum pixel luminance information and the minimum pixel luminance information.

According to another embodiment of the present invention, the HDR configuration information may include at least one of information indicating whether the video data is HDR, information indicating whether the parameter set of the video data has been changed, information indicating whether the dynamic range of the video data has been changed from HDR to SDR (Standard Dynamic Range), information indicating whether the dynamic range of the video data has been changed from SDR to HDR, and information indicating whether the video data is compatible with SDR.

According to another embodiment of the present invention, the HDR configuration information may be included in at least one of a Period element, an AdaptationSet element, a Representation element, a SubRepresentation element, a ContentComponent element, a SegmentBase element, an EssentialProperty element, a SupplementaryProperty element, an Accessibility element and a Subset element in the MPD.

According to another embodiment of the present invention, when the video data is SDR video data, the MPD may include at least one of HDR metadata set information for transforming the SDR of the video data into HDR, transformation curve set information indicating information about a transformation curve used to transform the SDR of the video data into HDR, LUT (Look-up Table) set information indicating information about an LUT used to transform the SDR of the video data into HDR, and SDR information indicating SDR related information of the video data.

According to another embodiment of the present invention, at least one of the HDR metadata set information, the transformation curve set information, the LUT set information and the SDR information may be included in at least one of the Period element, AdaptationSet element, Representation element, SubRepresentation element, ContentComponent element, SegmentBase element, EssentialProperty element, SupplementaryProperty element, Accessibility element and Subset element in the MPD.

According to another embodiment of the present invention, the MPD may include a representation element including information about association of representations, the representation element may include information for identifying a representation associated with a representation described by the representation element and association type information indicating a type of association between the associated representation and the representation described by the representation element, and the association type information may include information indicating that the representation described by the representation element includes HDR related information for the associated representation, and information indicating that the representation described by the representation element includes stereoscopic information for the associated representation.

Modules, units or blocks according to embodiments of the present invention may be processors/hardware executing consecutive procedures stored in a memory (or storage unit). The steps or methods described in the above embodiments may be performed by hardware/processors. In addition, the methods proposed by the present invention may be executed as code. This code can be written in a processor-readable storage medium and thus read by a processor provided by the apparatus according to embodiments of the present invention.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The image processing methods according to the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

Both apparatus and method inventions are mentioned in this specification and descriptions of both the apparatus and method inventions may be complementarily applied to each other.

[MODE FOR INVENTION]

Various embodiments have been described in the best mode for carrying out the invention.

INDUSTRIAL APPLICABILITY

The present invention is applicable to the broadcast industry.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of transmitting a broadcast signal, the method comprising:
generating video data and HDR (High Dynamic Range) configuration information including information related to a dynamic range of the video data;
generating a segment including the generated video data and an MPD (Media Presentation Description) including the generated HDR configuration information;

generating the broadcast signal including the generated segment and the generated MPD; and transmitting the generated broadcast signal, wherein the HDR configuration information includes OETF (optoelectronic transfer function) identification information for identifying an OETF applied to the video data, maximum luminance information indicating a maximum luminance of a mastering display for mastering the video data, minimum luminance information indicating a minimum luminance of the mastering display for mastering the video data, maximum frame luminance information indicating a maximum average luminance of a frame including the video data, maximum pixel luminance information indicating a maximum pixel luminance of the video data, and minimum pixel luminance information indicating a minimum pixel luminance of the video data.

2. The method according to claim 1, wherein the HDR configuration information further includes HDR type information for identifying a parameter set including at least one of the OETF identification information, the maximum luminance information, the minimum luminance information, the maximum frame luminance information, the maximum pixel luminance information and the minimum pixel luminance information.

3. The method according to claim 2, wherein the HDR configuration information further includes at least one of information indicating whether the video data is HDR, information indicating whether the parameter set of the video data has been changed, information indicating whether the dynamic range of the video data has been changed from HDR to SDR (Standard Dynamic Range), information indicating whether the dynamic range of the video data has been changed from SDR to HDR, and information indicating whether the video data is compatible with SDR.

4. The method according to claim 3, wherein the HDR configuration information is included in at least one of a Period element, an AdaptationSet element, a Representation element, a SubRepresentation element, a ContentComponent element, a SegmentBase element, an EssentialProperty element, a SupplementaryProperty element, an Accessibility element and a Subset element in the MPD.

5. The method according to claim 1, further comprising generating at least one of HDR metadata set information for transforming SDR of the video data into HDR, transformation curve set information indicating information about a transformation curve used to transform the SDR of the video data into HDR, LUT (Look-up Table) set information indicating information about an LUT used to transform the SDR of the video data into HDR, and SDR information indicating SDR related information of the video data when the video data is SDR video data, wherein the MPD includes at least one of the HDR metadata set information, the transformation curve set information, the LUT set information and the SDR information.

6. The method according to claim 5, wherein at least one of the HDR metadata set information, the transformation curve set information, the LUT set information and the SDR information is included in at least one of a Period element, an AdaptationSet element, a Representation element, a SubRepresentation element, a ContentComponent element, a SegmentBase element, an EssentialProperty element, a SupplementaryProperty element, an Accessibility element and a Subset element in the MPD.

7. The method according to claim 1, wherein the MPD includes a representation element including information about association of representations, the representation element includes information for identifying a representation associated with a representation described by the representation element and association type information indicating a type of association between the associated representation and the representation described by the representation element, and the association type information includes information indicating that the representation described by the representation element includes HDR related information for the associated representation, and information indicating that the representation described by the representation element includes stereoscopic information for the associated representation.

8. A method of receiving a broadcast signal, the method comprising:

receiving the broadcast signal including a segment and an MPD (Media Presentation Description), the segment including video data, the MPD including HDR (High Dynamic Range) configuration information including information related to the dynamic range of the video data;

extracting the segment and the MPD from the received broadcast signal; and decoding video data included in the segment using the extracted MPD, wherein the HDR configuration information includes OETF (optoelectronic transfer function) identification information for identifying an OETF applied to the video data, maximum luminance information indicating a maximum luminance of a mastering display for mastering the video data, minimum luminance information indicating a minimum luminance of the mastering display for mastering the video data, maximum frame luminance information indicating a maximum average luminance of a frame including the video data, maximum pixel luminance information indicating a maximum pixel luminance of the video data, and minimum pixel luminance information indicating a minimum pixel luminance of the video data.

9. The method according to claim 8, wherein the HDR configuration information further includes HDR type information for identifying a parameter set including at least one of the OETF identification information, the maximum luminance information, the minimum luminance information, the maximum frame luminance information, the maximum pixel luminance information and the minimum pixel luminance information.

10. The method according to claim 9, wherein the HDR configuration information further includes at least one of information indicating whether the video data is HDR, information indicating whether the parameter set of the video data has been changed, information indicating whether the dynamic range of the video data has been changed from HDR to SDR (Standard Dynamic Range), information indicating whether the dynamic range of the video data has been changed from SDR to HDR, and information indicating whether the video data is compatible with SDR.

11. The method according to claim 10, wherein the HDR configuration information is included in at least one of a Period element, an AdaptationSet element, a Representation element, a SubRepresentation element, a ContentComponent element, a SegmentBase element, an EssentialProperty element, a SupplementaryProperty element, an Accessibility element and a Subset element in the MPD.

12. The method according to claim 8, wherein, when the video data is SDR video data, the MPD includes at least one of HDR metadata set information for transforming the SDR of the video data into HDR, transformation curve set information indicating information about a transformation curve used to transform the SDR of the video data into HDR, LUT (Look-up Table) set information indicating information about an LUT used to transform the SDR of the video data into HDR, and SDR information indicating SDR related information of the video data.

13. The method according to claim 12, wherein at least one of the HDR metadata set information, the transformation curve set information, the LUT set information and the SDR information is included in at least one of a Period element, an AdaptationSet element, a Representation element, a SubRepresentation element, a ContentComponent element, a SegmentBase element, an EssentialProperty element, a SupplementaryProperty element, an Accessibility element and a Subset element in the MPD.

14. An apparatus for receiving a broadcast signal, the apparatus comprising:
a tuner to receive the broadcast signal including a segment and an MPD (Media Presentation Description), the segment including video data, the MPD including HDR (High Dynamic Range) configuration information including information related to the dynamic range of the video data; and
a hardware processor to extract the segment and the MPD from the received broadcast signal and decode video data included in the segment using the extracted MPD,
wherein the HDR configuration information includes OETF (optoelectronic transfer function) identification information for identifying an OETF applied to the video data, maximum luminance information indicating a maximum luminance of a mastering display for mastering the video data, minimum luminance information indicating a minimum luminance of the mastering display for mastering the video data, maximum frame luminance information indicating a maximum average luminance of a frame including the video data, maximum pixel luminance information indicating a maximum pixel luminance of the video data, and minimum pixel luminance information indicating a minimum pixel luminance of the video data.

15. The apparatus according to claim 14, wherein the HDR configuration information further includes HDR type information for identifying a parameter set including at least one of the OETF identification information, the maximum luminance information, the minimum luminance information, the maximum frame luminance information, the maximum pixel luminance information and the minimum pixel luminance information.

16. The apparatus according to claim 15, wherein the HDR configuration information further includes at least one of information indicating whether the video data is HDR, information indicating whether the parameter set of the video data has been changed, information indicating whether the dynamic range of the video data has been changed from HDR to SDR (Standard Dynamic Range), information indicating whether the dynamic range of the video data has been changed from SDR to HDR, and information indicating whether the video data is compatible with SDR.

17. The apparatus according to claim 16, wherein the HDR configuration information is included in at least one of a Period element, an AdaptationSet element, a Representation element, a SubRepresentation element, a ContentComponent element, a SegmentBase element, an EssentialProperty element, a SupplementaryProperty element, an Accessibility element and a Subset element in the MPD.

18. The apparatus according to claim 14, wherein, when the video data is SDR video data, the MPD includes at least one of HDR metadata set information for transforming the SDR of the video data into HDR, transformation curve set information indicating information about a transformation curve used to transform the SDR of the video data into HDR, LUT (Look-up Table) set information indicating information about an LUT used to transform the SDR of the video data into HDR, and SDR information indicating SDR related information of the video data.

19. The apparatus according to claim 18, wherein at least one of the HDR metadata set information, the transformation curve set information, the LUT set information and the SDR information is included in at least one of a Period element, an AdaptationSet element, a Representation element, a SubRepresentation element, a ContentComponent element, a SegmentBase element, an EssentialProperty element, a SupplementaryProperty element, an Accessibility element and a Subset element in the MPD.

* * * * *